(12) United States Patent
Bountour et al.

(10) Patent No.: US 8,060,908 B2
(45) Date of Patent: Nov. 15, 2011

(54) CONSUMER ACCESS SYSTEMS AND METHODS FOR PROVIDING SAME

(76) Inventors: Lazaros Bountour, Westminster, CA (US); Andreas Haas, Los Angeles, CA (US); Werner Bauer, Landsberg am Lech (DE); Manfred Voelk, Schwifting (DE); Alexander Liebert, Glanshammar (SE)

(*) Notice: Subject to any disclaimer, the term of this patent is extended or adjusted under 35 U.S.C. 154(b) by 328 days.

(21) Appl. No.: 11/611,689

(22) Filed: Dec. 15, 2006

(65) Prior Publication Data

US 2007/0094698 A1    Apr. 26, 2007

Related U.S. Application Data

(63) Continuation of application No. 09/729,904, filed on Dec. 4, 2000, now abandoned.

(60) Provisional application No. 60/168,822, filed on Dec. 3, 1999.

(51) Int. Cl.
*H04N 7/173* (2011.01)
*H04N 5/445* (2011.01)
*H04N 7/16* (2011.01)
*G06F 3/00* (2006.01)
*G06F 13/00* (2006.01)

(52) U.S. Cl. ............... 725/86; 725/37; 725/38; 725/43; 725/52; 725/141

(58) Field of Classification Search ................. None
See application file for complete search history.

(56) References Cited

U.S. PATENT DOCUMENTS

| | | | |
|---|---|---|---|
| 5,318,535 A | 6/1994 | Miraki | |
| 5,532,753 A | 7/1996 | Buchner et al. | |
| 5,579,308 A * | 11/1996 | Humpleman | 370/352 |
| 5,802,785 A | 9/1998 | Crook | |
| 5,940,073 A | 8/1999 | Klosterman et al. | |
| 5,949,551 A | 9/1999 | Miller et al. | |
| 5,982,535 A | 11/1999 | Inoue et al. | |
| 6,006,251 A | 12/1999 | Toyouchi et al. | |
| 6,049,831 A * | 4/2000 | Gardell et al. | 709/236 |
| 6,104,334 A * | 8/2000 | Allport | 341/175 |
| 6,460,038 B1 * | 10/2002 | Khan et al. | 707/10 |
| 6,675,386 B1 * | 1/2004 | Hendricks et al. | 725/105 |

FOREIGN PATENT DOCUMENTS

| | | |
|---|---|---|
| EP | 0 944 260 A2 | 9/1999 |
| WO | WO 97/30551 | 8/1997 |
| WO | WO 99/12349 | 3/1999 |

* cited by examiner

*Primary Examiner* — Dominic D Saltarelli

(57) ABSTRACT

Apparatus and methods for providing enhanced consumer access to information sources and controllable entities. An Access device can be a stand alone device such as a DVD player in which the DVD disk contains the back-end information network. Other Access devices obtain the back-end information network from remote sources. By way of a specific example, the consumer can then view a game and interactively select every television camera located at the game venue.

26 Claims, 73 Drawing Sheets

Our World Live - Technical Concept -
Example for customized Window Layout

Front-end Human Interface - Accessing Asset Offerings
Example for Video Broadcasting Front-end Human Interface · Localization
Example Layout for British Localization Scale 1:2

Front-end Human Interface - Localization
  Example Layout for Egyptian Localization Scale 1:2

Front-end Human Interface - Localization
   Example Layout for Japanese Localization Scale 1:2

Front-end Human Interface - Screen Layout
  Examples Free Window Positions
1A.01  1A.05
   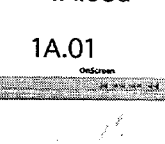 
1A.08a  1A.08b  1A.08c  1A.08d  1A.08e
1A.08a  1A.08b  1A.01
  
1A.05  1A.08c  1A.08d  1A.08e  Scale 1:2
Fig. 1E Front-end Human Interface - Accessing Asset Offerings
　　Example for different Asset types
　　　　(Movie, Data Sheet, Forms and Home Device Control)

Scale 1:2

Front-end HumanInterface - Access Devices
    Example: Screen Layouts on Color Palm Pilot IIIC (160 x 160 pixels)

Scale 1:1

Front-end Human Interface - Access Devices
Example: Screen Layouts on a Pocket PC (240 x 320 pixels)

Scale 1:1

Front-end Human Interface - Access Devices
Example: Screen Layouts on a Pocket PC (320 x 240 pixels)

Front-end Human Interface - Access Devices
    Example: Screen Layout on a Ericsson R380 cellular
        running EPOC-OS
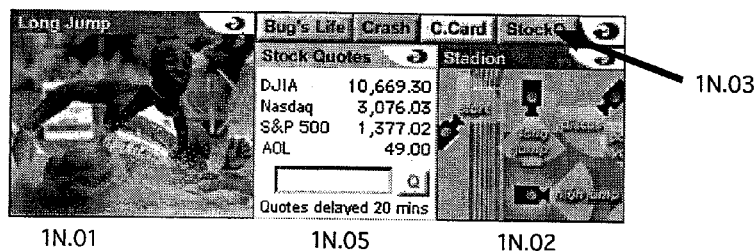
Example: Screen Layout on a Nokia 9210 Communicator
    running EPOC-OS
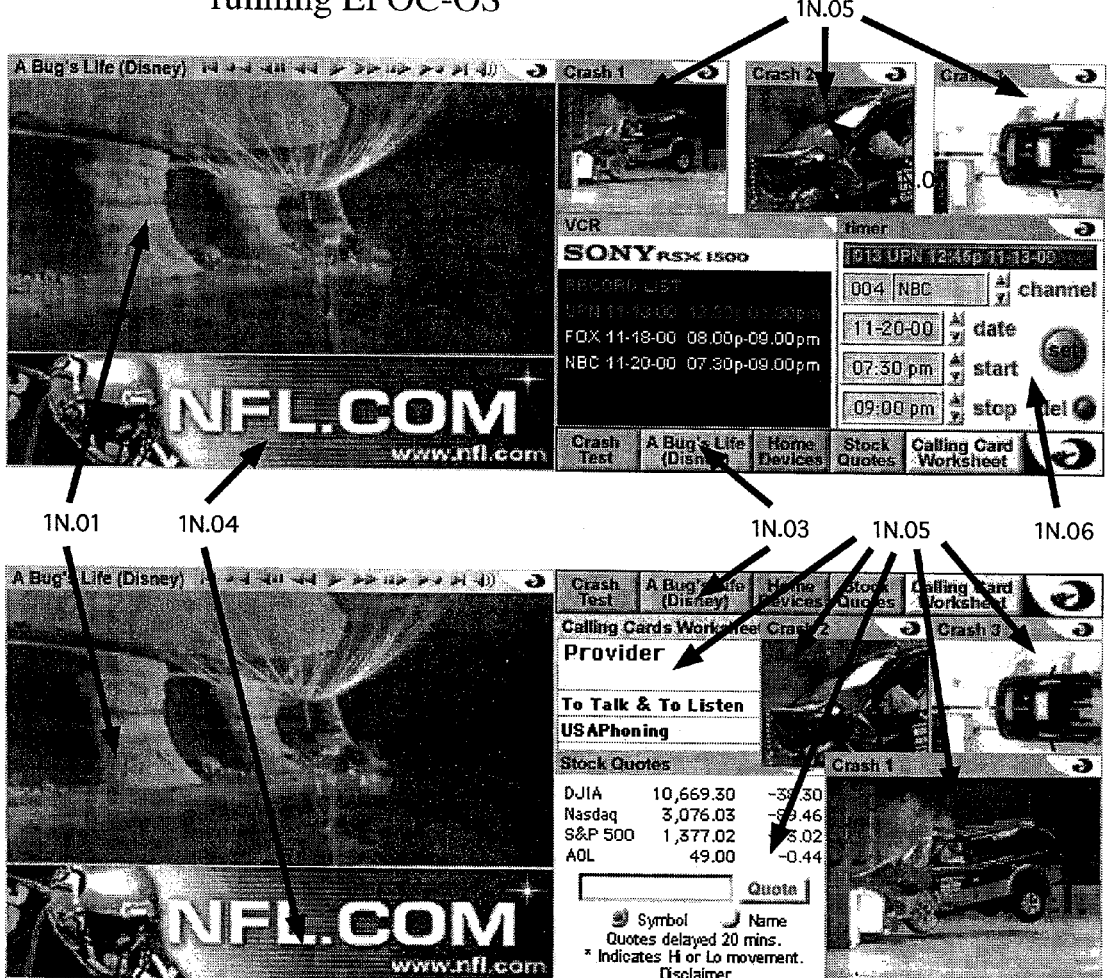
Fig.1N Front-end Human Interface - Virtual Access Environment (VAE)
Example: VAE on Cellular Phone Nokia 9210 Communicator (top)
and Television set (bottom)

Front-end Human Interface - Virtual Access Environment (VAE)
　　Example: VAE on Color Palm Pilot IIIC (top) and PC (bottom)
1R.01
1R.02
1R.03
Scale 1:2
Fig.1R Front-end Human Interface - Virtual Access Environment (VAE)
Example: VAE on Pocket PC (top) and PC (bottom)
1S.03
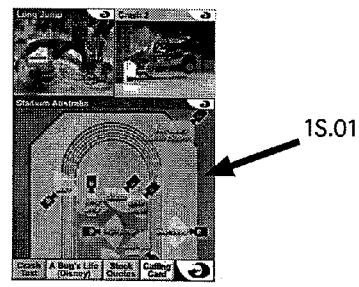
1S.01
1S.02
1S.04
Fig.1S
Scale 1:2

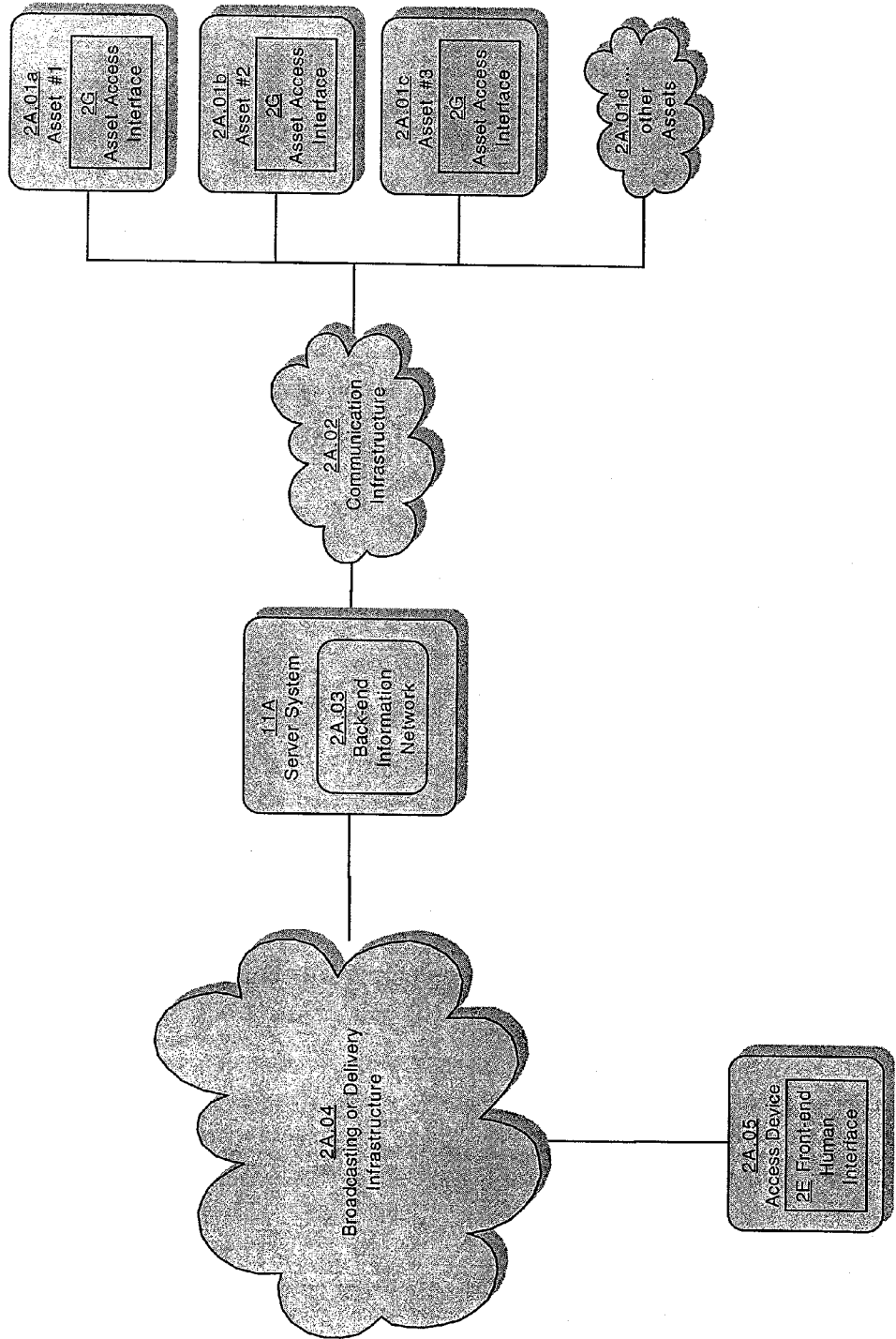

Our World Live - Consumer Access System -
Front-end Human Interface (FHI)

Our World Live - Consumer Access System -
Asset Access Interface (AAI)

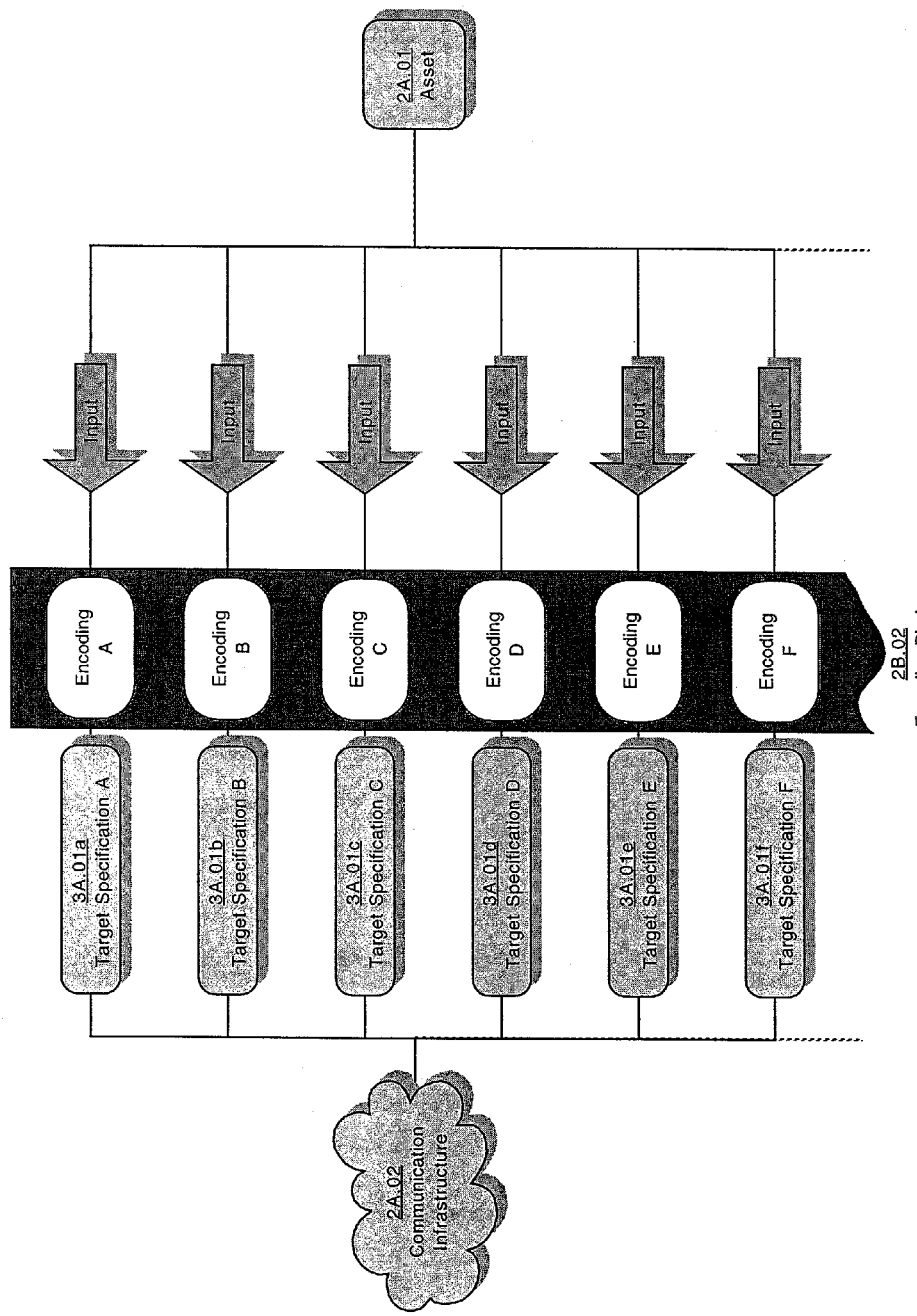

Our World Live - Front-end Human Interface - Deployment -
Access Device Based - Dynamic Load-balancing

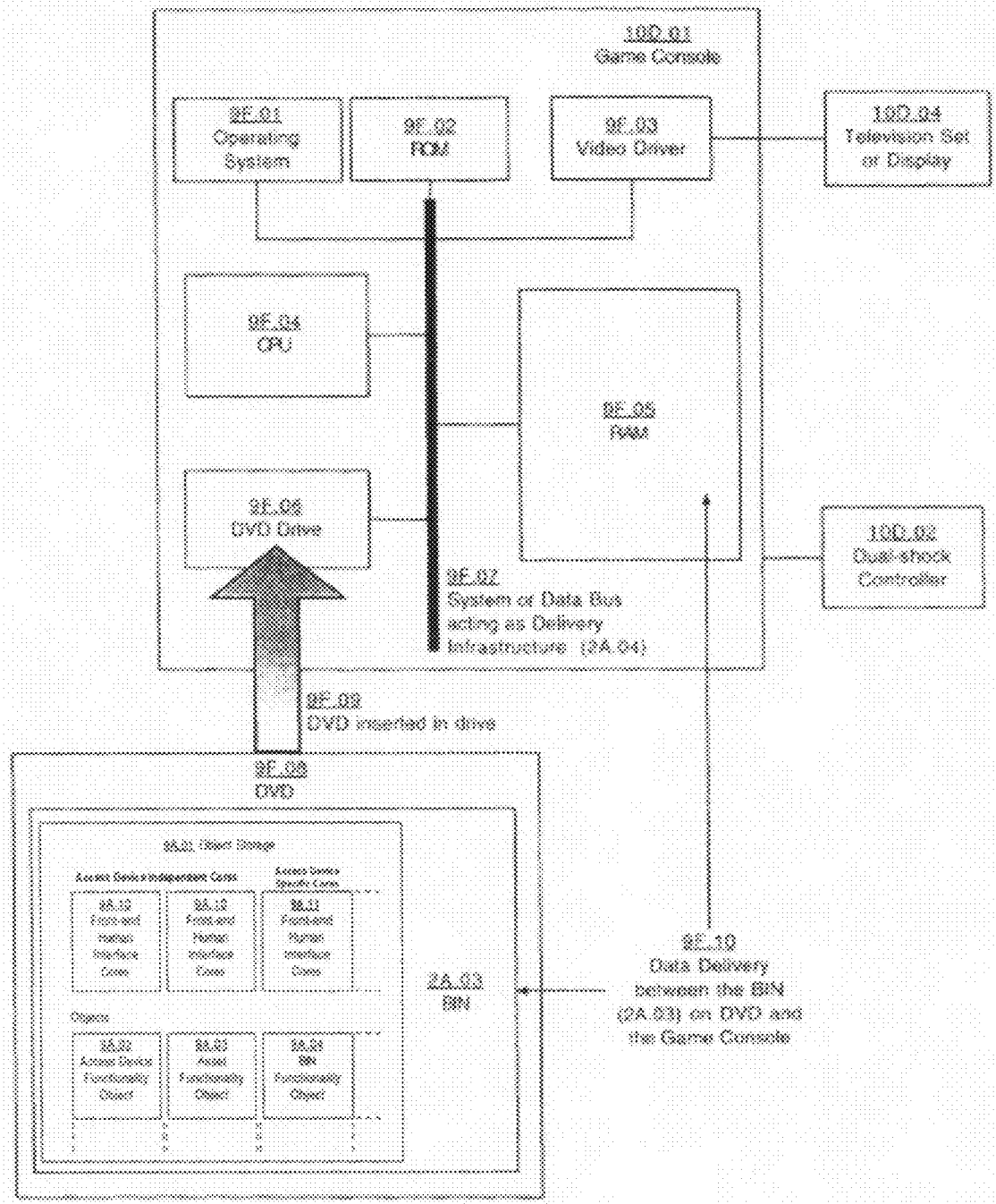

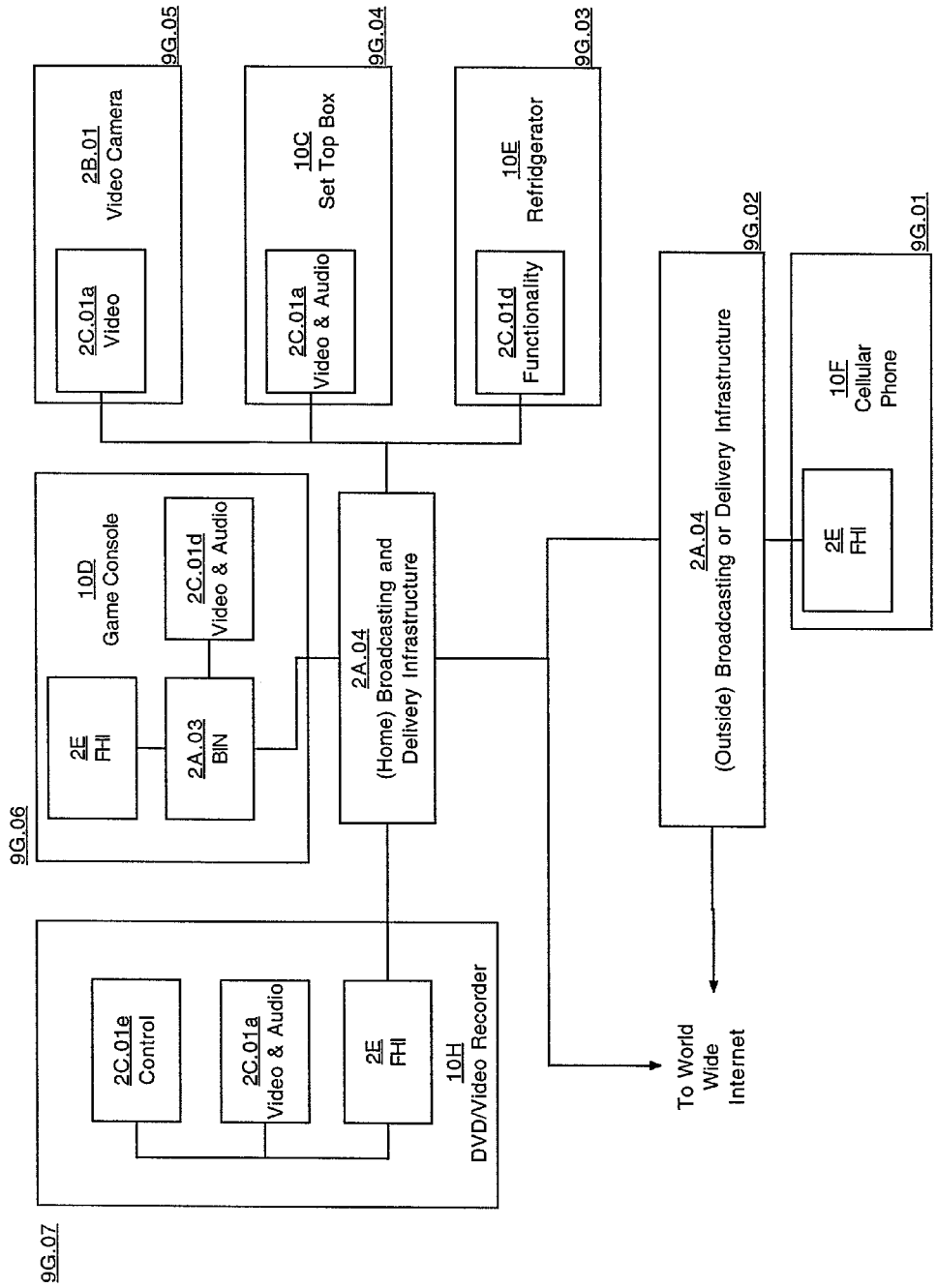

Our World Live - Access Device - General Overview
Schematic Diagram of the Access Device / Asset Our World Live - Access Device -
Schematic Diagram of the Access Device / Asset
Example: Information System Device Our World Live - Access Device -
Schematic Diagram of the Access Device / Asset
Example: Home Entertainment Device

Our World Live - Access Device -
Schematic Diagram of the Access Device / Asset
Example: Home Entertainment Device Our World Live - Access Device -
   Schematic Diagram of the Access Device / Asset
      Example: Home Appliances

Our World Live - Access Device -
Schematic Diagram of the Access Device / Asset
Example: Communication System Device Our World Live - Access Device -
   Schematic Diagram of the Access Device / Asset
      Example: Information Access Device - DVD / Video Recorder Our World Live - Back-end Information Network Infrastructure -
Multiple Server Systems or Cluster

Our World Live - Technical Concept - Functionality provided through the FHI Boot Sequence

Our World Live - Technical Concept - Functionality provided through the FHI Selecting the Master Companion

Our World Live - Technical Concept - Functionality provided through the FHI Sending the OnScreen to a Monitor

Our World Live - Technical Concept - Functionality provided through the FHI Opening Companion from OnScreen

Our World Live - Technical Concept -
Functionality provided through the FHI
Sending the Monitor to the OnScreen Our World Live - Technical Concept -
Functionality provided through the FHI
Opening the Companion from a Monitor

Our World Live - Technical Concept - Dynamic FHI Assembly

Our World Live - Technical Concept - Virtual Access Environment

Our World Live - Front-end Human Interface - Screen Layout Alignment Tools

Our World Live - Technical Concept - Dependencies of the FHI

Our World Live - Technical Concept - Consumer Access Environment

Our World Live - Technical Concept - Virtual Access Environment

Our World Live - Technical Concept - Multiple Asset Offerings

Our World Live - Frond-end Human Interface - Screen Layout - Default Windows Setup Our World Live - Technical Concept -
Example for customized Window Layout

CONSUMER ACCESS SYSTEMS AND METHODS FOR PROVIDING SAME

PRIORITY CLAIM

This application is a Continuation Application of Ser. No. 09/729,904, Filed Dec. 4, 2000, which claims the benefit of U.S. Provisional Application No. 60/168,822 filed Dec. 3, 1999.

FIELD

Various embodiments of the invention relate to apparatus and methods for providing enhanced consumer access to information sources and controllable entities. Further, various embodiments of the invention relate to real-time asset, business logic and consumer integration systems and more particularly to systems and methods for providing very enhanced worldwide real-time availability of consumer access to and handling of asset and business logic offerings, independent of existing or future asset types, access device types and infrastructures in use.

SUMMARY

Typically entertainment Offerings to Consumers are restricted in such important aspects as availability, personalization and interactivity, rendering the Offerings limited in their attractiveness and effectiveness as far as the main intention of the Offering Provider is concerned, that of creating Consumer business, return on investment and maximizing the Assets' profitability. For example a typical professional football, baseball, hockey or similar sports event is played in a large stadium having a plurality of television cameras following the game from different positions. At the broadcast studio, a television director determines which camera signal is actually broadcast. As a result, the Consumer watching the game on his or her television set sees only the image of the camera selected by the television director for broadcasting over the television network. In addition, the Consumer can access the program only if he or she is in a location covered by this broadcasting television network, and only if he or she is using a compatible Access Device such as a television set, which is integrated in the appropriate Access Device Infrastructure, i.e. hooked up to a correctly installed Set-top Box with the respective channel enabled.

In various embodiments of this invention, however, the Asset Provider is able to provide the Consumer with personalized, fully accessible and unrestricted interactive Asset Offerings, independent of the existing or future type or location of the Asset, the type or location of the Access Device and the various infrastructures in use. The television signals from installed video cameras are transmitted simultaneously over the internet as well as the standard terrestrial, cable and satellite television network. The Consumer can view this same game on his home television set, on an internet connected personal computer (PC) or a cellular phone anywhere in the world. On the used Access Device's screen he views the outputs of all of these cameras on a plurality of small Monitor Windows and one larger OnScreen Window. Whichever of the cameras is shown on the larger OnScreen Window is entirely at the discretion and interactive selection of the Consumer. As a result, each Consumer becomes in effect his or her own director creating an extraordinarily enhanced ability to view an athletic game. In various embodiments the Consumer Access System identifies the Consumer himself, regardless of the Access Device in use, and personalizes all services automatically. Therefore all channels and services that are enabled by the Asset Provider for access by the identified Consumer are available everywhere on any Access Device. A detailed Consumer profile can be created, so that Asset Offerings such as Sport events, product offers or advertisements are targeted on the Consumer's very personal interests and any purchases can be directly executed.

As the Consumer Access System is able to handle any Asset type anywhere, it also can span over different Enterprises, combining different Asset Offerings and handling all inherent business logics. In the example the Consumer would receive a product advertisement along with the broadcast of the game, exactly matching his personal interests. With few simple steps the Consumer buys the product, while the generated revenue is automatically shared between many entities such as the Provider of the game, the Provider of the advertisement, the Provider of the product and the Provider of the store.

Similarly, consider a musical, operatic or stage presentation. As broadcast today, the television Consumer observes the video output of the camera selected by the television Provider although such televised cultural events are normally televised in venues having a plurality of cameras trained on the stage from different viewing angles and viewing perspective, e.g., wide angle, normal, or telephoto shots. Typically Pay-per-view set-ups do not allow any access what-so-ever for undecided Consumers to view the Pay-per-View Offering, keeping a majority away from attending, rendering these Consumers unavailable for further product Offerings and reducing the possible Pay-per-view revenues. Various embodiments of the present invention enable the Consumer on the Access Device of his choice from all over the world to simultaneously see the outputs of all of these video cameras, again providing an outstanding improved viewing access to a cultural event. As the Asset Provider is in full control of his Offerings, he can further improve the revenues of this event by giving free access to some of the more distant cameras and Pay-per-view access at lower fees for "first-row-class" cameras giving the Consumer more choices at lower prices. The overall audience increases, revenues from Pay-per-view are maximized and consequently the success of the personalized product Offerings reaches new dimensions.

Various embodiments enable the integration of any types of existing and future Assets, Access Devices and infrastructures in use. They empower the Asset Owner to streamline his processes, to create improved and new services and Offerings, to partner up with other Asset Owners and Providers, while facilitating all Assets, already installed Legacy Systems, Access Devices and infrastructures. The example above works in parallel with the conventional television broadcast equipment, and typically requires no additional cameras. Rather the system uses a parallel feed from each of the already installed cameras. The use and function of television broadcast cameras and Broadcast or Delivery infrastructure are in no way compromised or degraded—the installed cameras broadcast signals over their usual links without any change while a parallel feed from each camera is typically connected via a direct or conventional local area network as part of the system of various embodiments of this invention. Also the described Electronic Commerce works on top of the installed Legacy Systems, spanning multiple Enterprises and accessing the existing applications in order to initiate authentications, shipments, invoices, inventory and production updates, all the way through the supply chain and back to the customer relationship management applications.

Various embodiments provide an interactive Front-end Human Interface (FHI). In some embodiments, software for this User Interface can be located either or entirely (1) on the Consumer's Access Device or (2) on the Back-end Information Network of the system and is dynamically (1) updated or (2) loaded into the Consumer's Access Device anytime the Consumer opens his or her Access Device to the Start Site of the Asset Provider's Offerings empowered by various embodiments of this invention. In various embodiments, the Back-end Information Network is Access Device Adaptable, supporting any kind of connected Access Device without any restrictions as of i.e. hardware platforms or operating systems, and dynamically assembles the Front-end Human Interface to the Consumers preferences and the specifications of the Access Device in use, including the dynamic Localization of the interface itself. For example, a Japanese Consumer using his cellular phone is automatically provided with the Front-end Human Interface optimized for the Screen size of his cellular phone in the Japanese localized version of the interface, while an Egyptian Consumer connecting with a television set (TV) to the same Asset Offering receives a Front-end Human Interface for the bigger TV screen size in the Egyptian localized version—even though the Asset Provider designed only one interface and provided it only in the British localized version. The Front-end Human Interface can also span across multiple Access Devices, creating for the Consumer one single Virtual Access Environment. The Consumer can freely layout the Front-end Human Interface across all Screens of the assimilated Access Devices—a Consumer watching a football game, chooses a camera angle on his Pocket PC and directs the video output to be displayed in full screen on his television set (TV). Being attracted by a product sales Offering displayed on the TV and simultaneously provided with a corresponding prompt on his Pocket PC, he responds to it on his Pocket PC, automatically directing his Personal Computers' Front-end Human Interface to the online store and purchasing the product on his Personal Computer.

BRIEF DESCRIPTION OF THE DRAWINGS

FIGS. 1E and 1F illustrate the customizability of the Front-end Human Interface's Screen Layout depicting several arrangements.

FIGS. 1K, 1L, 1M, and 1N illustrate the capability of various embodiments of the invention to allow to support various Access Device types, depicting Screen Layouts for Palm Pilot IIIc, Pocket PC, Ericsson R380 and Nokia 9210 Communicator cellular phones, FIGS. 1P, 1R and 1S illustrate the unique Virtual Access Environment capability of various embodiments of the invention, whereas the Front-end Human Interface can simultaneously span over multiple Access Devices, allowing the Consumer to easily control the combine the functionalities of the different Access Device types;

FIG. 1P shows the set up for choosing on a cellular phone the camera angles displayed on a Television set, while simultaneously programming a Video Cassette Recorder from the Television set and receiving detailed Coca Cola product information on the cellular phone along with the respective advertisement on the Television set, FIG. 1R shows the set up for choosing on a Palm Pilot the camera angles displayed on a Personal Computer, while simultaneously accessing a Video Cassette Recorder from the Personal Computer, FIG. 1S shows the set up for choosing on a Pocket PC the camera angles displayed on a Personal Computer as well as on the Pocket PC, while simultaneously accessing a Video Cassette Recorder from the Personal Computer;

FIG. 3A shows an abstracted illustration of an Asset Infrastructure;

FIG. 9F illustrates the deployment of a disconnected Access Device, in accordance with various embodiments, in which all needed parts are embedded on the same DVD/CD medium also containing the Asset Offerings, rendering the Access Device into a fully functional Consumer Access System any time the Consumer opens it, FIG. 9G is an schematic diagram showing an exemplary set up of a standalone Consumer Access System such as a Home and Entertainment Control system.

FIGS. 13A, 13B, 13C, 13D, 13E, 13F, 13G, 13H, 13I, 13K and 13L depict system flow diagrams that illustrate the functionality of the Front-end Human Interface shown in FIG. 12A.

DEFINITION OF TERMS AND EXPRESSIONS

Figure 1A:
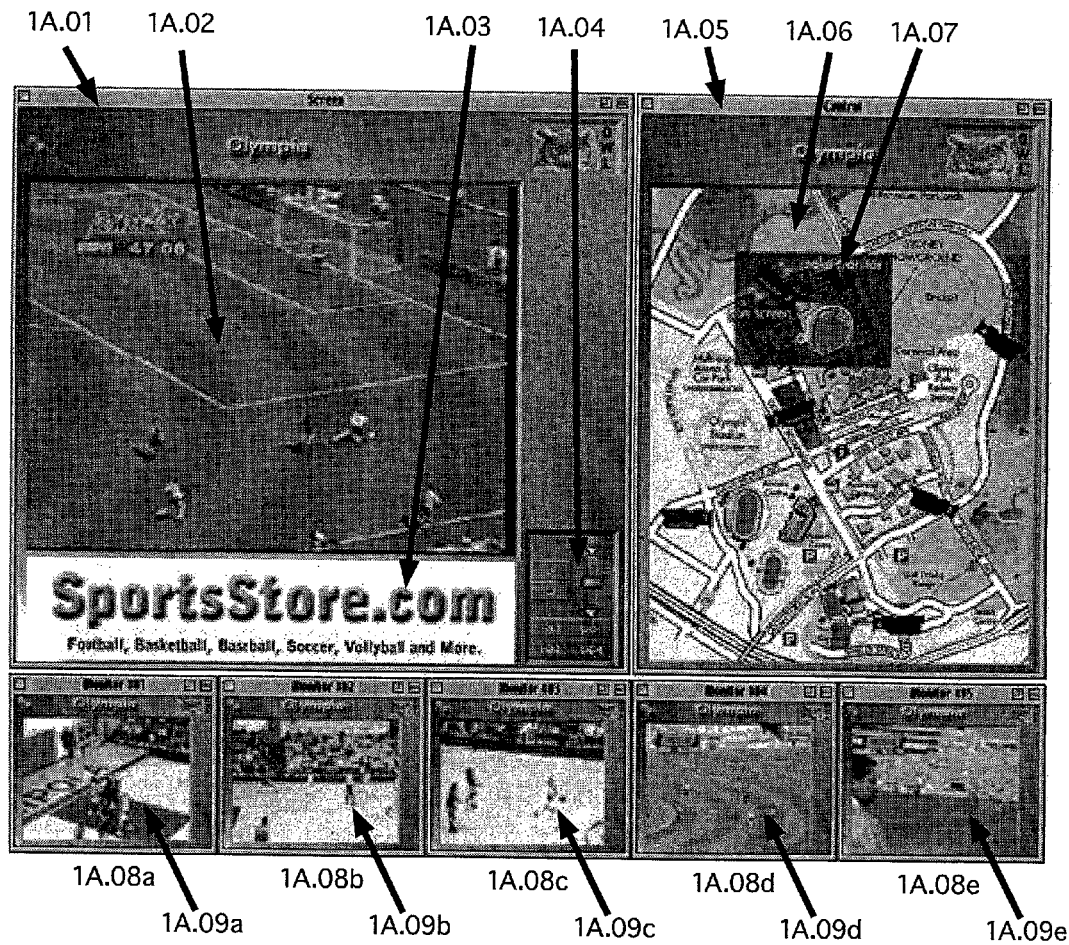
FIG. 1A illustrates the video display provided to the Access Device such as a Personal Computer.
Figure 1B:
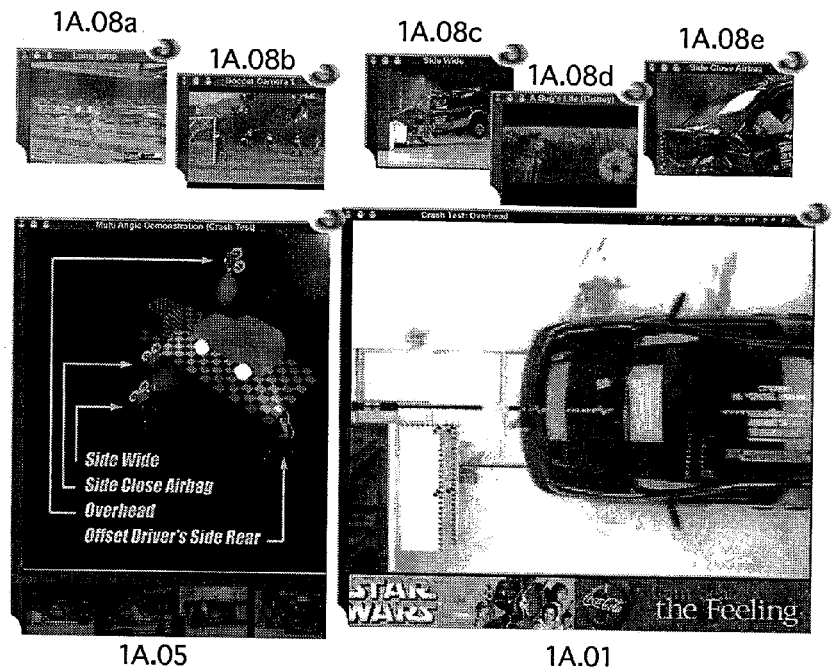
FIGS. 1B, 1C and 1D illustrate the automatic Localization functionality of various embodiments of the invention, with examples for British, Egyptian and Japanese Localizations.
Figure 1C:
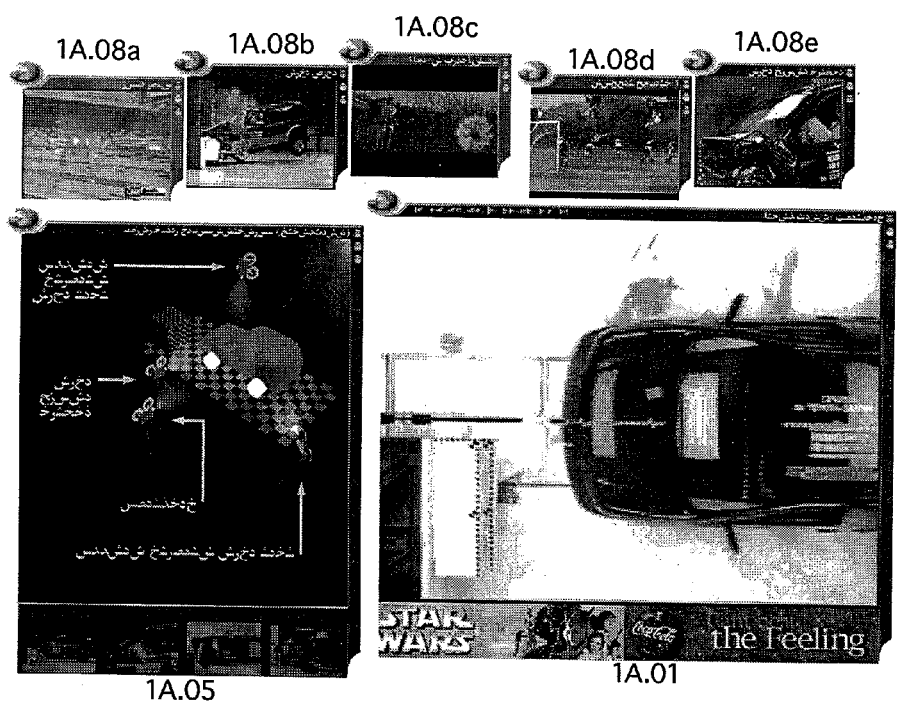
Figure 1D:
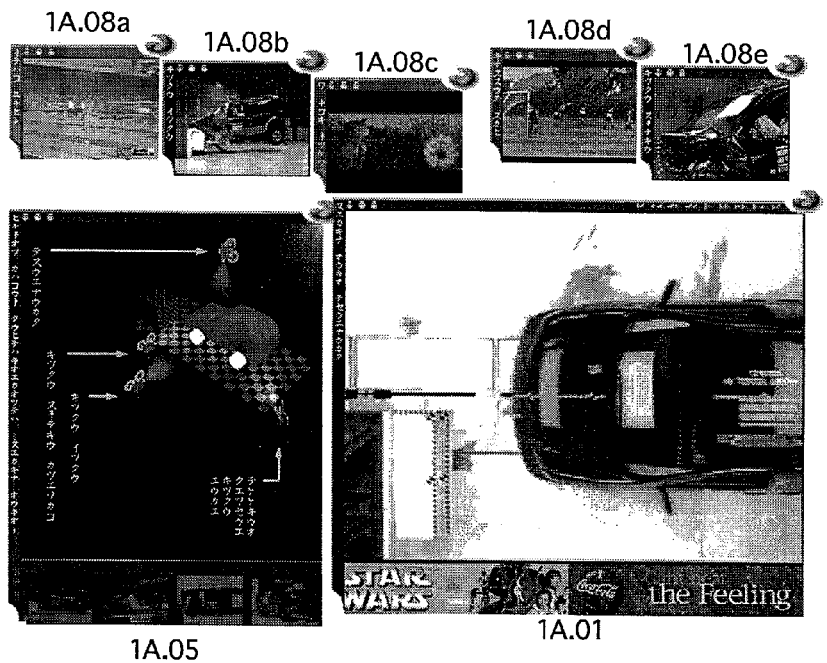
Figure 1F:
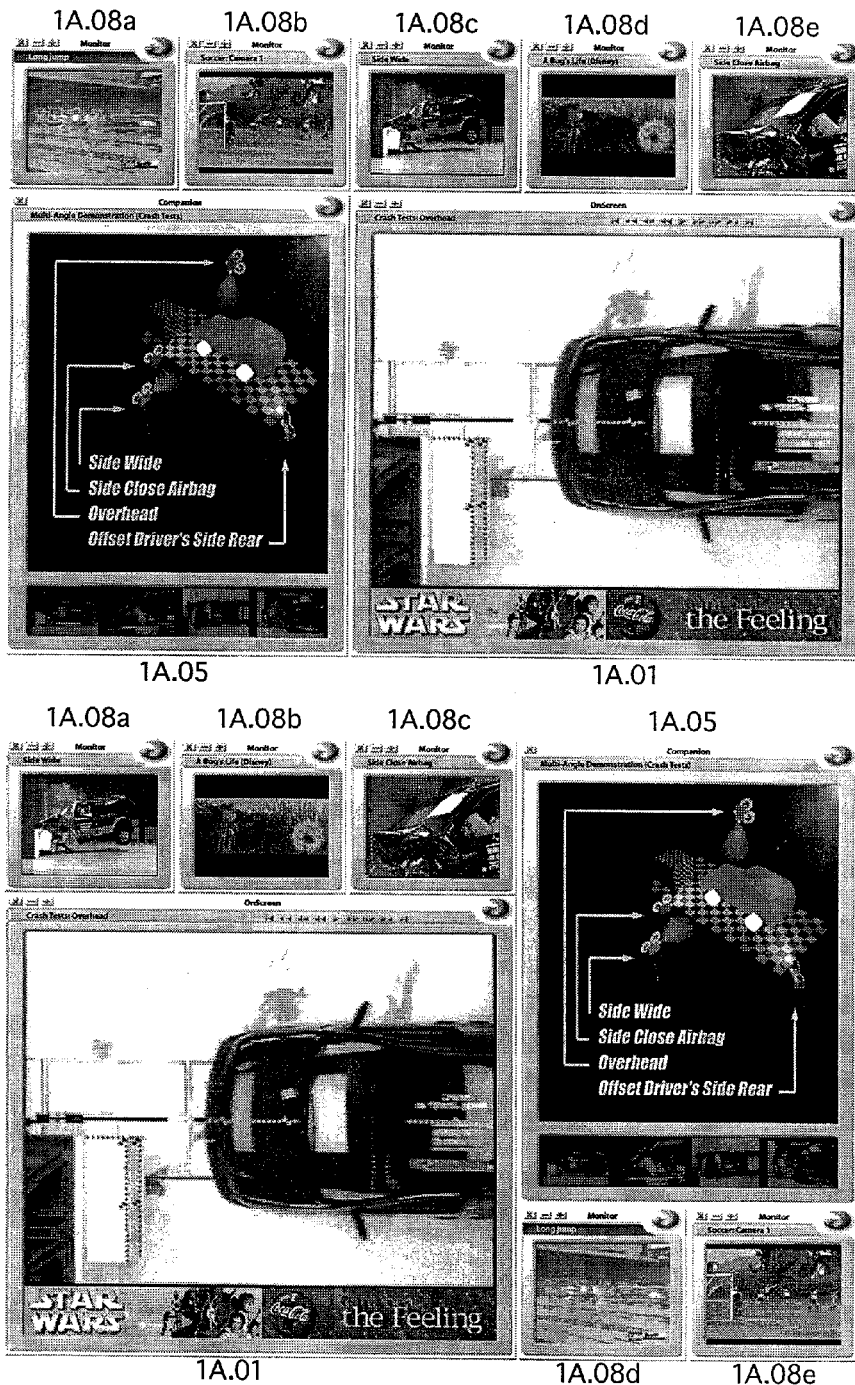
Figure 1G:
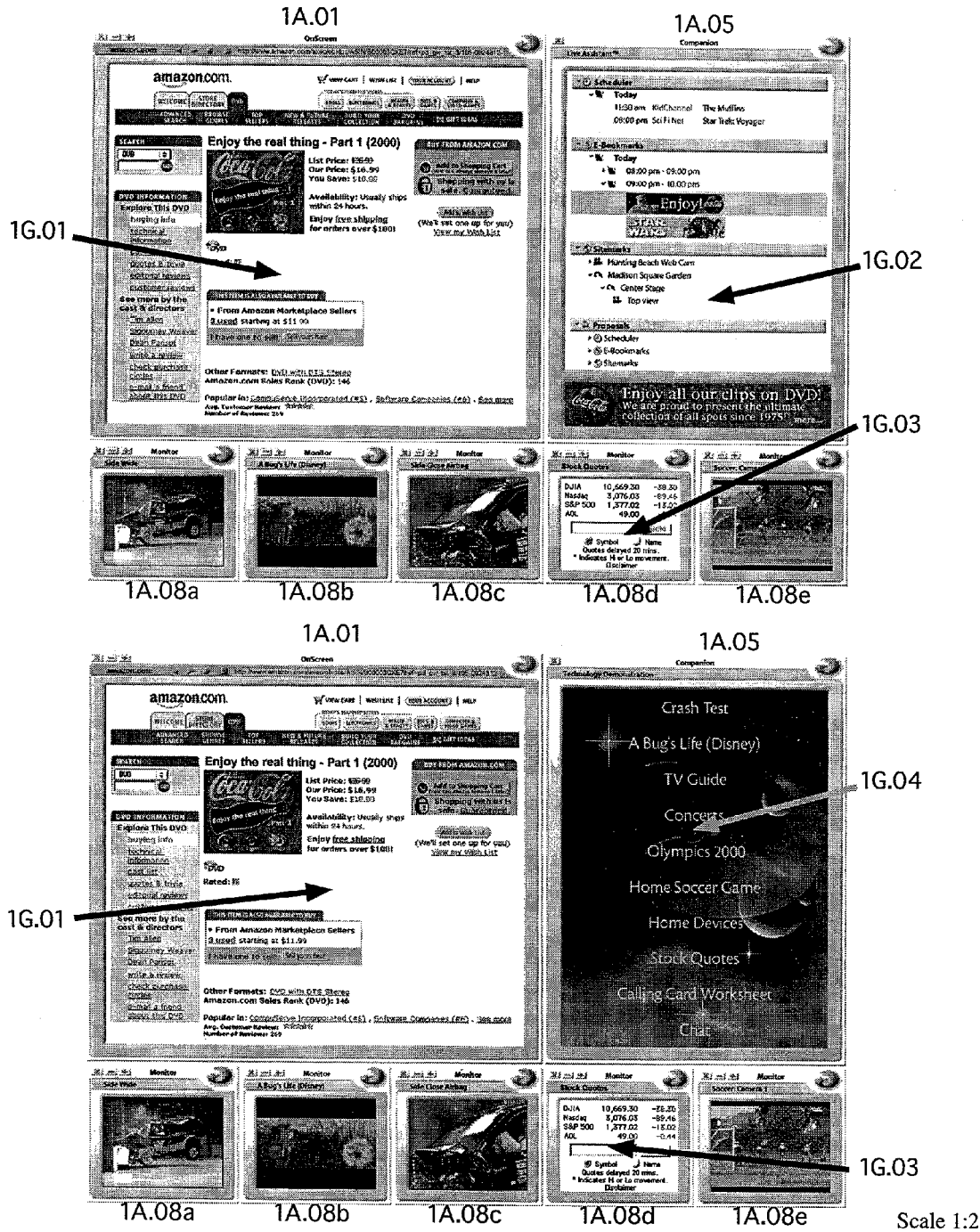
FIGS. 1G, 1H and 1J illustrate the capability of various embodiments of the invention to allow simultaneously access to various Asset types, FIGS. 1H and 1J also show the use of the Front-end Human Interface to display any combination of its Window types (2 OnScreen+6 Monitors, 1 OnScreen+5 Monitors+1 Companion, . . . )

Our World Live's Technology in accordance with various embodiments of this
Consumer Access invention for providing very enhanced worldwide real-time
System (CAS) availability of Consumer access to and handling of Asset and business logic Offerings, encompassing all existing and future kinds of asset types, access device types and infrastructures in use.
Consumer Private or Enterprise end-user of the services offered through an installed Consumer Access System
Asset Provider Deploys Our World Live's Consumer Access System in order to provide real-time integration of assets, services and consumers
Asset In various embodiments, a variety of Assets can be integrated and handled:
    Categories of possible Assets can be categorized as but are not restricted to:
        Cat. A. Video and/or Audio assets, live, recorded or stored such as Video Conferences, TV Channels or Programs, Advertisements or Product Offerings, Events or Performances or Reports or Shows, Art or Musical or Operatic or Stage Presentations
        Cat. B. Graphics, live, recorded or stored such as 2D and 3D objects, 2D and 3D wireframes, 2D and 3D vector based objects, 2D and 3D graphs, 2D and 3D live rendered
        Cat. C. Script, live, recorded or stored such as Forms/Tables, Text, Chat, (e) mail, Advertisement, Stock Quotes, Presentations
        Cat. D. Functionality, live, recorded or stored such as Data Access & Control, Transactions, Purchase, Navigation, Software Applications, Business Legacy Systems (such as from SAP, PeopleSoft, etc. . . . )
        Cat. E. Remote Device Access & Control, any Access Device can become an Asset to be remotely accessed and controlled; online (the Asset is connected and is directly accessed) or offline (the Asset is not connected). If the Asset is offline, the Consumer accesses a virtual copy of it creating cached information, which is automatically (with no further Consumer interaction required) executed once the Asset is online again.
        Cat. F. Local Device Access & Control; When deployed on an Access Device, the Front-end Human Interface (FHI) software program can also enable functionalities of the resident Access Device and in this respect it can in fact make the interface or Operating System of the Access Device redundant. For example a Consumer can use the installed FHI to access and view a DVD video on his Personal Computer (PC), whether the DVD player is built-in or attached to his PC. The Front-end Human Interface software program installed on the PC enables the Consumer to override the Operating System and access all the DVD functionalities through the FHI.

Asset Offer, Asset One or more Assets integrated by the Asset Provider in Our

Offering World Live's Consumer Access System and becoming available for the Asset related functionalities of the system.

Offering See Asset Offer, Asset Offering

Asset Infrastructure The infrastructure that a given Asset is embedded in plus the infrastructure that connects the Asset to the infrastructure that the Back-end Information Network (BIN) is residing on. For example in case of a digitized movie clip, the Asset Infrastructure encompasses the server it is residing on plus the server's Broadcasting or Delivery Infrastructure that is providing the connection to the BIN's infrastructure.

Access Device In various embodiments, the User Interface can be deployed on any kind of connected device (stationary or mobile), including wired as well as wirelessly connected devices, without any dependency on a specific device hardware platform or operating system.

Categories of possible Access Device can be categorized as but are not restricted to:

Cat. A. Information System Devices, such as Personal Computers, Mainframe Computers, Workstations, Industrial Information Devices, Vending Machines, Information Terminals, Network/Internet Appliances Cat. B. Portable Information System Devices such as Notebooks, Industrial Information Devices, Car/Boat/Flight Navigation & Information Systems, Personal/Pocket Navigation & Information Systems, Network/Internet Appliances Cat. C. Handheld Information System Devices such as Pocket PCs, eBooks, Game-Boys, Industrial Information Devices (i.e. UPS using Wireless Data Devices), Personal Digital Assistants, Network/Internet Appliances Cat. D. Home & Entertainment Devices such as Game Consoles, Set-Top Boxes, Television Sets, Video Cassette Recorders, DVD Players, Video Cameras, Car Entertainment Centers, Network/Internet Entertainment Appliances Cat. E. Home Appliances such as Microwaves, Stoves, Refrigerators, Ovens, Dishwashers, Coffee machines, Air Conditioning and Heating Systems, Car Heating Systems, Sprinklers, Pools, Jacuzzis, Saunas, Blinds, Lights, Alarm and Security Systems, Home Control Devices, Network/Internet Home Appliances Cat. F. Communication System Devices such as Wireless/Cellular Phones, Radio Phones, Smart Phones, Landline Phones and Systems Cat. G. Audio Entertainment Devices such as MP3 Players, Home/Car/Boat/Flight Stereo Systems, CD Players Access Device When the Access Device connects to the Consumer Access Adaptable System, the system automatically identifies the specific device type, assembles dynamically the User Interface software program optimized to the technical specifications of the Access Device and deploys it into the device Access Device The infrastructure that a given Access Device is embedded Infrastructure in plus the infrastructure that connects the Access Device to the infrastructure that the Back-end Information Network (BIN) is residing on. For example in case of a Cellular Phone, the Access Device Infrastructure encompasses the cellular network it is connected to plus the network's Broadcasting or Delivery Infrastructure providing the connection to the BIN's infrastructure.

Back-end Information The Back-end Information Network (BIN) comprises

Network (BIN) software modules and applications to provide the functionalities of various embodiments of Our World Live's Consumer Access System.

Back-end Information The Infrastructure that the Back-end Information Network

Network Infrastructure (BIN) is residing on. The BIN is typically distributed over one or more clusters of servers, but can also be deployed on a single server system. The server operating systems can be, but are not restricted to, UNIX, LINUX, JAVA, Microsoft Windows NT or Apple Mac OS X Server. Alternatively it can even be embedded (1) in a single Access Device such as a DVD jukebox allowing the Consumer to control the device and use all functionalities as provided through the Front-end Human Interface or (2) in a part of an Asset Infrastructure itself such as on a Video DVD, rendering any DVD Access Device such as a DVD player, Game-Console or Personal Computer, into a complete standalone Consumer Access System, allowing the Consumer to access and display the contained entertainment Offerings through the Front-end Human Interface with all BIN functionalities, such as online advertisement enabled.

Broadcasting or Delivery Any kind of existing or future broadcasting or delivery Infrastructure technology in use for the transmission of data that can be categorized as but is not restricted to Cat. A. Internet networks, such as the Word Wide Web and TCP/IP based networks, both wired and wireless.

Cat. B. Communication and telecommunication networks, such as Satellite, Cable and Radio based networks.

Cat. C. Network services, such as RTP or RTSP streaming or as provided by internet service providers such as Akamai and iBeam.

Cat. D. Internal data-buses, such as system buses in Personal Computers enabling the internal data transfers.

Cat. E. Asset Infrastructures

Cat. F. Access Device Infrastructures

Cat. G. Back-end Information Network Infrastructures

BootLink The Consumer activating the simple BootLink software starts the Access Device deployment process in order to gain access to the Our World Live's Consumer Access System and is typically specific to the infrastructures it is installed on, such as an URL for allowing the Consumer to enter the Consumer Access System over the World Wide Web.

Front-end Human The User Interface (UI) to Our World Live's Consumer

Interface (FHI) Access System technology enables Asset Providers to provide and control their Asset Offerings and the Consumer to access them. In various embodiments of the invention, software is object oriented and dynamically assembled to support the specifications of various Access Device and Asset Offerings. In various embodiments, the Front-end Human Interface is automatically deployed both as a graphical user interface as well as a user interface without graphics, based on settings of, for example, the Access Device capabilities or the Consumer preferences.

Asset Access Interface Enables Asset Provider to connect their Assets to the Consumer Access System.

Object Storage Stores Front-end Human Interface Cores (FHIC), Asset Device Functionality Objects, Asset Functionality Objects and Back-end Information Network Functionality Objects of the Front-end Human Interface (FHI).

Front-end Human Comprises common interface software objects, becomes

Interface Core (FHIC) dynamically part of a given Front-end Human Interface and is used for the deployment of a fully functional Front-end Human Interface. It can also advantageously include part of or all of the software specific to a single Access Device hardware, platform or operating system.

Back-end Information Software object, residing in the Object Storage, becomes

Network Functionality dynamically part of a given Front-end Human Interface and

Object enables Back-end Information Network functionalities

Asset Functionality Software object, residing in the Object Storage, becomes

Object dynamically part of a given Front-end Human Interface and enables Asset Device specific functionalities to the Back-end Information Network such as control functions of a specific Video Cassette Recorder.

Access Device Software object, residing in the Object Storage, becomes

Functionality Objects dynamically part of a given Front-end Human Interface and enables specific functionalities of a given Access Device to the Back-end Information Network and therefore making those functionalities accessible using the Front-end Human Interface, deployed on this Access Device.

User Interface The Front-end Human Interface software program is the User

Interface to Our World Live's Consumer Access System technology, and is deployed both as a graphical user interface as well as User Interface without graphics.

OWLed Asset An OWLed Asset is the Offering of a single Asset such as a single event, for example the transmissions from a football game, using Our World Live's Consumer Access System technologies. In contrast to a typical television broadcast, where the Consumer only can see one picture, which is live mixed out of the available cameras, an OWLed Asset transmits the output of all available cameras in the station to the Consumer.

Window The basic component of the Front-end Human Interface being displayed on the Consumer's Access Devices' Screen, enabling the Consumer to interact with the Consumer Access System.

Companion Window Window-type of the Front-end Human Interface software application. The main Window for navigation and control of one or more Asset Offerings of one or more Asset Providers, such as displaying a map of a single OWLed football event showing all available camera angles for navigation and control.

OnScreen Window Window-type of the Front-end Human Interface software application. The main Window for accessing a single OWLed Asset in the Highest available Detail, such as displaying video in highest available resolution and quality.

High Detail (HD) The highest level of detail that Asset Offerings are provided in, typically displayed in OnScreen Windows, such as videos displayed in highest the available resolution.

Low Detail (LD) A low level of detail that Asset Offerings are provided in, typically displayed in Monitor Windows, such as videos displayed in low resolution.

Monitor Window Window-type of the Front-end Human Interface software application. Multiple Monitor Windows for displaying several Assets with less detailed information, such as multiple videos in low resolution.

Display The part of a given Access Device hardware dedicated to display information. For displaying its information the Front-end Human Interface is able to use an unlimited number of Displays connected to the Access Device on which it is executed.

Screen The area on a given Display, effectively available for displaying information.

Screen Layout The tools Invisible Grid, Window Margins, Magnetic

Alignment Tool Borders and Auto Align are functionalities of the Front-end Human Interface and support the Consumer in arranging the Windows and "cleaning up" his or her Screen. The tools not only work on one Screen but across all Screens connected to a single Access Device and also across all Access Devices, which are part of one Virtual Access Environment.

Invisible Grid A functionality of the Front-end Human Interface and part of the Screen layout Alignment Tool. Once activated by the Consumer all windows snap into place relative to the grid, as soon as they are dragged.

Window Margins A functionality of the Front-end Human Interface and part of the Screen Layout Alignment Tool. Once activated by the Consumer all windows snap into places with selected margins to each other, as soon as they are dragged.

Magnetic Borders A functionality of the Front-end Human Interface and part of the Screen Layout Alignment Tool. Once activated by the Consumer all windows snap into place relative to each other, as soon as they are dragged.

Auto Align A functionality of the Front-end Human Interface and part of the Screen Layout alignment Tool. Once activated by the Consumer all windows are resized and/or moved according to the Consumer's preferences.

Legacy System All information resources currently existing in an Enterprise such as mainframe and personal computers, information terminals, networks, databases, operating systems, application programs and all other forms of hardware and software that an Enterprise uses to perform its operations.

Enterprise A private or public entity such as a government, corporation, religious entity, home or individual that can enable access to its Assets through OWL's Consumer Access System, Virtual Access The Front-end Human Interface can span across multiple Environment (VAE) Access Devices, creating for the Consumer one single Virtual Access Environment in which the Consumer can freely layout the parts of the Front-end Human Interface across all Screens of the assimilated Access Devices.

Real-time Display All information displayed to the Consumer through the Front-end Human Interface, is dynamically provided by the Back-end Information Network (BIN). The actions needed to update all information are automatically executed by the BIN, whenever possible prior to a Consumer's request. Consumer actions in the FHI are executed by the BIN, which provides immediate input response to the Consumer, concurrent updates of the action's progress and finally the result.

Asset Availability The Back-end Information Network (BIN) dynamically

Information generates, updates and provides the Consumer in real-time with instant information regarding a specific Asset being available to the Consumer or not. The BIN is able to handle a variety of rules and definitions that can cause an Asset to be available or become unavailable to the Consumer which can be categorized as but are not restricted to:

Cat. A. Asset is available for Access

Cat. B. Asset is generally not available for Access, because (1) the Asset is switched off or offline, not active or connected, (2) the Asset is deactivated in the BIN, as no active service is provided, (3) one of the Infrastructure in use does not support access to the Asset Cat. C. Asset is specifically not available to the requesting Consumer, because (1) one of the Infrastructure in use has exceeded its limitations and can temporarily not support the Consumer's request, i.e. the maximum number of streaming server licenses is exceeded, (2) the Asset Provider does not deploy the needed Asset Type support for the Front-end Human Interface (FHI) specific to the Access Device in use, (3) the requested Asset and the Consumer's Access Device in use are not compatible, for example the Consumer's device is only capable of audio and the requested Asset provides video only, (4) the Asset is blocked to the requesting Consumer in the BIN and requires further Consumer action, for example Pay-per-view, deactivate Parental Guidance, set preferences to allow automatic connection, authenticate Consumer, (5) the Asset is blocked to the requesting Consumer in the BIN because of restrictions such as region codes, copyrights, export restrictions, legal or political reasons.

Asset Status Information The Back-end Information Network (BIN) dynamically generates, updates and provides the Consumer in real-time with instant information detailing a specific Asset's availability. The provided Status Information can be categorized as but is not restricted to:

Cat. A. Available Asset options related to the Consumer's current Access Device in use, such as available video resolution qualities and accessible video Broadcasting or Delivery infrastructures.

Cat. B. Available Asset options related to all Access Devices of the specific Consumer, which are known to the BIN and are (1) currently active part of the Consumer's current Virtual Access Environment, (2) currently active as Assets or (3) currently inactive/not available to the BIN Cat. C. Available Asset options for the currently active Consumer Authentication, such as Parental Guidance or Pay-per-view Cat. D. Next scheduled availability Cat. E. Next expected availability, for example based on statistical calculations on the current Infrastructure load, the Consumer can schedule an automatic connection once the Asset becomes available again.

Cat. F. Unavailability details as determined for determining the Availability Information Asset Profiling The Back-end Information Network (BIN) dynamically Information generates, updates and provides the Consumer in real-time with instant information detailing a specific Asset's profile in order to help the Consumer decide which Asset to choose. The supported Profiling Information can be based on but is not restricted to real-time calculations of current and historic Asset access statistics, such as Consumers with similar characteristics to those of the accessing Consumer (1) set in the preferences of the Front-end Human Interface (FHI) or (2) derived from usage profiles collected by the Consumer Tracking. In an example the Consumer is about to choose between 700 different broadcast TV channels. Based on his characteristic preference for Science Fiction the FHI highlights those channels, which are viewed by other Consumers with similar characteristics. The BIN sums up the total number of current Consumers matching the Consumer's characteristics and calculates their split among the watched TV channels. The FHI provides this number and percentage information along with the TV channels. In addition the FHI allows to sort the TV channels by the provided Profiling Information, enabling a meaningful ranking.

Dynamic Front-end All objects of the Front-end Human Interface (FHI) can be

Human Interface changed in the Back-end Information Network (BIN) by the

Program Update Asset Provider at any time becoming instantly available and can be dynamically updated to all FHIs in use.

Dynamic FHI Content All contents to be displayed by the Front-end Human

Update Interface (FHI) can be changed in the Back-end Information Network (BIN) by the Asset Provider at any time becoming instantly available and can be dynamically updated to all FHIs in use.

Codec, Data Codec Technologies for electronically coding and decoding data. Within Our World Live's Consumer Access System. The supported Codecs can be categorized as but are not restricted to Cat. A. Audio/Video Codecs, such as Real Networks Audio and Video Codecs, Microsoft Media Technologies, Apple QuickTime, Digital Video, IEEE 1394, MPEG and MP3

Cat. B. Data, Graphics & Text Codecs, such as PICT, CCITT, BMP, PDF, EPS, RDF, XML, SMIL, HTML, CSS, DOM Cat. C. Encryption Codecs, such as RSA, DES, Triple DES, CAST, IDEA and SSL Electronic Commerce Electronically enabled business transactions and processes.

Commerce Integration Our World Live's Consumer Access System enabling one or more Legacy Systems of one or more Enterprises to automatically and interactively participate in automated and collaborative Electronic Commerce processes. Turning the Enterprises' Legacy Systems into OWL'ed Assets enables combined and shared Asset Offerings of one or more Enterprises such as automatic and secure billing, invoicing, production planning, inventory forecasting, money transfers and revenue splitting.

Access Device Tracking Automatic monitoring and cataloguing of all Access Device transactions, such as usage, performance and Consumer interactions, that help build and maintain a dynamic Access Device specific profile.

Asset Tracking Automatic monitoring and cataloguing of all Asset transactions, such as usage, performance and Consumer interactions, that help build and maintain a dynamic Asset specific profile.

Consumer Tracking Automatic monitoring and cataloguing of all Consumer transactions, such as accessing Assets, using Access Devices and Interactions, that help build and maintain a dynamic Consumer specific profile.

Performance The Back-end Information Network continuously measures

Surveillance the performance throughout the whole Consumer Access

System and continuously surveys the overall end-to-end performance of all active connections (Access Device performance—Access Device Infrastructure performance—BIN performance—Asset Infrastructure performance—Asset performance). Dynamic Load-balancing The Back-end Information Network (BIN) performs its functions in truly parallel processes and thus is a fully multitasked environment. When using more than one server system or processor, in various embodiments, the BIN automatically balances its load by spreading its tasks throughout to the available computing resources. As an example, if the load is increased due to high demand on the Assets, to the point where the available resources reach their limits, by a simple addition of more server systems and their introduction to the system, the BIN automatically extends its processes and balances the overall load.

Adjusting to the needs and capabilities of the currently used Broadcasting or Delivery Infrastructure and the Consumers Access Device, in various embodiments the BIN also load-balances the tasks and functionalities requested by the Consumer. Based on end-to-end performance measuring the BIN dynamically balances the load between Access Device and its server systems. For example in case of a limiting Broadcasting or Delivery Infrastructure and or an Access Device with limited computing power, the BIN executes more functionality itself and advantageously delivers only the results to the Access Device of the Consumer. If the Broadcasting or Delivery Infrastructure is highly capable and the Access Device provides higher computing resources than available to the BIN, the BIN transmits more functionality to the Access Device, where execution performance is now higher.

Localization, Automatic Various embodiments of this invention provide the

User Interface automatic Localization of the Front-end Human Interface

Localization based on User Interface and Country Conventions. The Asset Provider need only design one interface in one Localization and Our World Live's Consumer Access System automatically provides all other Localizations.

User Interface The rules and definitions for Localizations within Our World

Conventions Live's Consumer Access System describing and containing the Script Behavior, Interface Layout and Interface Behavior for one or more countries, languages or cultures.

Script Behavior The rules and definitions for Localization within Our World Live's Consumer Access System describing and containing the behavior of a localized script can be categorized as but are not restricted to Cat. A. Roman, text written from left to right Cat. B. Arabic, text written right to left Cat. B. Asian, text written top to bottom Interface Layout The rules and definitions for Localizations within Our World Live's Consumer Access System describing and containing the composition of the localized Front-end Human Interface layout such as the orientation of objects within Windows, color schemes and Window shapes.

Interface Behavior The rules and definitions for Localizations within Our World Live's Consumer Access System describing and containing the behavior of a localized Front-end Human Interface such as responses to Consumer interactions.

Country Conventions The rules and definitions for Localizations within Our World Live's Consumer Access System describing and containing Alphabet, Language, Language Attributes such as date, time and currency formats for one or more countries, languages, or cultures.

DETAILED DESCRIPTION

The screen shot of FIG. 1A illustrates several features of various embodiments of the invention. The screen display (FIG. 1A) illustrates a Display of the Olympic games. In the largest Screen region 1A.01, a detailed real-time "OnScreen" view of the soccer game is shown in real time. A map showing the venue of the several games underway is shown in the somewhat smaller Companion Window Screen region 1A.06. The Consumer can interactively select which event will be shown on the OnScreen Window Screen region 1A.02 by moving the cursor on the Companion Window Screen region 1A.06. In the example shown, the stadium 1A.07 has been selected at which the game shown in region 1A.02 is being played. Also included in the screen display (FIG. 1A) are five smaller Monitor Window Screen regions 1A.09*a*, 1A.09*b*, 1A.09*c*, 1A.09*d* and 1A.09*e* which show five different events occurring in real time at five different venues at this Olympic game.

As described below, the Monitor Window Screen regions are also used to show the same game being displayed on the larger OnScreen Window Screen region 1A.02 from additional video cameras all typically located at different locations in the same stadium.

Figure 2B:
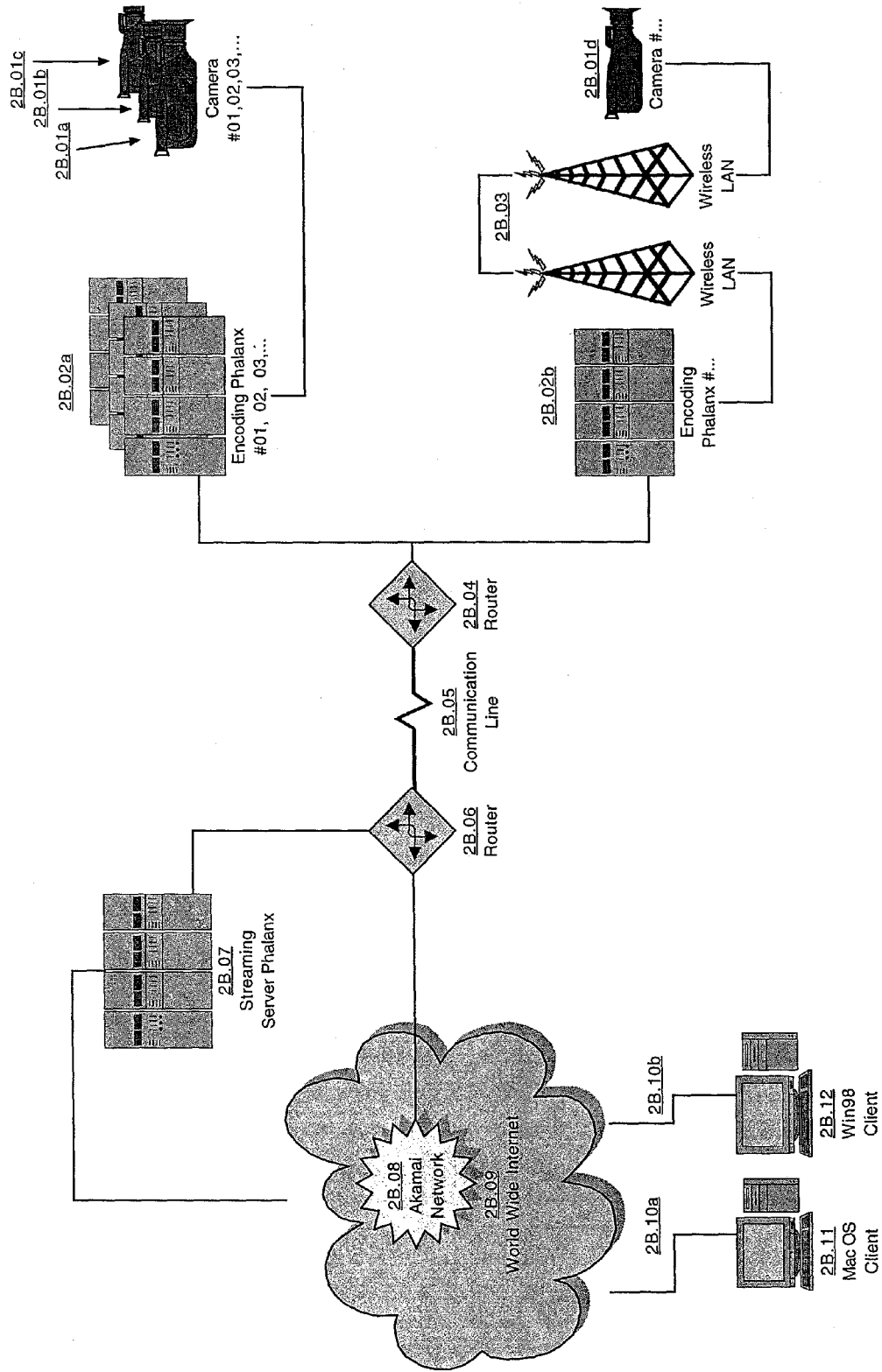
FIG. 2B is a simplified schematic diagram that shows an Access Asset System for Video Broadcasting over the Internet in accordance with various embodiments, FIG. 2C gives an abstract overview of Asset and Access Device types handled by the Back-end Information Network.
Figure 2C:
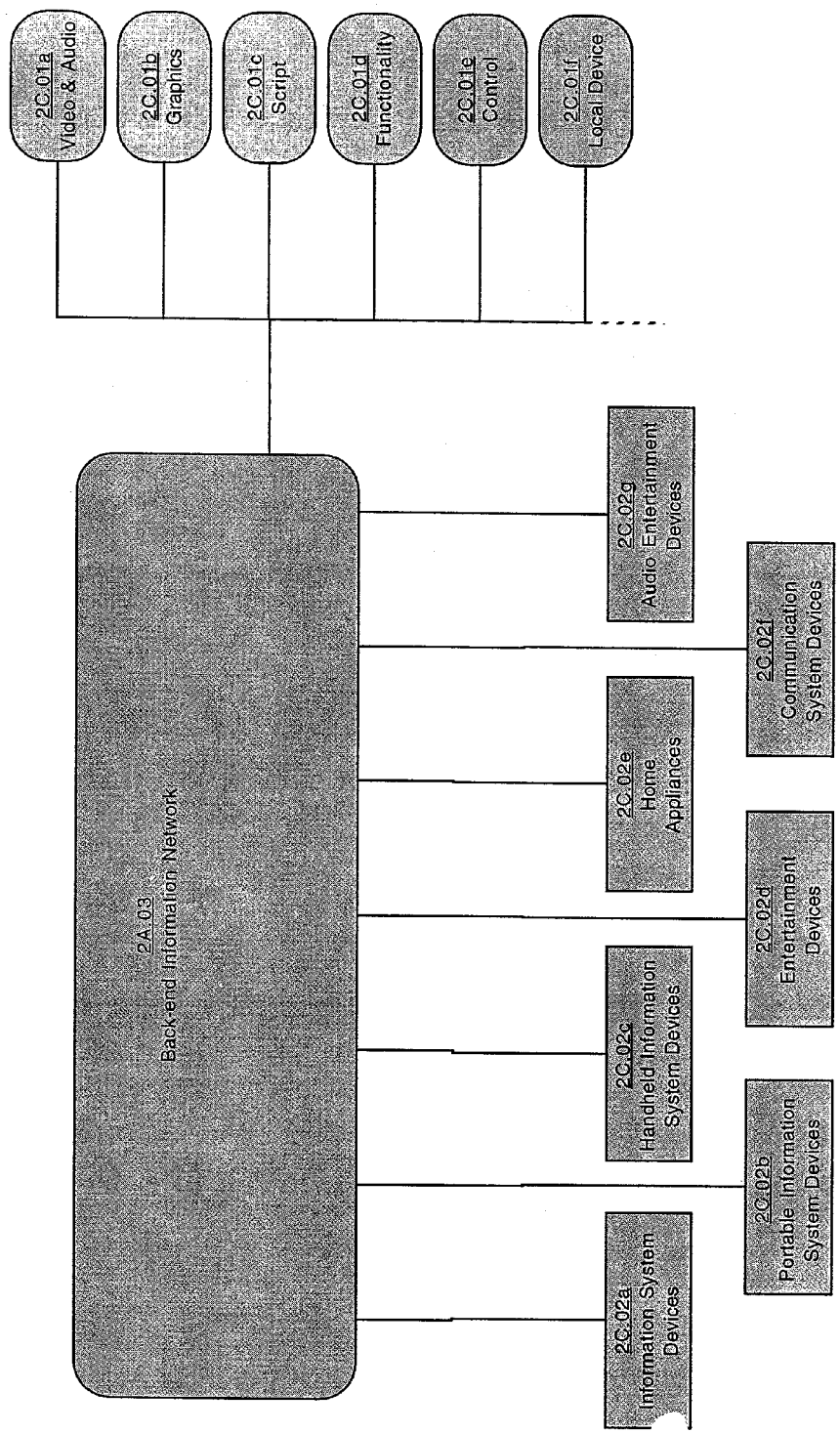
FIG. 2A shows an overview block diagram of a typical Consumer Access Systems.
FIG. 2D illustrates the general overview of Our World Live's Consumer Access System depicting the cooperation of the relevant parts.
FIG. 2E shows a schematic illustration of the structure of the Front-end Human Interface.
FIG. 2F illustrates the general overview of the Virtual Access Environment feature of Our World Live's Consumer Access System.
FIG. 2G shows a schematic illustration of the structure of the Asset Access Interface.
Figure 2D:
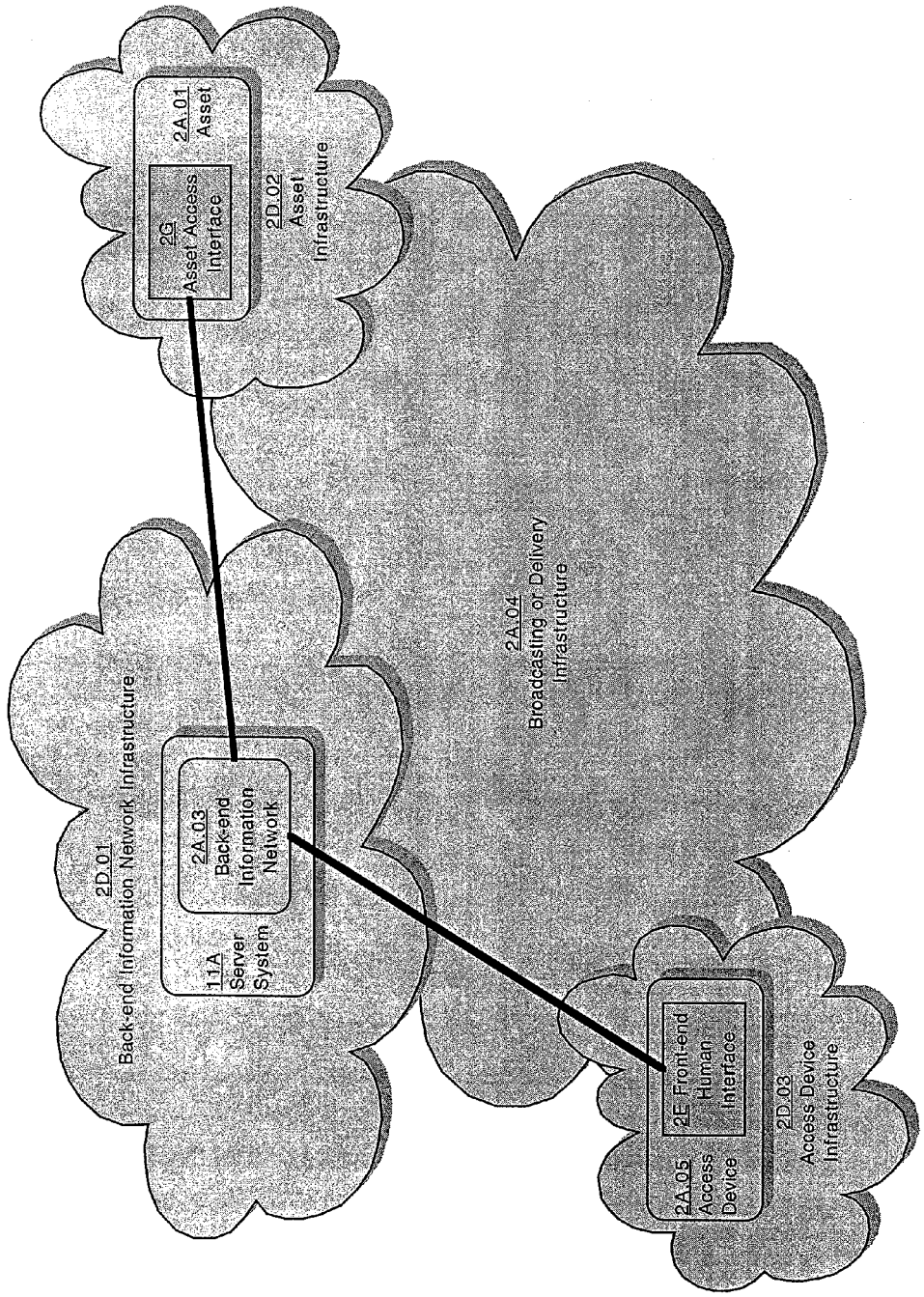
Figure 2E:
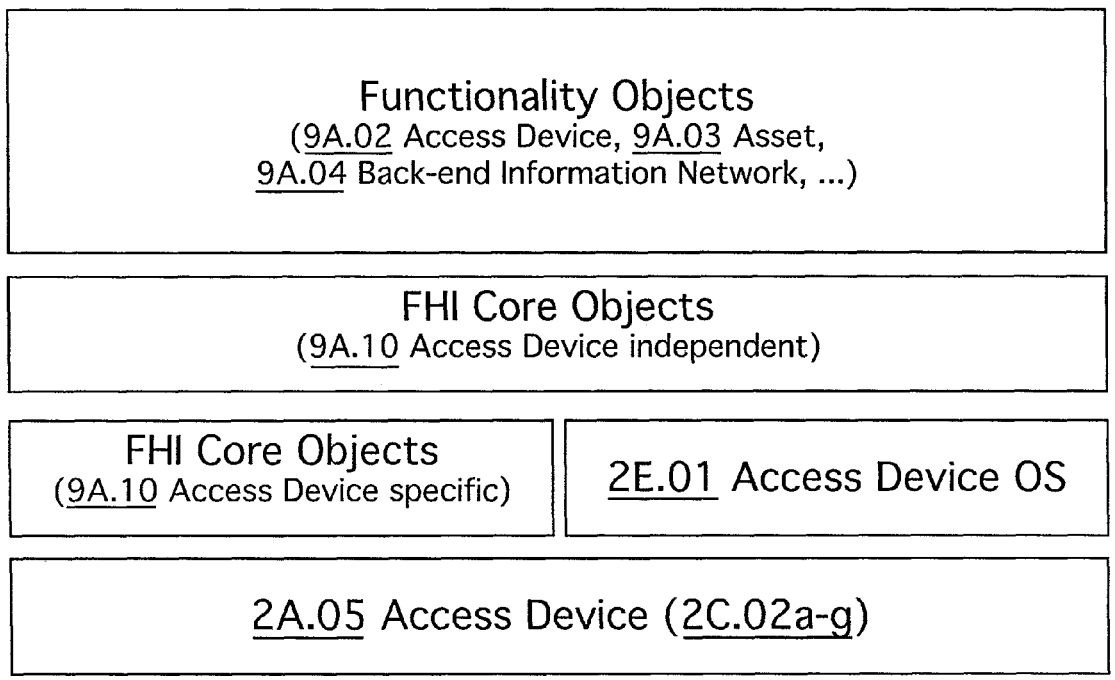

The overall Consumer Access System of various embodiments of the invention is shown in FIG. 2B. A plurality of video cameras 2B.01*a*, 2B.01*b* and 2B.01*c* are typically located at venues for sports events, theater events, musical events, or the like. Although for simplicity three cameras are shown, there can be a fewer or greater number of cameras depending upon the facility used for broadcasting.

These cameras 2B.01*a*, 2B.01*b* and 2B.01*c* are advantageously the identical cameras already being utilized for regular television broadcasting. As a result, various embodiments of this invention can be implemented world wide without a major investment in acquiring or installing video cameras. Rather, a parallel feed from each camera already used for television broadcasting is connected to a plurality of video compression encoders 2B.02*a* (labeled as Encoding Phalanx #01, 02, 03, . . . ). By way of example, cameras 2B.01*a*, 2B.01*b* and 2B.01*c* are cable connected to the encoders 2B.02 whereas a camera 2B.01*d* is connected by a wireless local area network (LAN) 2B.03 to another video compression encoder 2B.02*b*. Camera 2B.01*d* can, for example, be located at the same venue as cameras 2B.01*a*-2B.01*c* but can also be located at a different venue such as is illustrated in the screen display of FIG. 1A.

Figure 4A:
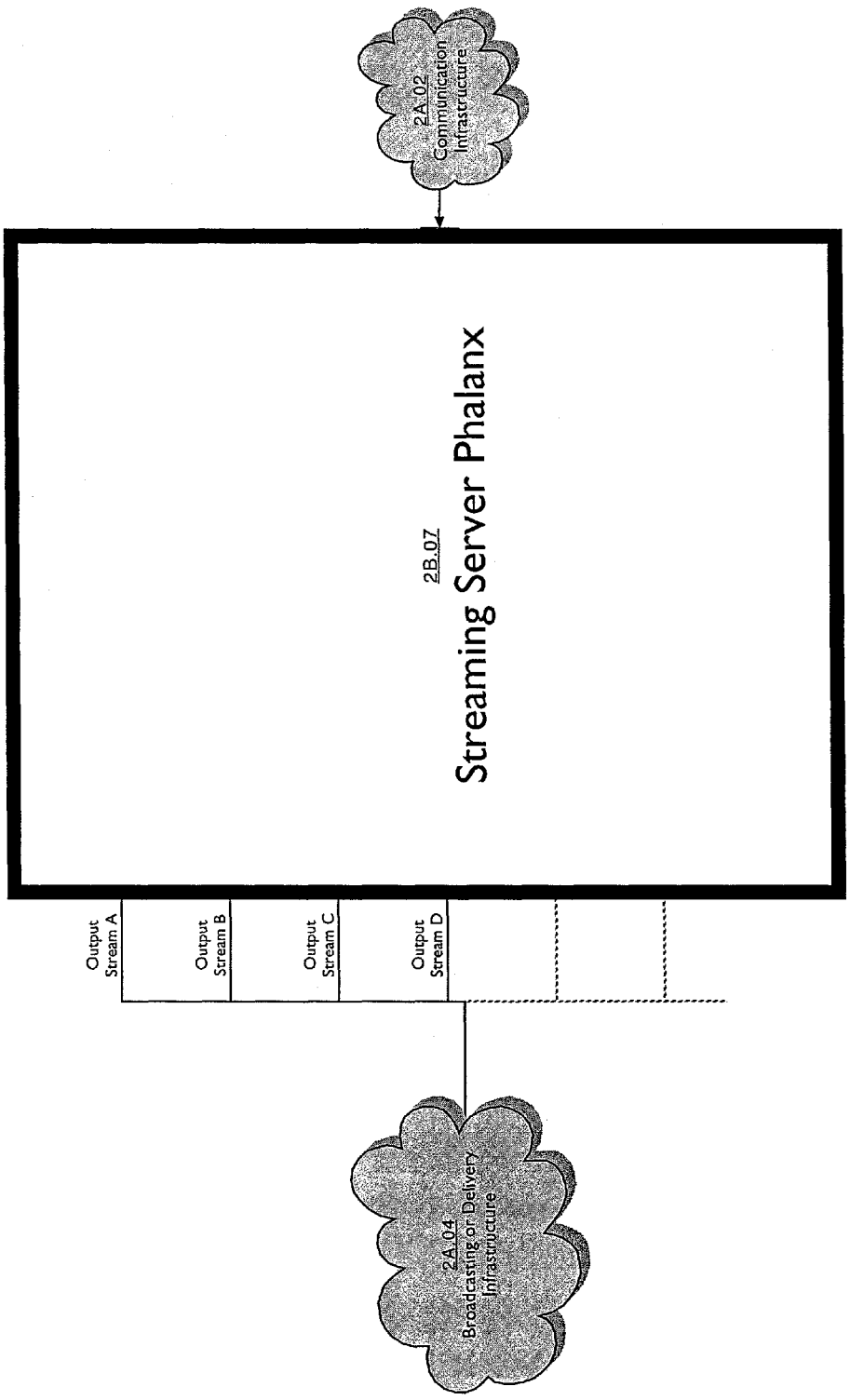
FIG. 4A shows an abstracted illustration of a Broadcasting or Delivery Infrastructure providing streaming services such as a Streaming Server Phalanx.
Figure 4B:
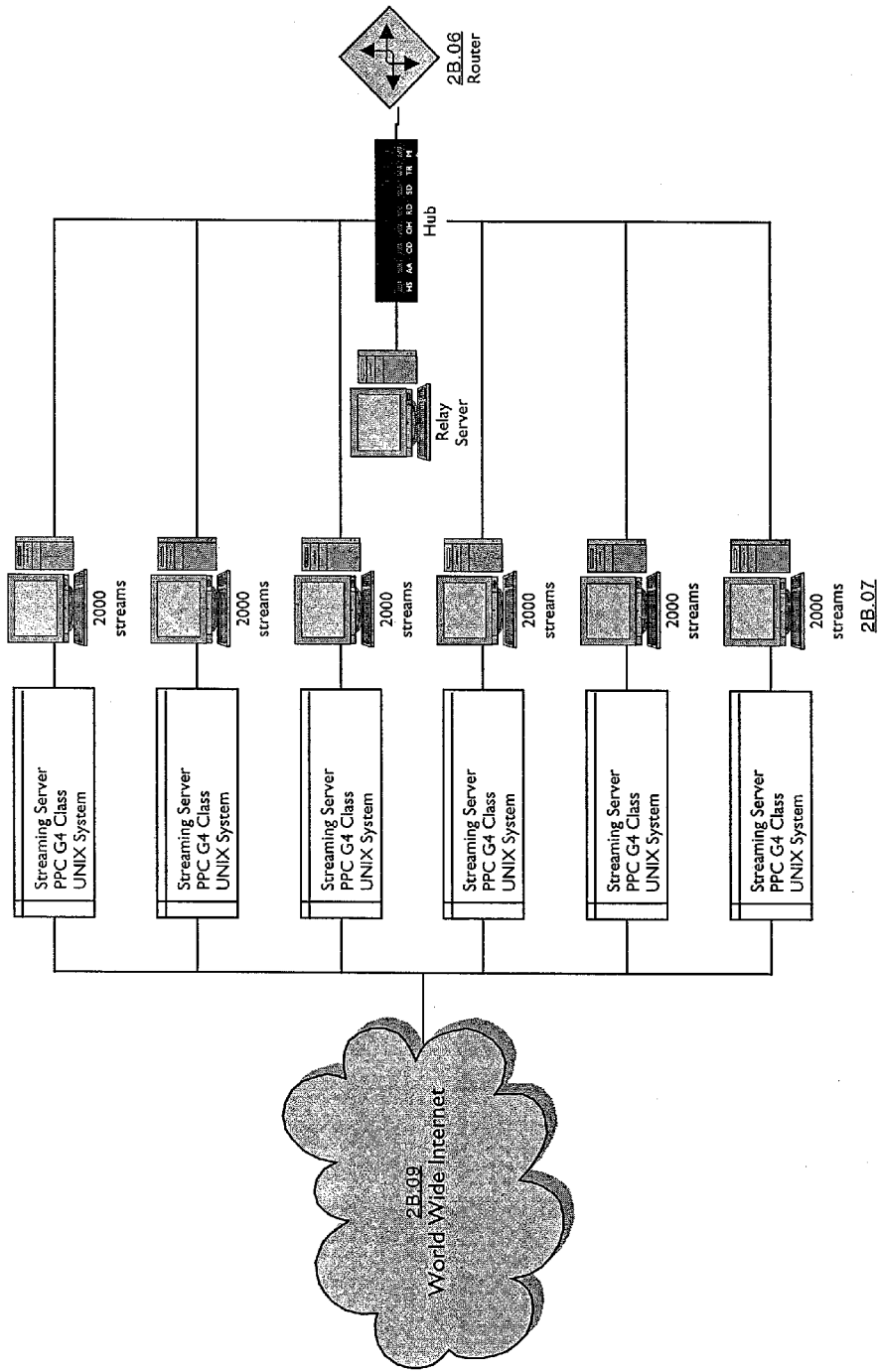
FIG. 4B illustrates a more detailed schematic diagram of a Streaming Server Phalanx, in which a plurality of streaming servers provide multiple camera video broadcasting to the World Wide Internet.

The outputs of the encoders 2B.02*a* and 2B.02*b* are routed by a router 2B.04 over a suitable communication line 2B.05 to router 2B.06 which connects the video signals to multiple streaming computer servers 2B.07 shown in detail in FIG. 4B. In the embodiment shown, the video signals are also supplied to separate a high bandwidth network 2B.08 such as is available from Akamai, Intervu or iBeam.

The individual subscriber client's Access Device is shown in the FIG. 2B as an Access Device of the type Information System Device such as a personal computer (PC). Shown are two different types of PC's 2B.11, 2B.12 connected at 2B.10*a*, 2B.10*b* in a normal manner to the world wide web or Internet 2B.09 by, for example, telephone lines, cable, or satellite. These PC's 2B.11, 2B.11 are connected by the world wide web 2B.09 to the streaming servers 2B.07 which as described below, contain OWL's Front-end Human Interface (FHI) software.

It will be further understood that additional video cameras 2B.01 and encoders 2B.02 are advantageously located at facilities located around the world so that the Consumer at the PC's 2B.11, 2B.12 can call up events occurring in real time all over the world. Thus, each of the encoders 2B.02 is adapted for the particular television signal being produced by the local video camera such as High Definition Television, NTSC, PAL, etc. so the video signals are viewable over the Internet on PC's located anywhere in the world.

In various embodiments of the invention, the user client initially connects to the streaming server (SS Phalanx) 2B.07 through an ISP and obtains portal Companion Window display of the content Companion on the Consumer's Access Device 2B.11 or 2B.12. Using this content Companion, the Access Device transmits pointers over the world wide Internet 2B.09 to the network 2B.08 which responds to the Consumers requests and transmits the appropriate video signals from the network 2B.08 over the world wide Internet 33 to the Access Device 2B.11 or 2B.12.

It will be understood that another embodiment of the present invention does not use a high bandwidth network 2B.08. Instead, the pointers produced at the Access Devices 2B.11, 2B.12 would be directly transmitted over the Internet 2B.09 to the streaming servers 2B.07 and these servers would supply the video signals to the Consumer's Access Devices 2B.11, 2B.12 via the Internet 2B.09.

Figure 3B:
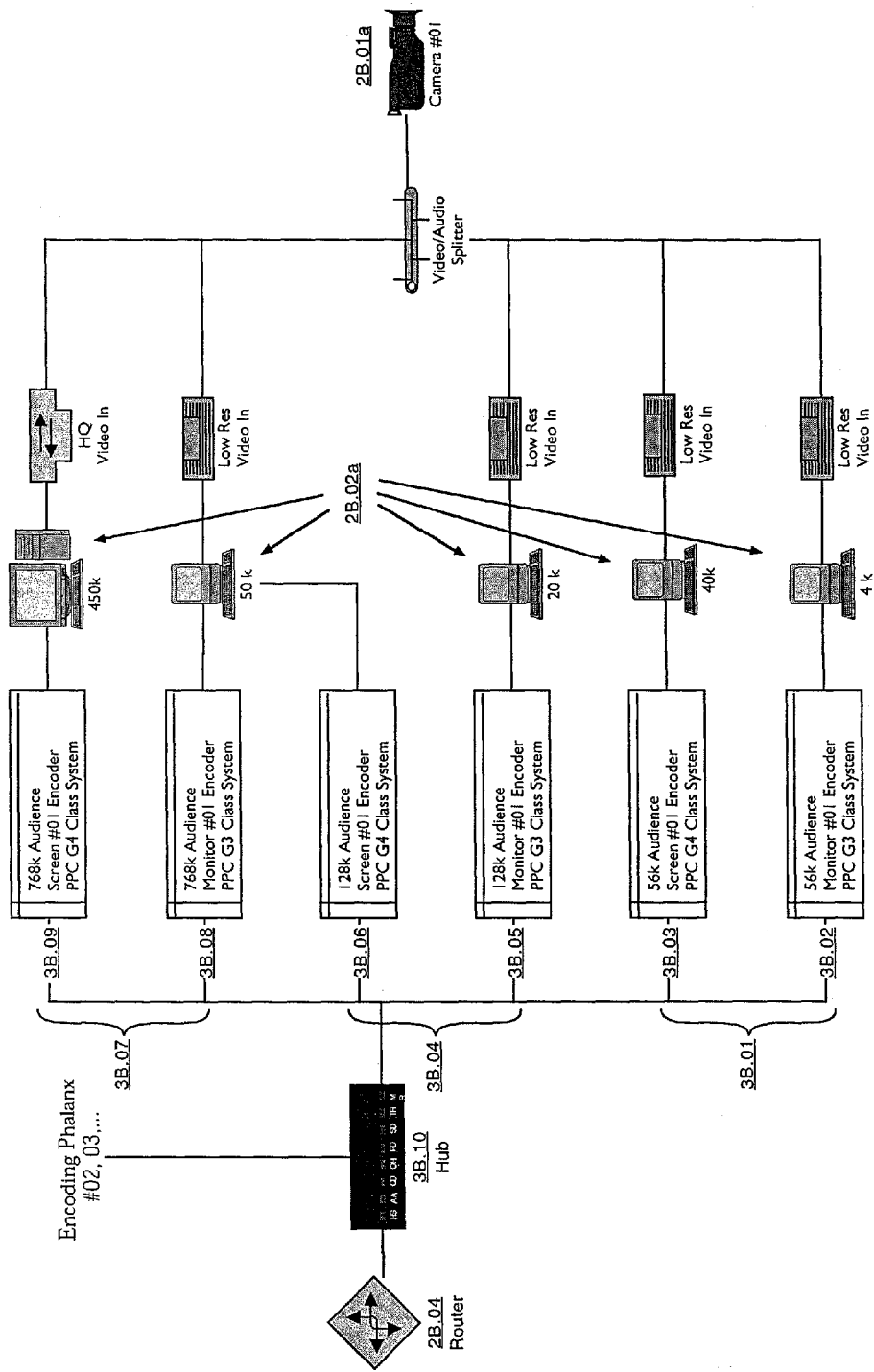
FIG. 3B is a more detailed schematic diagram shown this manner in which the Asset Infrastructure encodes the video signals for several different internet delivery channels in various embodiments.

A detailed block diagram of the encoder 2B.02 is illustrated in FIG. 3B. As shown, by way of example, encoder 2B.02a is connected to camera 2B.02a. The video signal supplied by the television broadcast camera 2B.01a is connected to a series of video compression encoders for supplying video signals of varying resolution and frequency bandwidths to the streaming servers 2B.07 of FIG. 2B via router 2B.04.

As shown, the compression encoders advantageously provide a high resolution output and a low resolution output for a plurality of Internet delivery channels. Thus, the lowest bandwidth channel 3B.01 for a 56K modem includes a high 40K resolution channel 3B.03 and a low 4K resolution channel 3B.02 for the video signal from camera 2B.01a. Similarly, the next higher or 128K bandwidth channel 3B.04 includes a 50K high resolution channel 3B.06 and a low resolution channel 3B.05 for the video signal from camera 2B.01a. The highest bandwidth channel 3B.07 is designed to supply a 768K bandwidth channel with a high resolution 45K channel 3B.09 and a low resolution 50K channel 3B.08 from camera 2B.01a. Referring to FIG. 1A, depending upon the capacity of the Internet connection to the Access Device 2B.01, 2B.02, the low resolution channel will be used to provide the Monitor Windows 2B.09a, 2B.09b, 2B.09c, 2B.09d and 2B.09e and the high resolution channel will be used to provide the OnScreen Window 1A.01. As a result, each Access Device, whether it has only a 56K modem or is supplied over a 768K DSL service (or higher in the future) is able to have simultaneous viewing of a high resolution real time video in the OnScreen Window 1A.02 and a plurality of low resolution real time video in the Monitor Windows 2B.09a, 2B.09b, 2B.09c, 2B.09d and 2B.09e.

Although the specific embodiments described include a single high resolution OnScreen Window, other embodiments of the invention provide one or more additional high resolution channels depending upon the bandwidth of the Broadcasting or Delivery Infrastructure in use and the effective Screen size of the Access Device's Display. Thus, one such embodiment provides a pair or more of side-by-side OnScreen high resolution Windows as well as plural low resolution Monitor Windows.

Figure 5A:
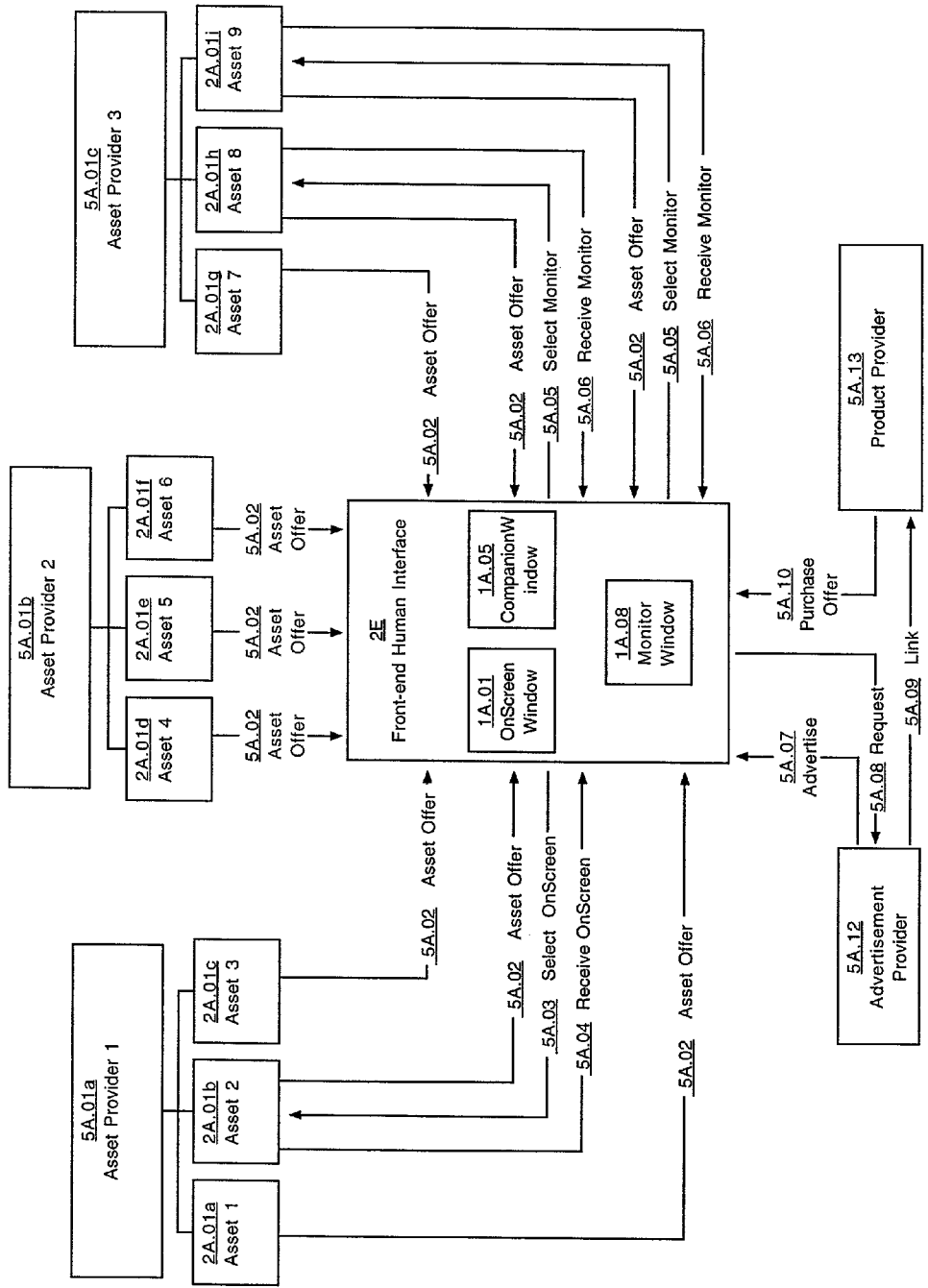
FIG. 5A is a block diagram illustrating providing a Consumer access to a variety of available Asset Offerings from Asset Providers around the world.
Figure 6A:
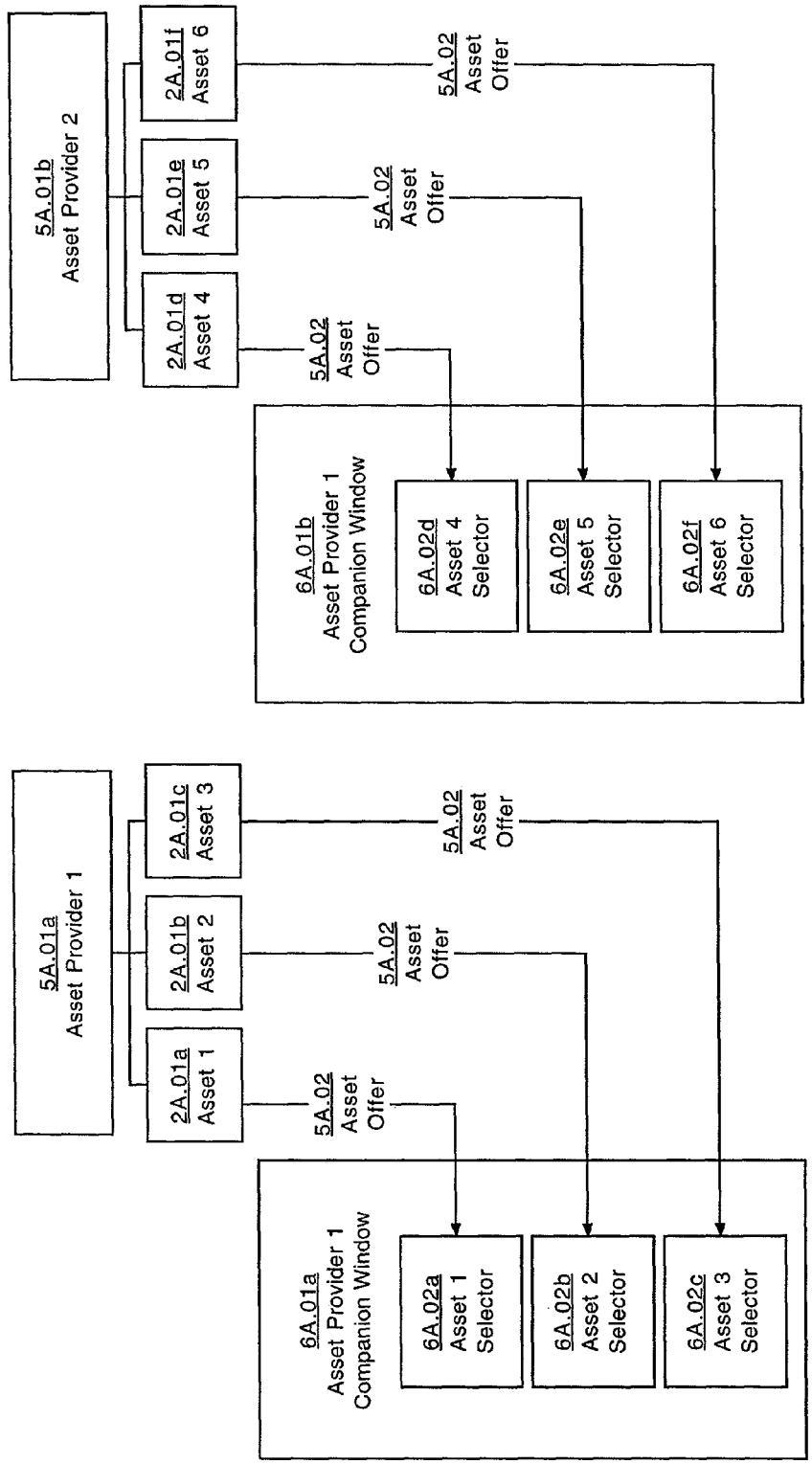
FIG. 6A illustrates the manner in which the combined Asset Offerings of several Asset Providers is presented in an easy to understand and easy to use way.
Figure 7A:
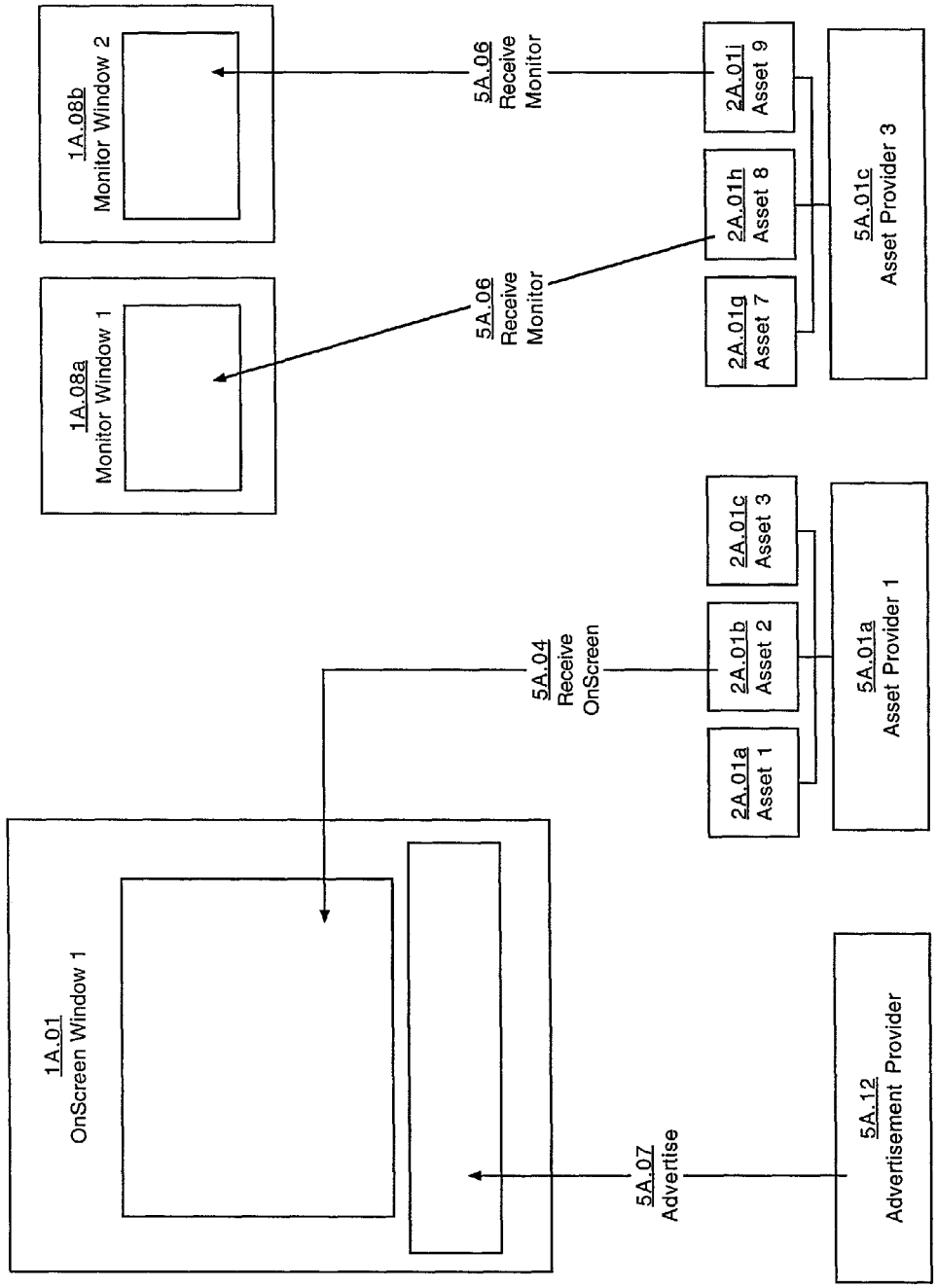
FIG. 7A illustrates providing the Consumer with the ability to stay tuned to the Asset Offerings of multiple Asset Providers at the very same moment, without losing track of any of them.

The manner in which a plurality of Asset Providers around the world are connected in various embodiments of the invention to supply Access Devices 2B.11 or 2B.12 is illustrated in the block diagram of FIG. 5. Shown are three Asset Providers 5A.01a/b/c, e.g., ABC, Fox, NBC and CBS which own or control the television cameras 2B.01a-d shown in FIG. 2. Some of the main features of this interface are: (1) all available video channels are presented to the Consumers Access Devices; (2) each Consumer can interactively select at any time any one channel as the high resolution "OnScreen" Window 1A.01; (3) each Consumer can interactively select multiple channels to provide the Monitor channels 1A.09a, 1A.09b, 17, 1A.09c, 1A.09d and 1A.09e of FIG. 1A; and (4) the system delivers a channel interactive advertisement that links the Consumers request with an electronic commerce service.

Figure 3C:
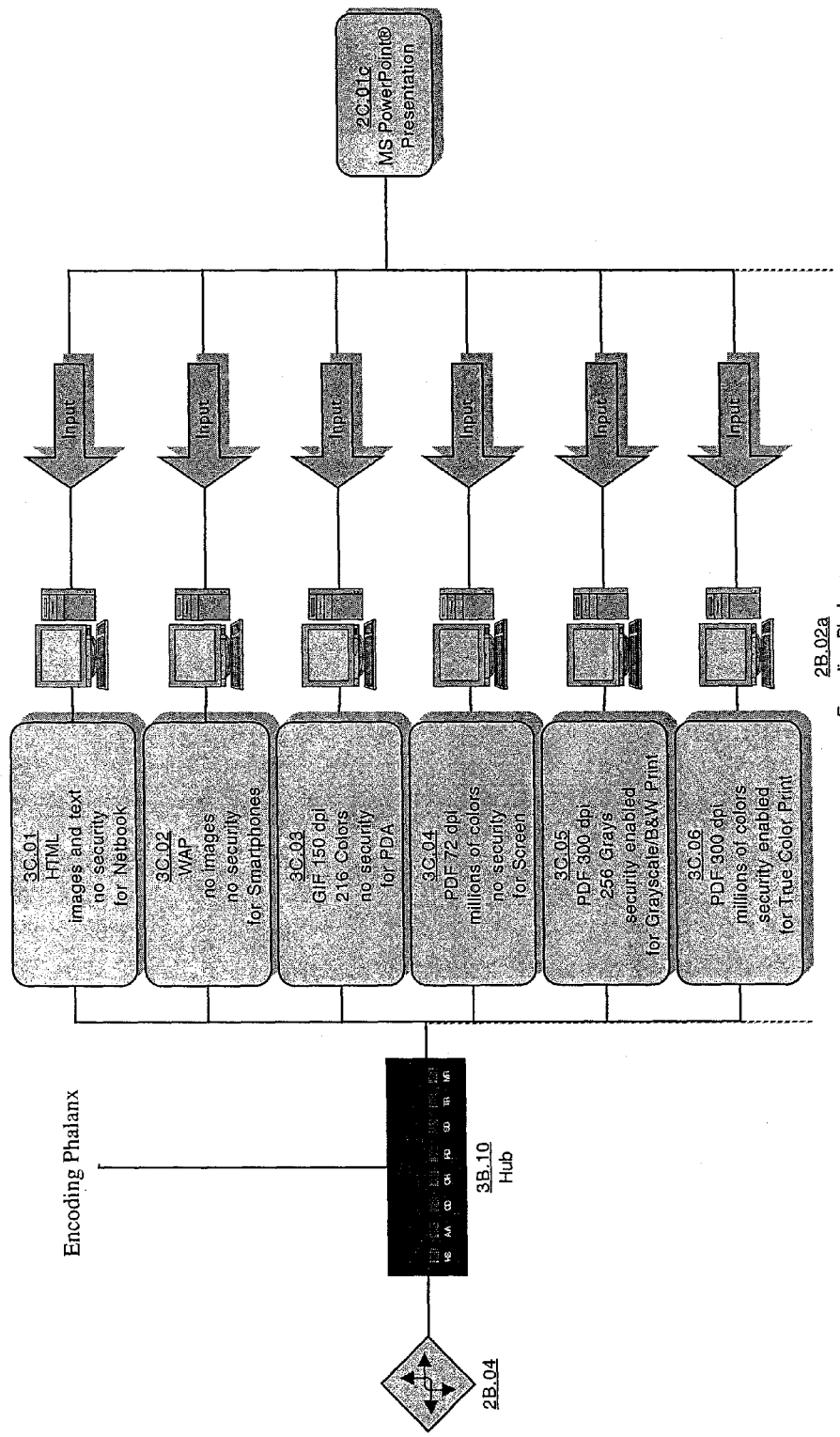
FIG. 3C is a more detailed schematic diagram shown this manner in which the Asset Infrastructure encodes a MS PowerPoint Presentation for several different Broadcasting or Delivery Infrastructures and Asset types in various embodiments.
Figure 8B:
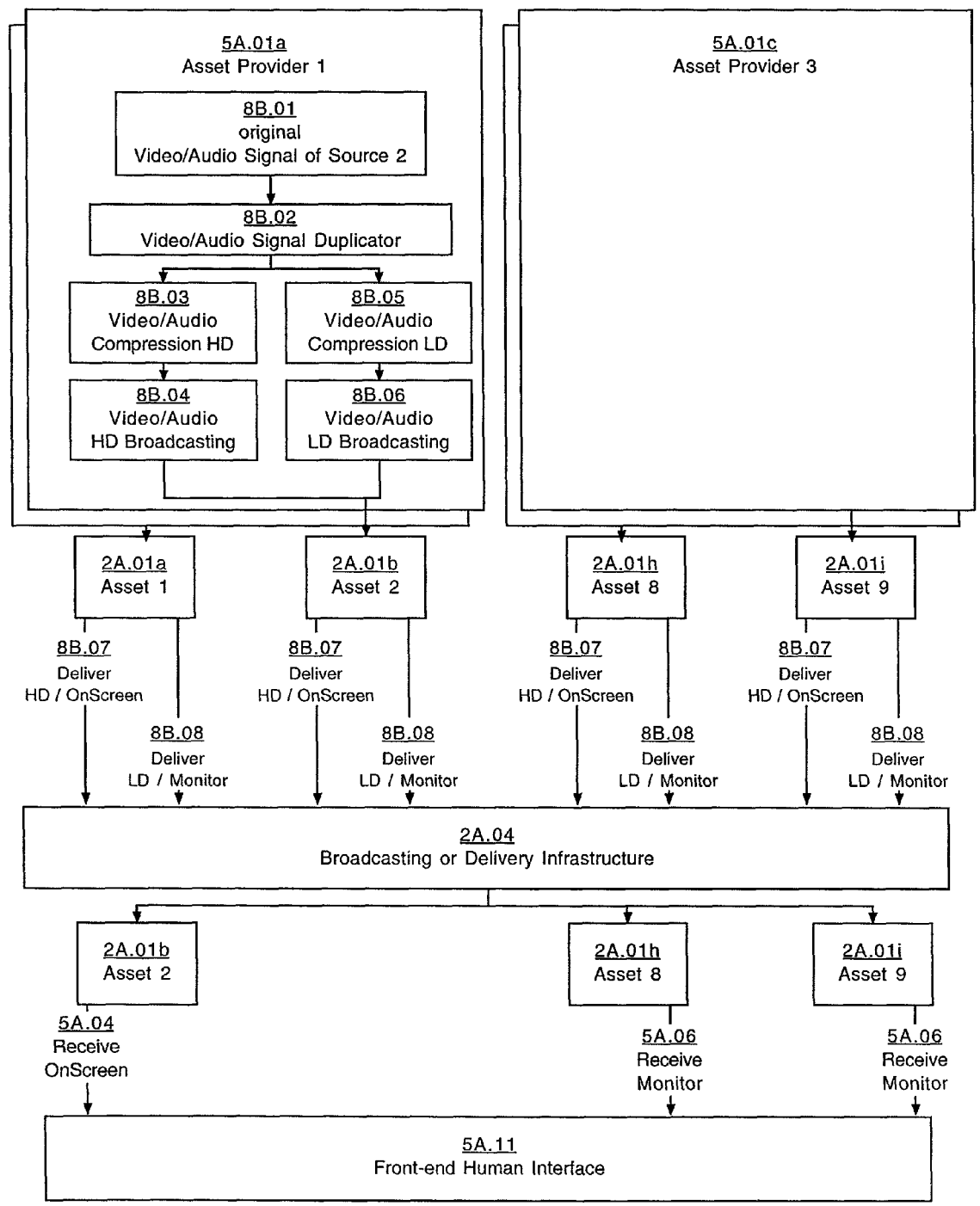
FIG. 8B illustrates enabling the Front-end Human Interface to simultaneously access multiple Asset Offerings while optimally using the available bandwidth of the Broadcasting or Delivery Infrastructures in use for transmitting the data.
Figure 14A:
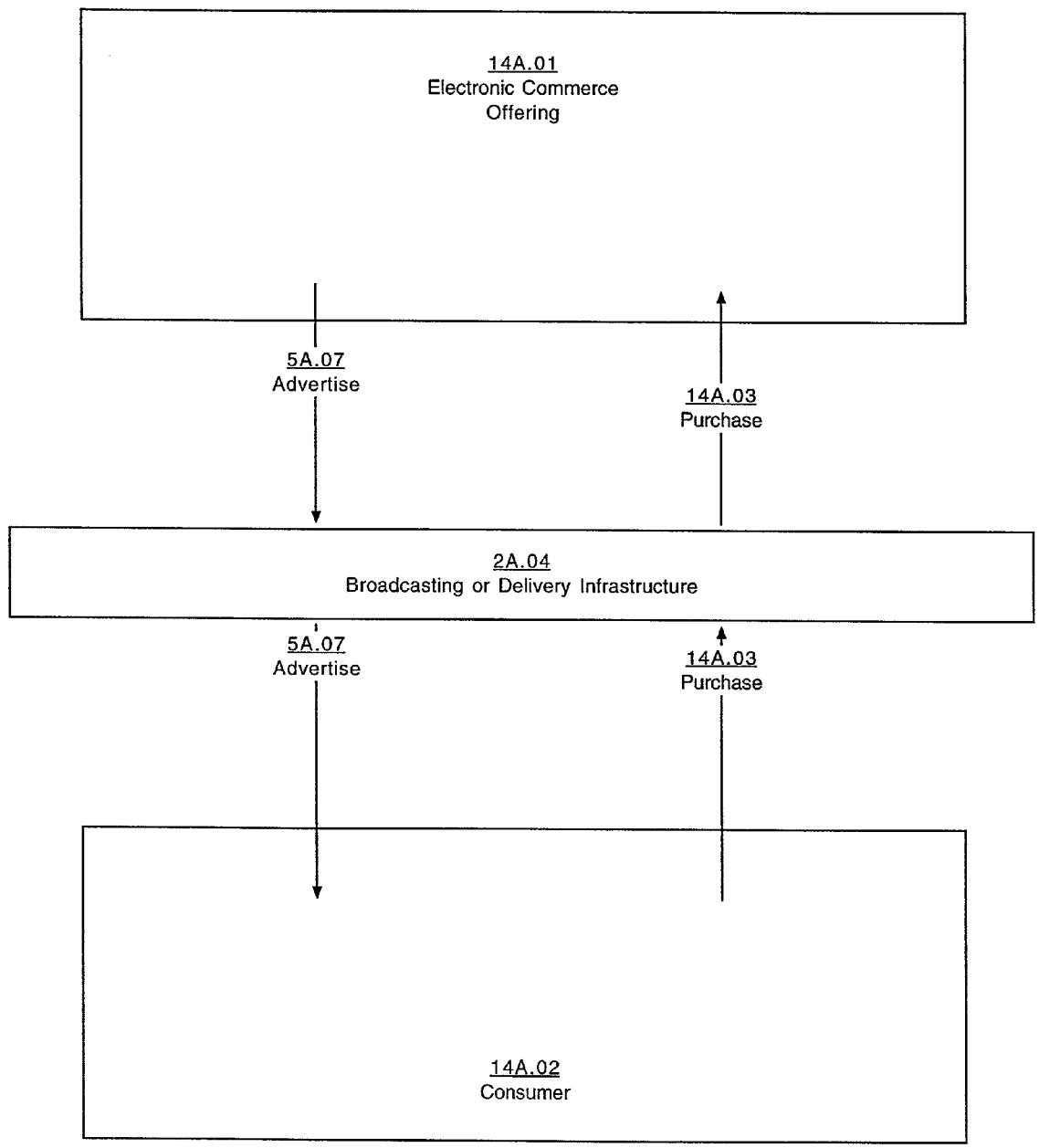
FIG. 14A shows an abstract illustration of Electronic Commerce.
Figure 14B:
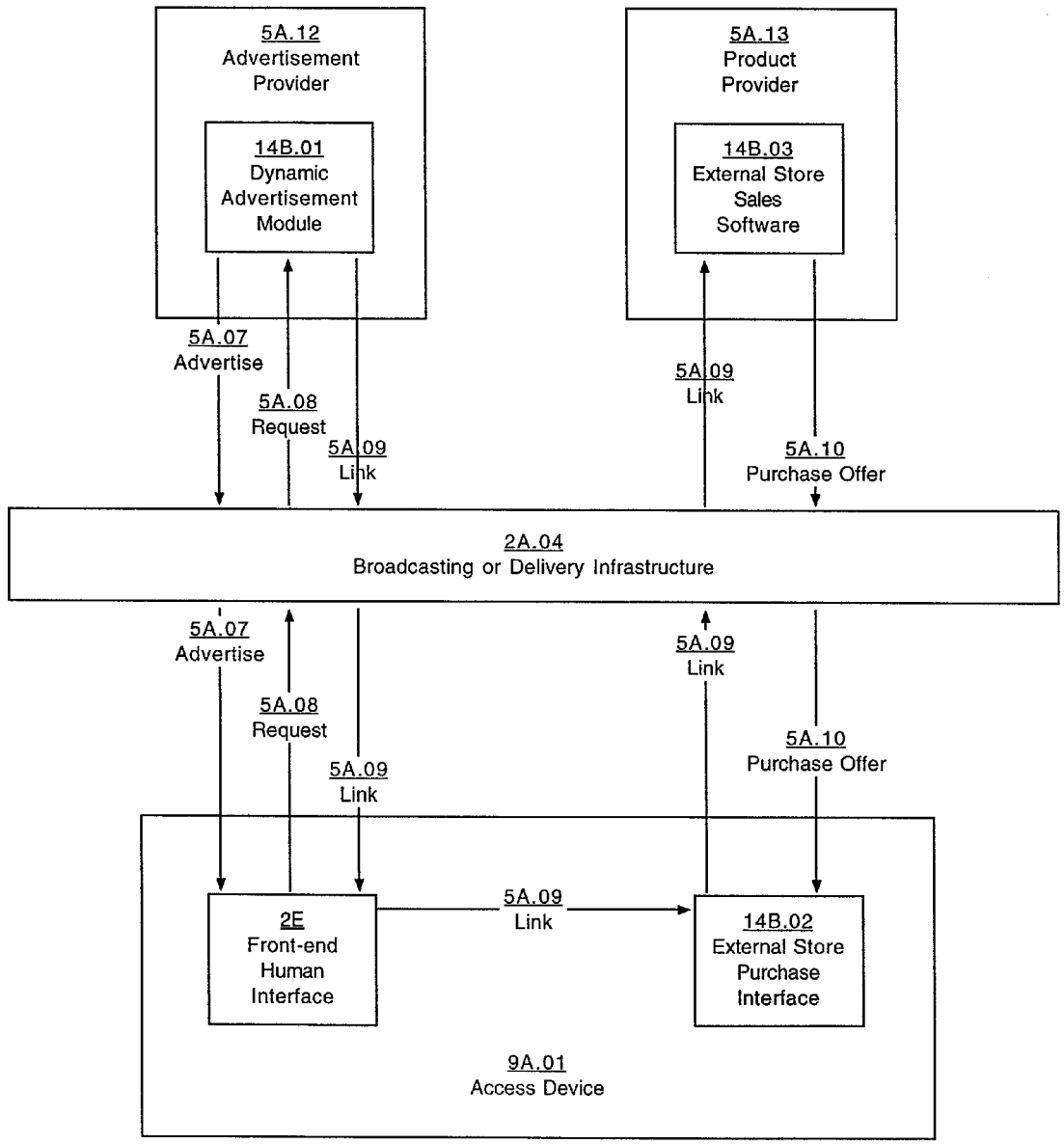
FIG. 14B illustrates how one embodiment of the invention delivers advertisements Offerings to the Consumer separate but along with the chosen channels, forwarding a Consumers purchase request to an external Product Provider, which is taking over and finalizing the sale outside the Consumer Access System.
Figure 14C:
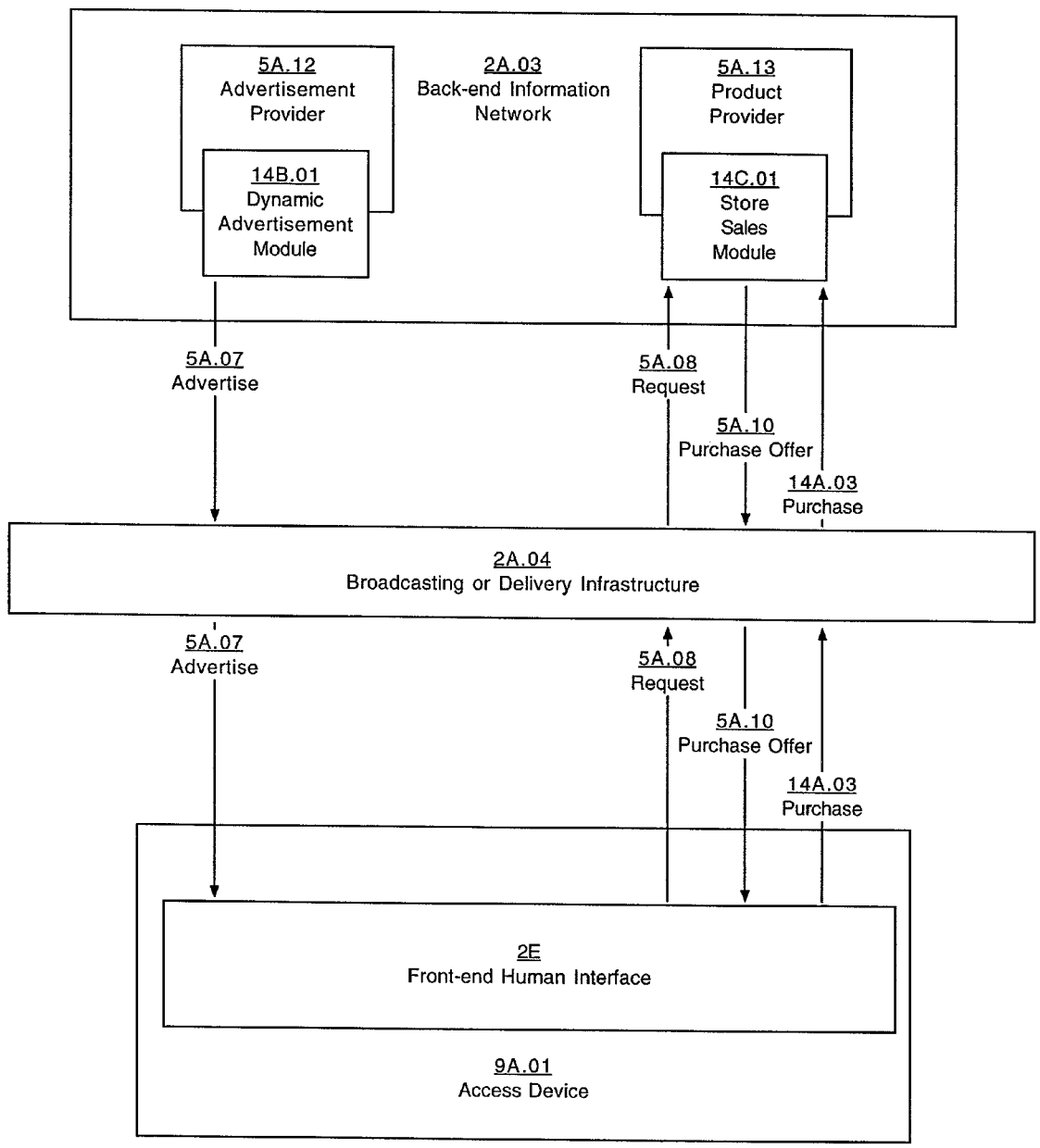
FIG. 14C illustrates an embodiment of the invention handling transactions of the Electronic Commerce.
Figure 14D:
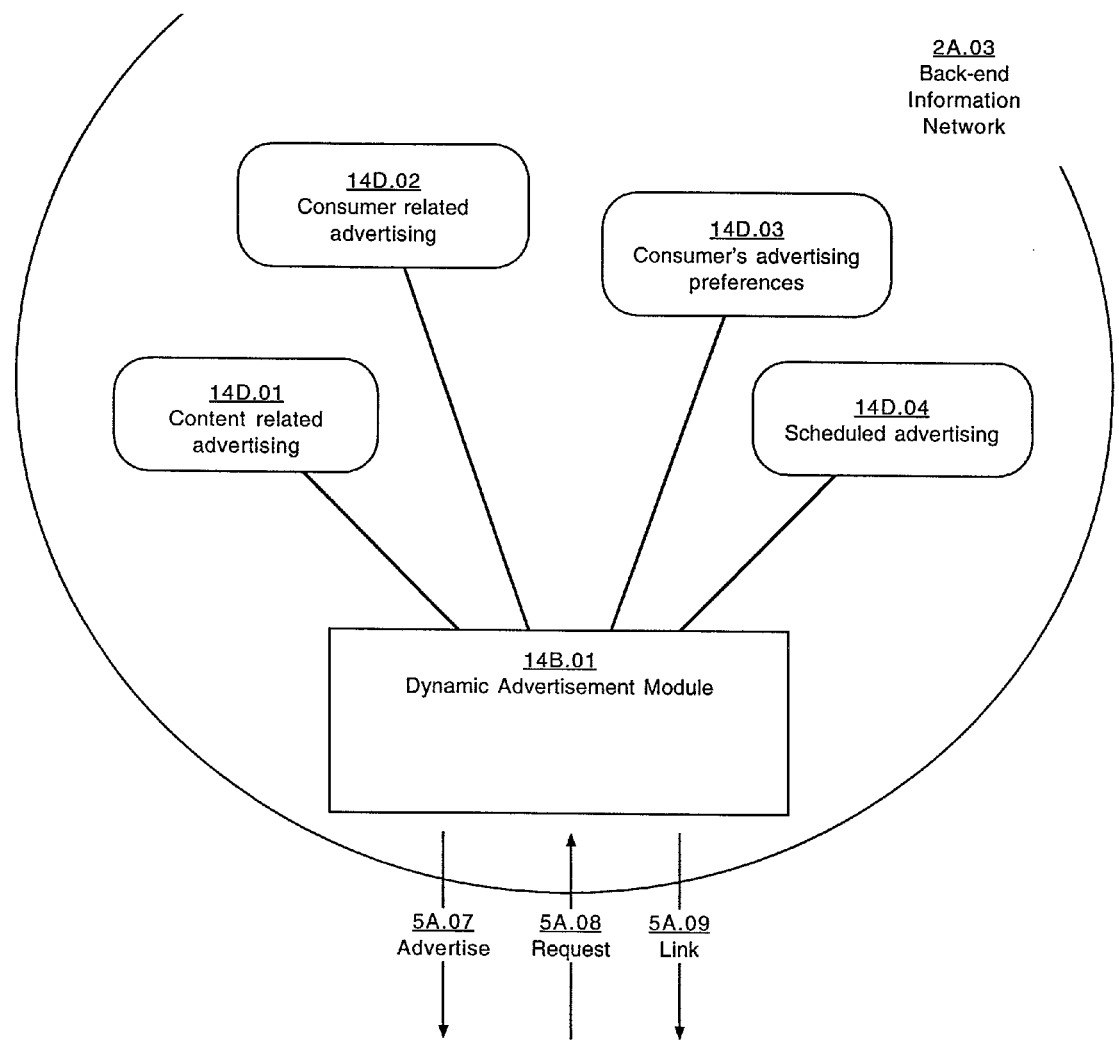
FIG. 14D shows the dynamics the Back-end Information Network handles in its Dynamic Advertisement Module.

The function of several of the different blocks in this system diagrams and flow charts are described below:

1A.01 is the OnScreen Window type, fully interactive, continuously updated, corresponding with the other Windows 1A.01, 1A.05, 1A.08a/b, 12A.07;

1A.02 is the high-detail content displayed in the OnScreen Window (1A.01);

1A.03 indicates the area for displaying advertising of any kind;

1A.04 indicates the Personal Video Functionalities of the OnScreen Window (1A.01). This area includes several buttons such as "Play", "Stop" "Fast Forward", "Rewind", "Volume", "Menu" and so on;

1A.05 is the Companion Window type;

1A.06 depicts the content of the Companion Window;

1A.07 is a highlighted Asset Offer in the Companion Window (1A.06);

1A.08 indicates the Monitor Window type;

1A.08a, b, c, . . . are the various Monitor Windows;

1A.09 is the content, displayed in the Monitor Window;

1A.09a, b, c, . . . indicate various content that is displayed in the Monitor Windows;

1G.01 is an example of a Script Asset type;

1G.02 Is an example of a Data Control type for the Companion Window;

1G.03 is an example of the Forms type;

1G.04 is the Master Companion representing the link to the Companion Window type (1A.05). The Master Companion is a Companion Window itself;

1H.01 shows two OnScreen Windows displaying different Assets: A movie (with related Advertising) and a data worksheet;

1H.02 is an example of the Data Worksheet type;

1H.03 is a content example for the Companion Window (1.A.05), enabling access to a sample of Home Entertainment Devices;

1H.04 is a bigger version of the Monitor Window type hosting the control panel for a Home Entertainment Device;

1J.01 is an example content for the Companion Window (1A.05), showing a map with multiple cameras;

1J.02 is a smaller version of the Companion Window type (1A.05);

1K.01 is the Monitor Window type for a display of a Palm Pilot 111C;

1K.02 indicates one solution for the Master Companion for the Palm Pilot IIIC;
1K.03 shows the OnScreen Window type containing a Data Worksheet;
1L.01 indicates the Companion for a Handheld Device;
1L.02 is the Monitor Window type for a Handheld Device;
1L.03 is an OnScreen Window, showing a Data Worksheet;
1L.04 is a Monitor Window showing Real-Time Stock Quote Information, including an Input Form to request specific Stock Quotes;
1L.05 Shows an OnScreen Window, displayed in 90° counter-clockwise rotation;
1L.06 indicates the area for displaying advertising of any kind on a Handheld device;
1M.01 Is a Monitor Window to remote control an Asset: your home VCR;
1N.01 is an OnScreen Window type for Access Devices running the EPOC operating system, such as the Ericsson R380 cellular phone or the Nokia 9210 Communicator;
1N.02 is a Monitor Window type for Access Devices running the EPOC operating system;
1N.03 is a Companion Window type for Access Devices running the EPOC operating system;
1N.04 shows the area in the OnScreen Window for displaying advertising of any kind;
1N.05 Show various representation of the Monitor Window type for Access Devices running the EPOC operating system;
1N.06 Is a Monitor Window to remote control an Asset: your home VCR;
1P.01 Show the Companion Type window, depicting a map of an Olympic stadium with several cameras;
1P.02 Shows a Monitor Window type containing an Advertising Offer;
1P.03 Shows the OnScreen Window Type, displaying the "100 m Women's Final" camera video stream of a live sports event;
1P.04 Depicts the area for any kind of Advertising in the OnScreen Window (1P.03);
1P.05 Is a Monitor Window showing the "Long Jump" camera video stream of a live sports event;
1P.06 Is a Monitor Window showing the "Women's High Jump" camera video stream;
1R.01 Shows the Palm Pilot 111c Screen, containing a Master Companion and a Companion with a map. The map shows an Olympic stadium with several cameras;
1R.02 Shows an OnScreen Window type on a PC, containing the "100 m Women's Final" camera video stream of a live sports event;
1R.03 Shows a Monitor Window type on a PC, containing the "Women's High Jump" camera video stream of a live sports event;
1S.01 Shows a Companion Window type on a PocketPC, containing the map of an Olympic stadium with several cameras;
1S.02 Shows an OnScreen Window type on a PC, containing the "100 m Women's Final" camera video stream of a live sports event;
1S.03 Shows a Monitor Window Type on a PocketPC, containing the "Long Jump" camera video stream of a sports event;
1S.04 Shows a Monitor Window type on a PC, containing the "Women's High Jump" camera video stream of a live sports event;
1Y.01 is an OnScreen Window type for a Television Display or a large EPOC Screen;
1Y.02 is a Monitor Window type for a Television Display or a large EPOC Screen;
1Y.03 is a Companion Window type for a Television Display or a large EPOC Screen;
1Y.04 is one solution for the Master Companion for a Television Display or a large EPOC Screen;
1Z.01 is an OnScreen Window type for a Cellular Phone with EPOC-OS;
1Z.02 is another version of the OnScreen Window type for a Cellular Phone with EPOC-OS used for 16:9 format Films;
1Z.03 Indicates the area for Advertising;
1Z.04 is one solution for the Master Companion for a Cellular Phone with EPOC-OS;
1Z.05 is a Companion Window type for a Cellular Phone with EPOC-OS;
1Z.06 is a Monitor Window type for a Cellular Phone with EPOC-OS;
2A.01a-2A.01d Shows the Assets #1, #2 . . . ;
2A.02 Is the Communication Infrastructure;
2A.03 Represents the Back-end Information Network;
2A.04 is the Broadcast or Delivery Infrastructure;
2A.05 shows the Consumer's Access Device;
2A.06 is the Consumer's Local Asset;
2B.01a-2B.01d is the sum of the video content provided by a single original parallel video and/or audio signal from the Asset Provider 5A.01b;
2B.02a/b The Encoding Phalanx;
2B.03 A Wireless Transmission from LAN to LAN;
2B.04 A Router connecting to the next network;
2B.05 A Communication Line between two routers or networks;
2B.06 A Router connecting to the next network;
2B.07 The Streaming Server Phalanx;
2B.08 The Akamai Network as a worldwide delivery network;
2B.09 The Internet;
2B.10a/b The Internet Connection of the Access Device;
2B.11 A Computer running Mac OS as an Access Device;
2B.12 A Computer running Windows 98 as an Access Device;
2C.01a-2C.01f Categories of Asset types known to the Back-end Information Network;
2C.02a-2C.02f Categories of Access Devices known to the Back-end Information Network;
2D.01 Represents the Back-end Information Network Infrastructure;
2D.02 Represents the Asset Infrastructure;
2D.03 Represents the Access Device Infrastructure;
2E.01 Represents the Access Device Operating System;
2G.01 Represents a possible Operating System of the Asset
3A.01a-3A.01f Encoding specifications for various target types;
3B.01 Encoding Systems for the Audience with 56K bandwidth;
3B.02 Encoder Systems for Monitor #01 for 56K Audience, PowerPC G3 System;
3B.03 Encoder Systems for Screen #01 for 56K Audience, PowerPC G4 System;
3B.04 Encoding Systems for the Audience with 128K bandwidth;
3B.05 Encoder Systems for Monitor #01 for 128K Audience, PowerPC G3 System;
3B.06 Encoder Systems for Screen #01 for 128K Audience, PowerPC G4 System;
3B.07 Encoding Systems for the Audience with 768K bandwidth;
3B.08 Encoder Systems for Monitor #01 for 768K Audience, PowerPC G3 System;

3B.09 Encoder Systems for Screen #01 for 768K Audience, PowerPC G4 System;

3B.10 A Network Hub;

3C.01-3C.06 Various target encoding specifications for different media, different resolutions and different color capabilities;

5A.01*a/b/c* is the entity having the cameras 2A.01*a/b/c*/d/e/f/g/h/i (FIG. 2) and creating/transmitting Video and/or Audio content, i.e., ABC, FOX, CBS or any other party producing video and/or audio content i.e. a stadium having a Superbowl game or any other event to be broadcast or transmitted;

5A.02 represents the compression encoders explained in detail above and shown in FIGS. 3 and 8;

5A.03 indicates that the Consumer selects the content of choice he or she wants to see in the "OnScreen" Window;

5A.04 indicates receiving the broadcasted or delivered signal 8B.07;

5A.05 indicates that the Consumer selects the content of choice he or she wants to see in one of the Monitor Windows;

5A.06 indicates receiving the broadcast or delivered signal 8B.08;

5A.07 indicates that an advertisement is received in a predesignated separate displaying area within OWL's Font-end Human Interface (FHI) without interfering with or inhibiting the delivery of any content. The displaying method can be static (i.e. banner) or active (i.e. streaming video);

5A.08 indicates Consumer requests of further advertisement related actions, i.e. link 5A.09, by clicking on the advertisement displaying area;

5A.09 is the link by which the request of the Consumer is automatically and instantly passed together with other relevant information to a related entity 5A.13 by i.e. passing all needed information to the FHI (5A.11) so that it automatically connects to the Product Provider (5A.13), logs onto the External Store Sales Software (14B.03) and creates a purchase request from the Consumer;

5A.10 indicates a purchase offer caused by the addressed entity executing the respective action, i.e. transmitting the purchase offer created out of the purchase request over link 5A.09;

5A.11 is the Front-end Human Interface software program, embodiments preferably in QuickTime and in JAVA;

5A.12 is the Advertising Provider. It is as well the entity contracting for advertising space;

5A.13 Is the Product Provider where the advertised products can be purchased. (FIG. 14C shows the integration of such a Product Provider's Store into the Consumer Access System, FIG. 2D);

6A.01*a/b* Shows the Companion Windows of the Asset Providers, containing their Asset lists;

6A.02*a/b/c*/d/e/f indicates the Asset Selectors, each representing one

Asset (2A.01*a*-2A.01*i*) of the Asset Provider represented by the Companion Window that the Asset Selectors are incorporated in, incorporating two actions 12A.05 and 12A.06, fully interactive, continuously updated, corresponding with the other Windows 1A.01, 1A.05, 1A.08*a/b*, 12A.07;

8B.01 is the original signal from the single Video and/or Audio source, which can be output by a video single camera or the daily program broadcast by any channel or source;

8B.02 is a duplicator/multiplicator device that duplicates/multiplies the incoming video and/or audio signals, without any loss, so the signals can be used for two/multiple simultaneous processes;

8B.03 indicates that the incoming video and/or audio signal is encoded and possibly compressed to meet the high-resolution specifications of the respective embodiment, such as reducing picture frame size, frame rate and quality to meet a predetermined high-resolution bandwidth frequency for eventual access by the user (i.e. ISDN, ADSL, etc.);

8B.04 is the signal, encoded to be broadcast or delivered in a predetermined high quality frequency;

8B.05 indicates that the incoming video and/or audio signal is encoded and possibly compressed to meet the low-resolution specifications of the respective embodiment, i.e. reducing picture frame size, frame rate and quality to meet a predetermined low quality bandwidth frequency for eventual access by the relevant frequency user (i.e. ISDN, ADSL, etc.);

8B.06 is the signal encoded to be broadcast or delivered in a predetermined low resolution frequency;

8B.07 is the broadcast or delivered signal coming from the high resolution encoder 8B.04;

8B.08 is the broadcast or delivered signal coming from the low resolution encoder 8B.06;

9A.01 Is the Object Storage in the Back-end Information Network (2A.03). It holds all FHIs, Asset Device Functionality Objects, Asset Functionality Objects and BIN Functionality Objects. In general, it holds all available objects and functionality;

9A.02 Is an Asset Device Functionality Object that holds all available functionality for this kind of Asset Device.

Figure 13A:
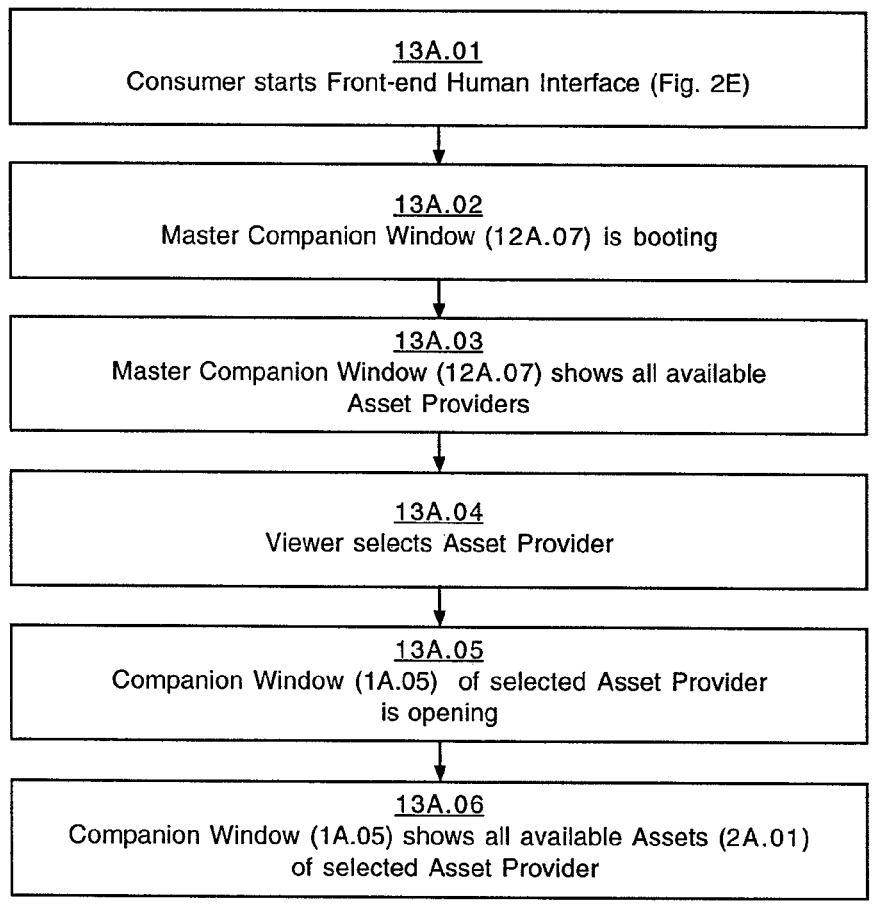
Figure 13B:
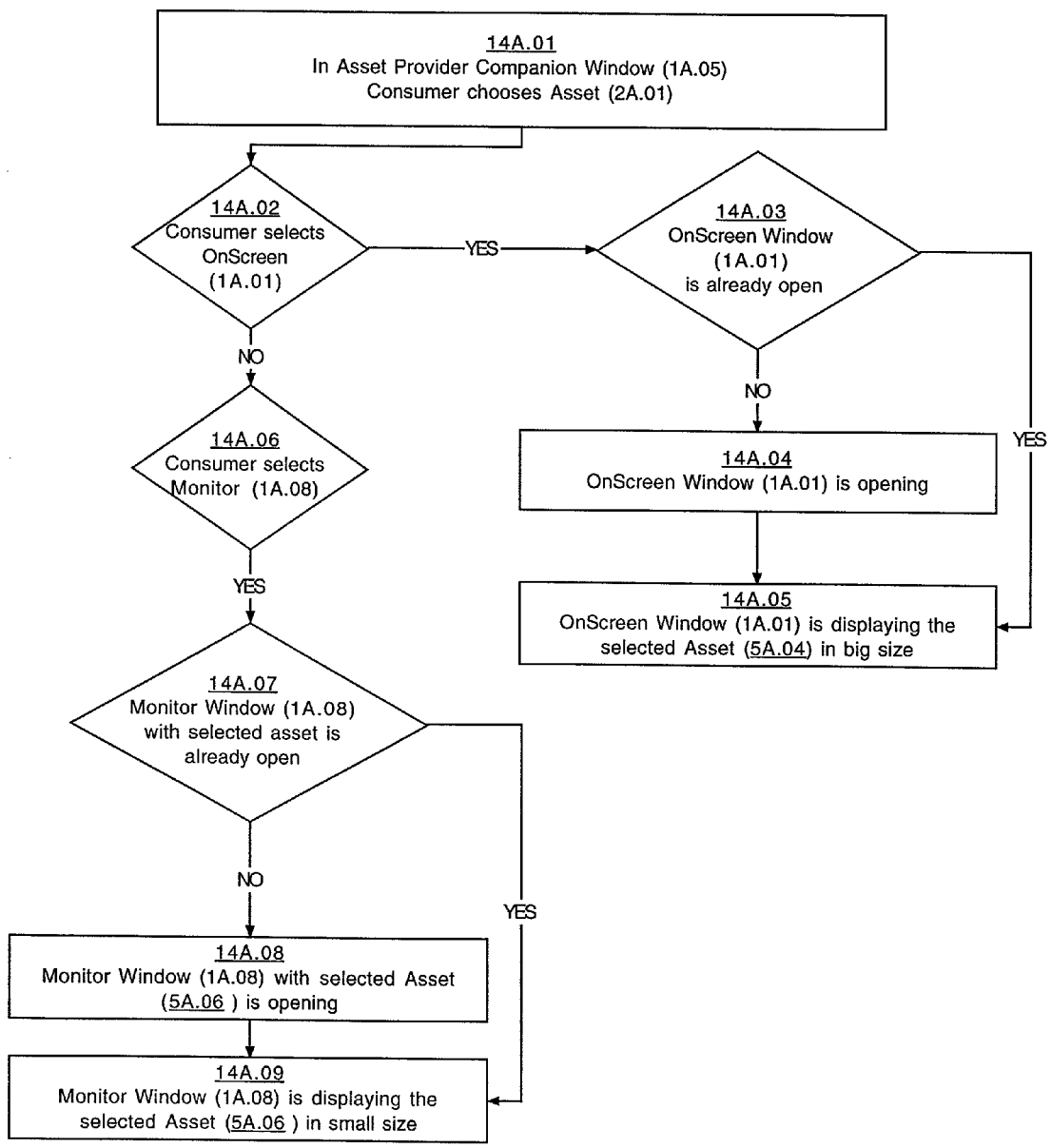
Figure 13C:
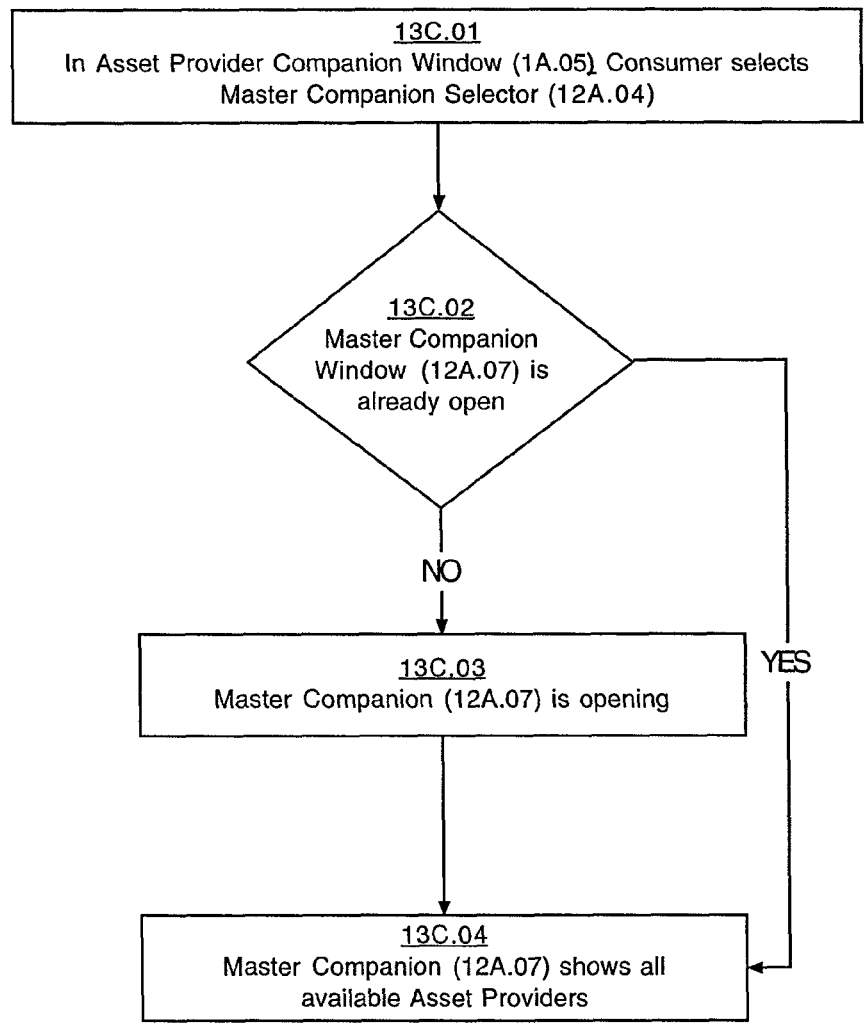
Figure 13D:
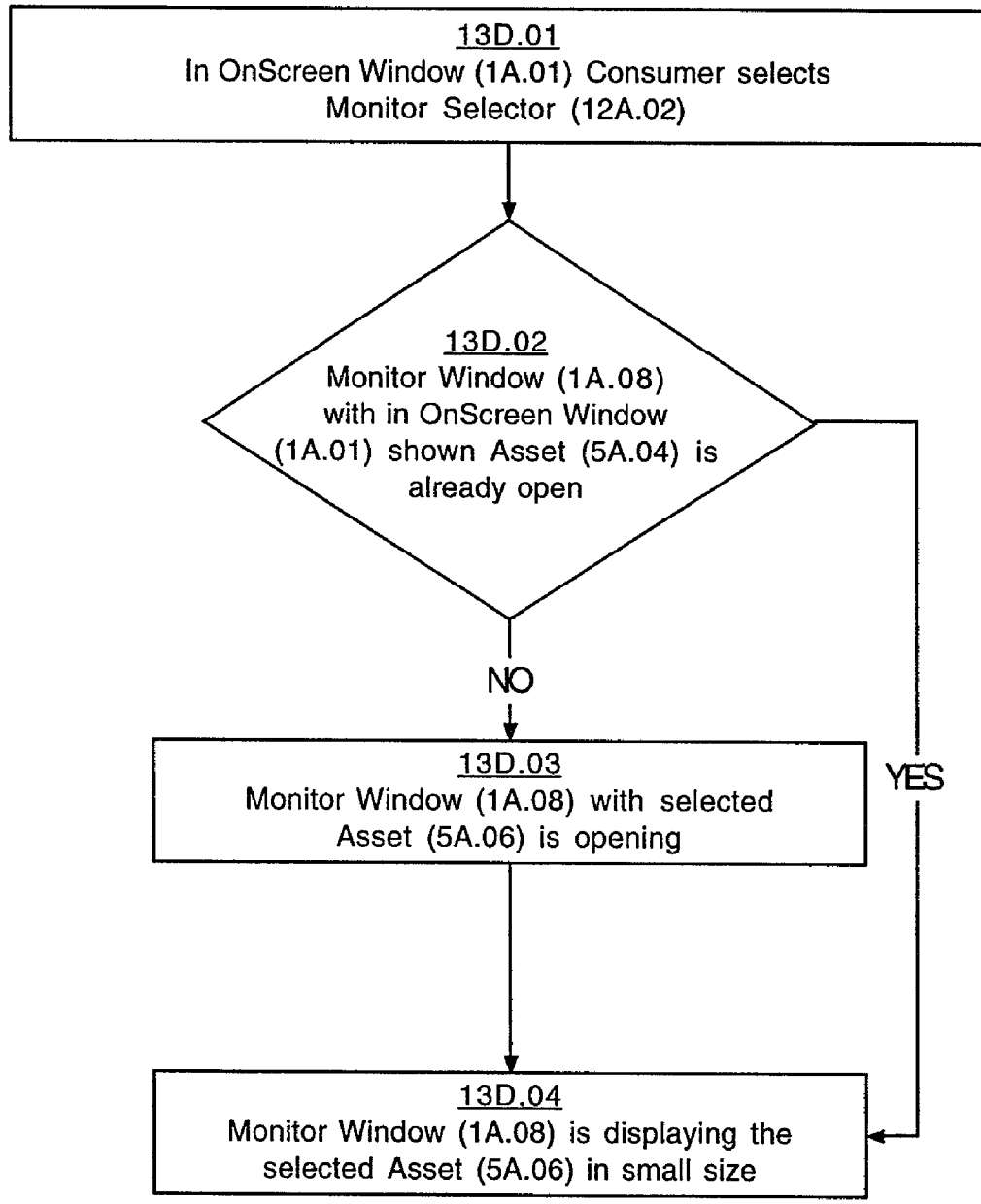
Figure 13E:
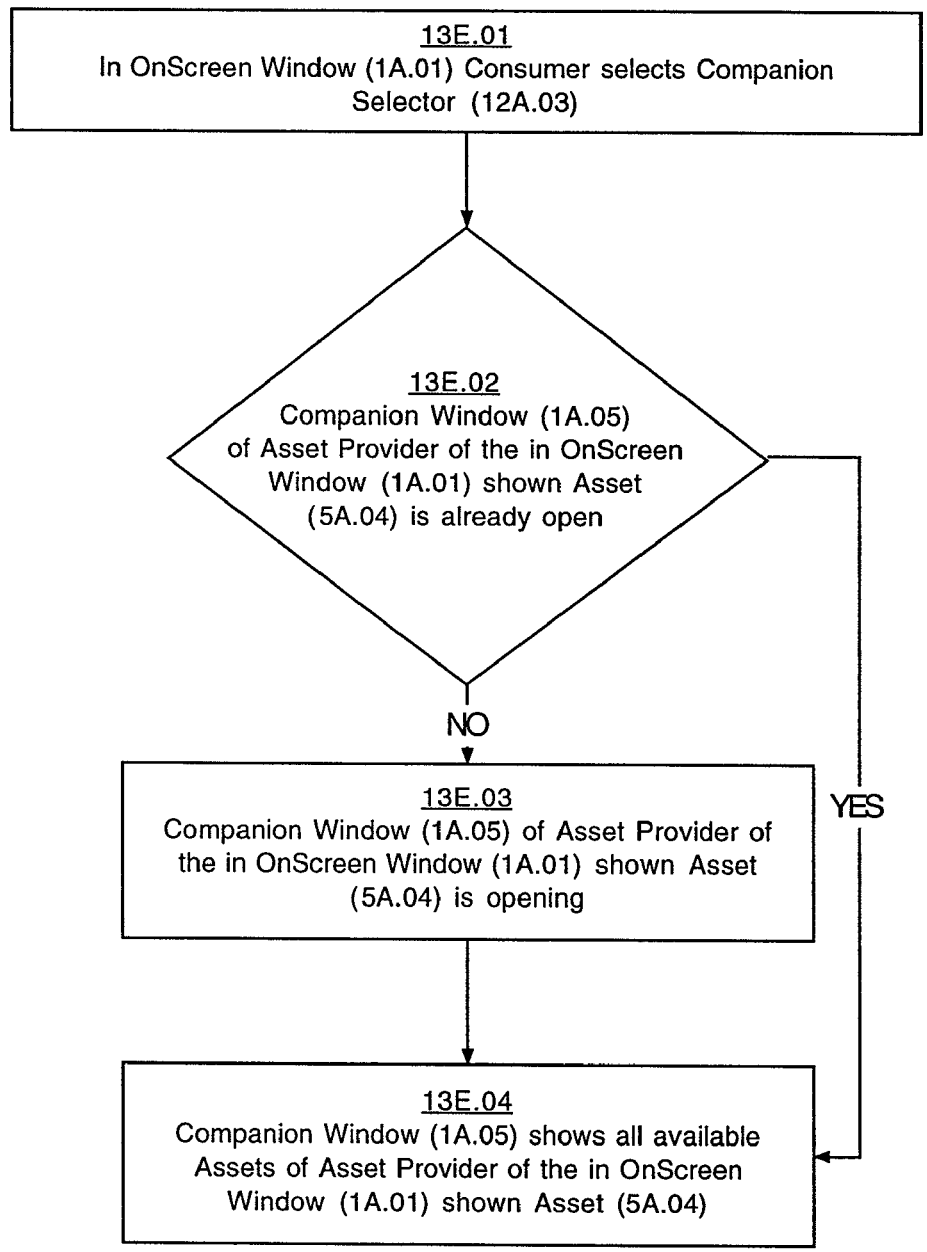
Figure 13F:
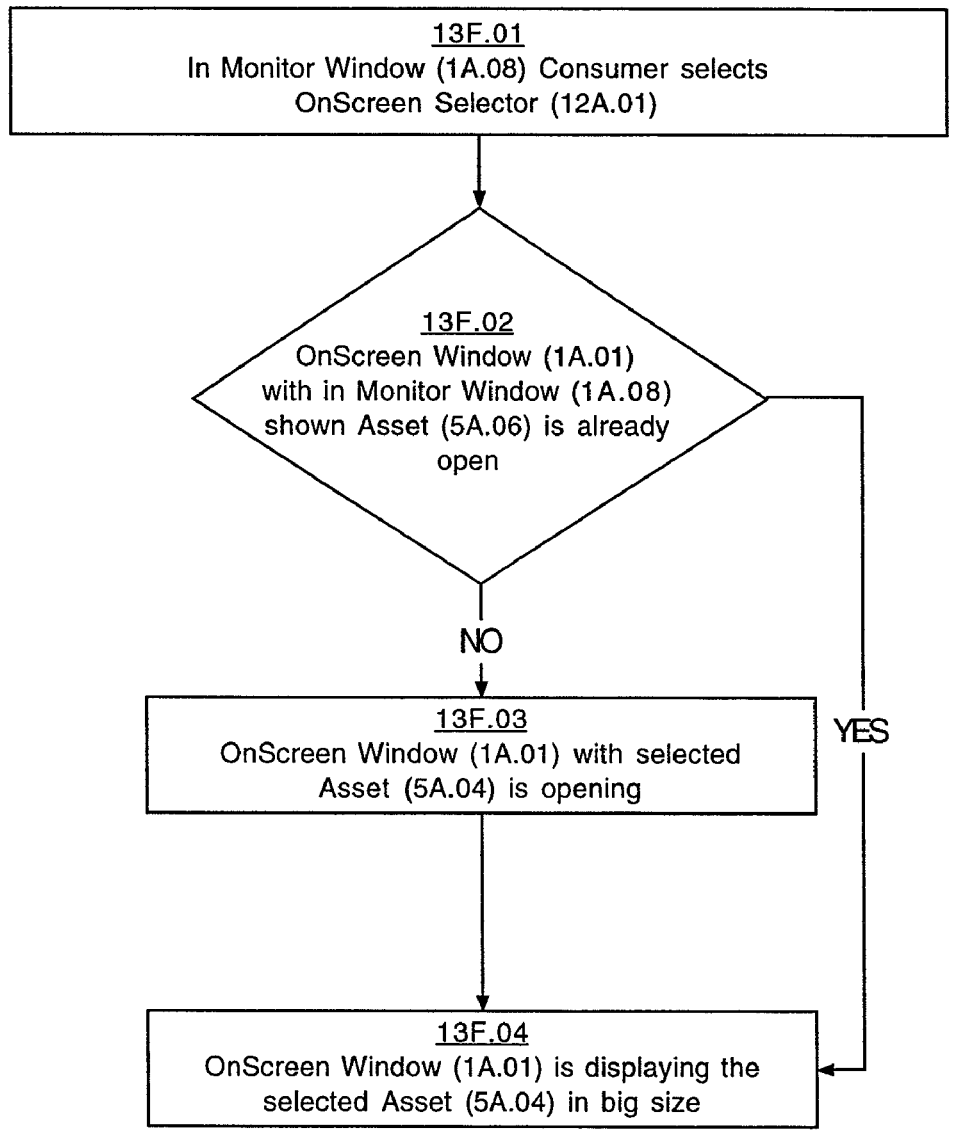
Figure 13G:
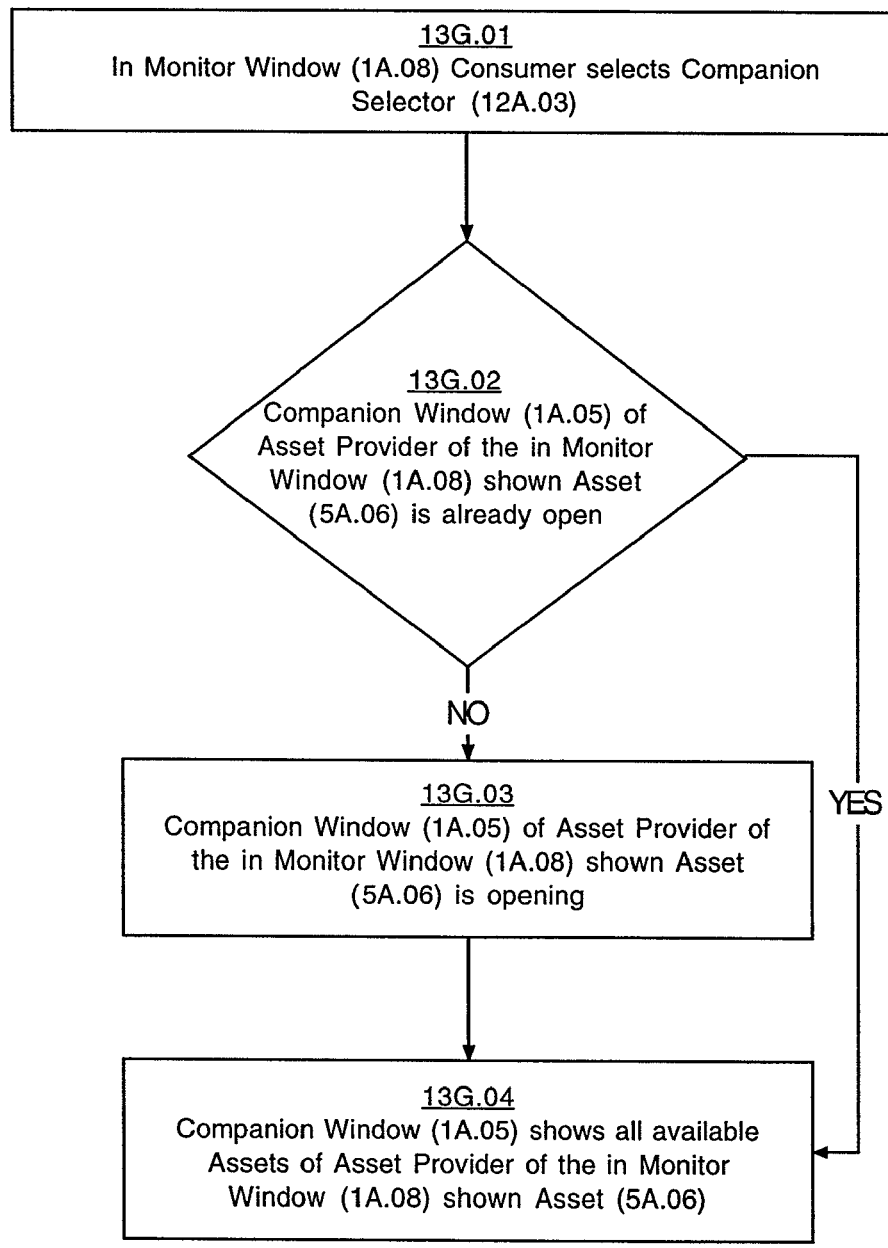
Figure 13H:
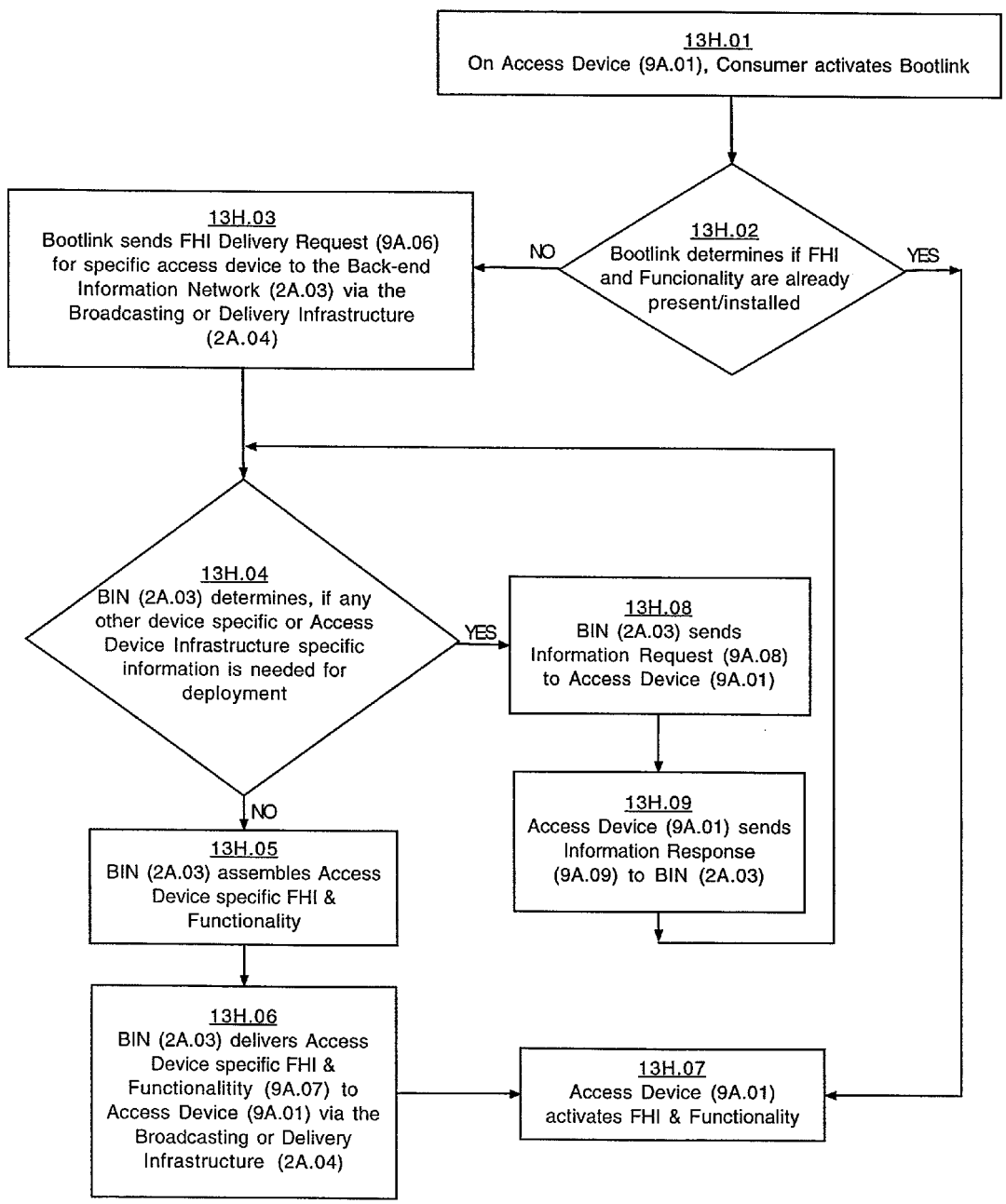
Figure 131:
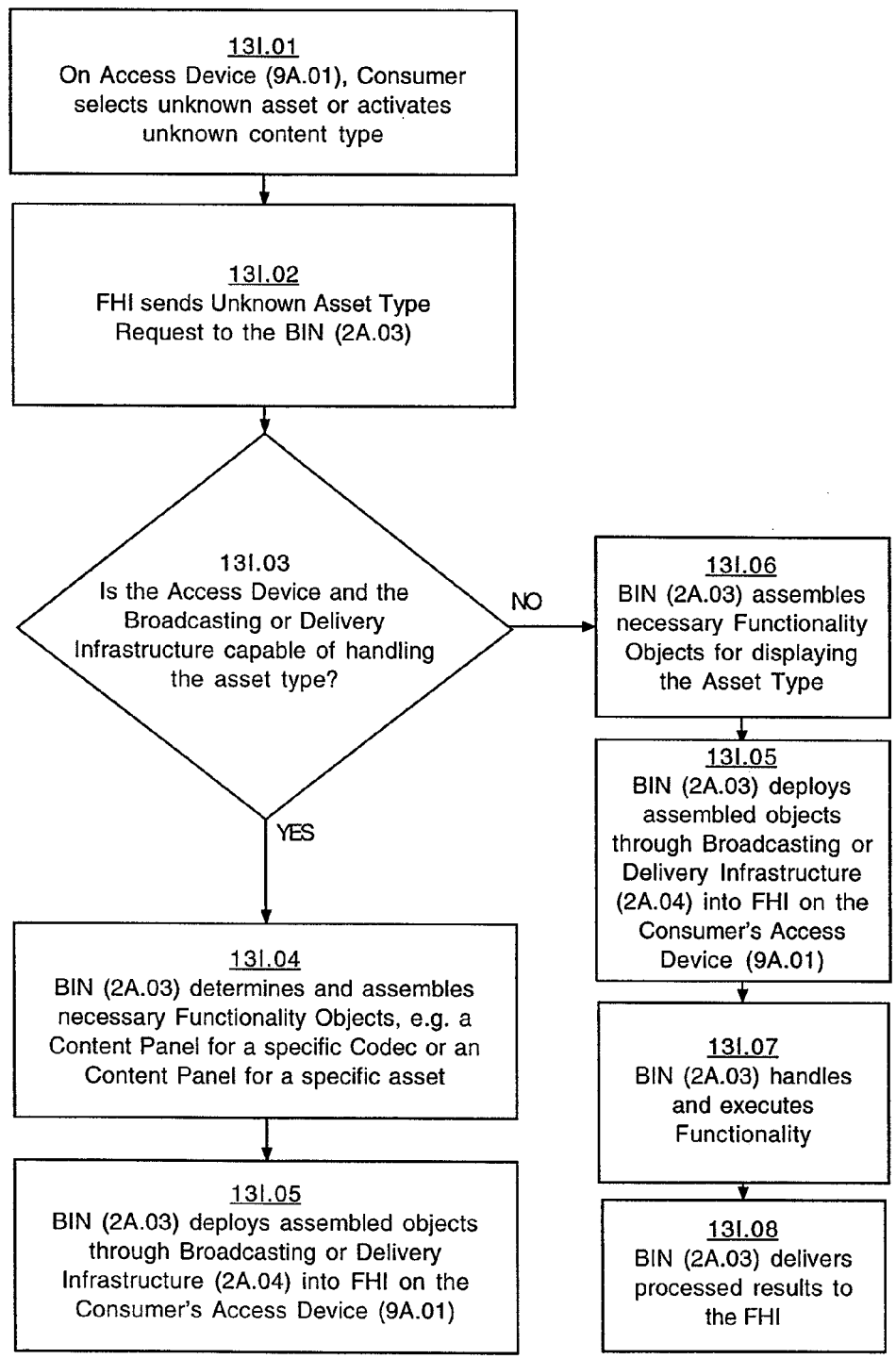

9A.03 Is an Asset Functionality Object that holds all available functionality for this kind of Asset;

9A.04 Is a BIN (2A.03) Functionality Object that holds functionality to extend and leverage the BIN;

9A.05 Is the part of the BIN that assembles and processes the objects stored in the Object Storage (9A.01) to prepare them for delivery and usage;

9A.06 The Bootlink or Delivery Request of the Access Device (9A.01) to the BIN (2A.03) in order to receive the FHI (5A.11) itself or new Functionality;

9A.07 The Delivery transmission of the BIN (2A.03) to the FHI (5A.11), containing the assembled FHI and Functionality;

9A.08 An Information Request from the BIN (2A.03) to the Access Device (9A.01);

9A.09 An Information Response from the Access Device (9A.01) to the BIN (2A.03);

9A.10 are the Access Device independent Front-end Human Interface Cores;

9A.11 Are the Access Device Specific Front-end Human Interface Cores;

9B.01 The request for opening the main application for this Access Device (9A.01), issued by the Access Device to the BIN (2B.03);

9B.02 The delivery of the main application and open command from the BIN (2B.03) to the Access Device (9A.01);

9C.01 A request for specific technical specifications from the BIN (2A.03) to the FHI (5A.11);

9C.02 The response containing the requested specifications from the FHI (5A.11) back to the BIN (2A.03);

9C.03 The delivery of an Update or Functionality Objects to the FHI (5A.11);

9C.04 The updated or new Functionality Objects are incorporated into the FHI (5A.11);

9D.01 The local DVD/CD-ROM device;

9D.02 A DVD/CD-ROM Functionality Object, stored in the Object Storage (9A.01) of the BIN (2A.03);

9D.03 The FHI (5A.11) submits a request for accessing this specific local DVD/CD-ROM device;

9D.04 The BIN (2A.03) delivers the DVD/CD-ROM Functionality Object to the FHI (5A.11);

9D.05 The DVD/CD-ROM Functionality Module is incorporated into the FHI (5A.11);

9E.01 The BIN (2A.03) Sends a Request for Workload/Delegation to the FHI (5A.11);

9E.02 The FHI (5A.11) answers to the BIN (2A.03) with a Workload or Delegation Response;

9E.03 The BIN (2A.03) delivers the results of a Workload/Delegation to the FHI (5A.11);

9F.01 The Operating System of a typical Game Console or Gaming Station (10D.01);

9F.02 The Read-Only-Memory (ROM) of a typical Game Console or Gaming Station (10D.01);

9F.03 A typical Game Console's or Gaming Station's Video Driver;

9F.04 The CPU of a typical Game Console or Gaming Station (10D.01);

9F.05 The Random-Access-Memory (RAM) of a typical Game Console or Gaming Station (10D.01);

9F.06 The internal DVD drive of a typical Game Console or Gaming Station (10D.01);

9F.07 The internal System or Data Bus of a typical Game Console or Gaming Station (10D.01) that is used as the Delivery Infrastructure (2A.04);

9F.08 The DVD Medium containing the necessary parts of the BIN (2A.03) for this specific device (a typical Game Console or Gaming Station, 10D.1);

9F.09 Show the insertion of the DVD into the DVD Drive (9F.06);

9F.10 Represents the Data Delivery between the BIN (2A.03) on the DVD (9F.08) and a typical Game Console or Gaming Station (10D.01);

10A.01 An input device for the Access Device (9A.01);

10A.02 A network connection for the Access Device (9A.01);

10A.03 A Display device for the Access Device (9A.01);

10B.01 A Display device for the Access Device (9A.01);

10B.02 The Video Driver of the Access Device (9A.01);

10B.03 The CPU of the Access Device (9A.01);

10B.04 A Runtime Environment on the Operating System of the Access Device (9A.01);

10B.05 The Operating System of the Access Device (9A.01);

10B.06 The Read-Only-Memory (ROM) of the Access Device (9A.01);

10B.07 The Random-Access-Memory (RAM) of the Access Device (9A.01);

10B.08 The Network Connection of the Access Device (9A.01);

10B.09 The Keyboard of the Access Device (9A.01);

10C.01 Represents a Set-Top Box;

10C.02 Is the Remote Control for the Set-Top Box;

10C.03 Is the Cable Connection to the Cable Network;

10C.04 Represents the Television Set;

10D.01 Represents a typical Game Console or Gaming Station;

10D.02 Is a typical Game Console or Gaming Station Dualshock Controller;

10D.03 Is the Internet Expansion Module for a typical Game Console or Gaming Station;

10D.04 Is the Television Set or Display a typical Game Console or Gaming Station is connected to;

10E.01 Is a Refrigerator 10E.02 Is the Refrigerator's Touchpad;

10E.03 Represents the Modem connected to the Refrigerator;

10E.04 Is the Refrigerator's Front Display;

10F.01 Is a Cellular Phone;

10F.02 The Cell Phone keypad;

10F.03 Is the GSM connection of the Cell Phone;

10F.04 The Cell Phone's Display;

10G.01 Is the Home Stereo Device;

10G.02 Is the button control bar of the Home Stereo;

10G.03 Is the communication Module of the Home Stereo to connect to the Cable Network;

10G.04 Is the Home Stereo's Display;

10H.01 Is the Stand-alone CD Player;

10H.02 Are the CD Controls on the CD Player;

10H.03 Is the CD Remote Control;

10H.04 Is the Communication Module of the CD Player to connect to the Cable Network;

10H.05 Is the Home Stereo with speakers to play sound;

11A.01 represents a Server System;

11A.02 Is the Input Device of the Server System;

11A.03 Is the Communication Interface of the Server System;

11A.04 Is a Display Device connected to the Server System;

11A.04 Is a Display Device connected to the Server System;

11B.01 Is the Video Driver in the Server (11A.01);

11B.02 The Read-Only-Memory (ROM) of the Server (11A.01);

11B.03 The Random-Access-Memory (RAM) of the Server (11A.01);

11B.04 The Operating System of the Server (11A.01);

11B.05 The CPU of the Server (11A.01);

11B.06 The Network Connection of the Server (11A.01);

11B.07 The Keyboard of the Server (11A.01);

11B.08 The Display device connected to the Server (11A.01);

12A.01 Is a selector that triggers the action of sending the Asset displayed in this Monitor Window 2 (1A.08*b*) to the OnScreen Window (1A.01). This is shown in detail in FIG. 13F;

12A.02 Is a selector that triggers the action of sending the Asset displayed in this OnScreen Window 2 (1A.01) to a Monitor Window. This is shown in detail in FIG. 13D;

12A.03 Is a selector that triggers the action of opening the corresponding Companion to the Asset displayed in this OnScreen Window 2 (1A.01). This is shown in detail in FIG. 13E;

12A.04 Is a selector that triggers the action of opening the Master Companion. This is shown in detail in FIG. 13C.

12A.05 Is a selector that triggers the action of sending the Asset of the corresponding Asset 1 Selector (6A.02*a*) to the OnScreen (1A.01);

12A.06 Is a selector that triggers the action of sending the Asset of the corresponding Asset 1 Selector (6A.02*a*) to a Monitor (1A.08);

12A.07 Is the OWL Master Companion Window that offers the choices of the various Asset Providers 12A.08*a/c;*

12A.08*a* Is a selector that triggers the action of opening the Asset Provider 1 Companion;

12A.08*c* Is a selector that triggers the action of opening the Asset Provider 3 Companion;

14A.01 Represents an electronic commerce offering, dealing with advertising and purchasing;

14A.02 Is the Consumer;

14A.03 Is the purchase action of the Consumer that accepted the Electronic Commerce Offering's Advertising (14A.01, 5A.07);

14B.01 Is a module that processes advertising requests, assembles the advertising and delivers it to the FHI (5A.11);

14B.02 Is an e-commerce store interface of the Product Provider (5A.13);

14B.03 Is the sales software of the external product store;

14C.01 Is the Sales Module of the Product Provider's (5A.13) Store;

14D.01 Represents the type of Content related advertising, stored and processed in the BIN (2A.03);

14D.02 Represents the type of Consumer related advertising, stored and processed in the BIN (2A.03);

14D.03 Represents the consumer's advertising preferences that are stored, used and processed in the BIN (2A.03) to derive more specific targeted advertising to the Consumer;

14D.04 Represents the type of scheduled advertising, stored and processed in the BIN (2A.03);

The User Interface of various embodiments of the invention is the Front-end Human Interface (FHI) 2E. Its software can be located in parts or as a whole (1) on the Consumer's Access Device 2A.05, 2B.11, 2B.12 or (2) on the Back-end Information Network (BIN) 2A.03, 2B.07 of the system and is dynamically (1) updated or (2) loaded into the Consumer's Access Device 2A.05, 2B.11, 2B.12 each time the Consumer connects to the system. The FHI is shown generally at 2E in FIGS. 5A and 9A, 9B-F. It works conceptually as a true extension to the Back-end Information Network 2A.03 enabling the Consumer to access all the BIN's functionalities using the Access Device 2A.05 and is an integral part of the completely object oriented and platform independent software design of various embodiments of the invention 2D, 2A-C. This provides several advantages. The Consumer is not required to do any manual software installation or updates, no matter what the Consumer's language is, 1B, 1C, 1D, where the UI software is residing 9A-F, what type of Access Device 2C.02a-g, 2B.11, 2B.12 he or she is using or what kind of infrastructures 2D.01-04, 2A.02, 2A.04, 2B.02-10, are currently or in the future in use. The Back-end Information Network 2A.03, 2B.07 can be continuously upgraded so that the Consumers always have at their Access Device of choice 2A.05, 2B.11, 2B.12, 2C.02a-g, the latest software release and all of the latest information regarding the system 2D, 2A-C.

The block diagrams illustrating the versatile and sophisticated Access Device Deployment concept with the Front-end Human Interface program 5A.11 are shown in FIGS. 9A, 9B, 9C, 9D and 9F.

Figure 9A:
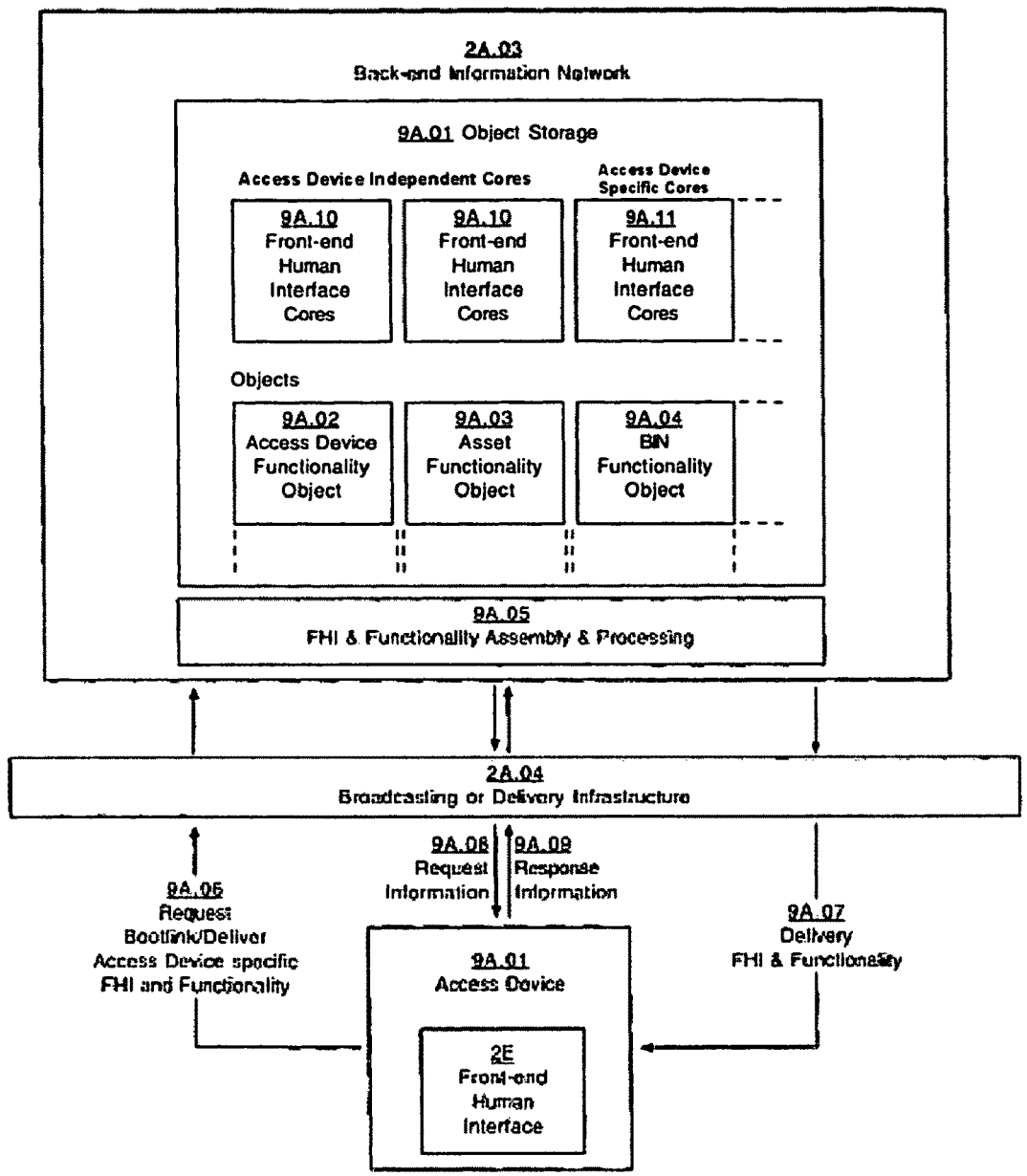
FIG. 9A is a schematic diagram giving an overview of Access Device Deployment functionality in accordance with various embodiments of the invention.
Figure 9B:
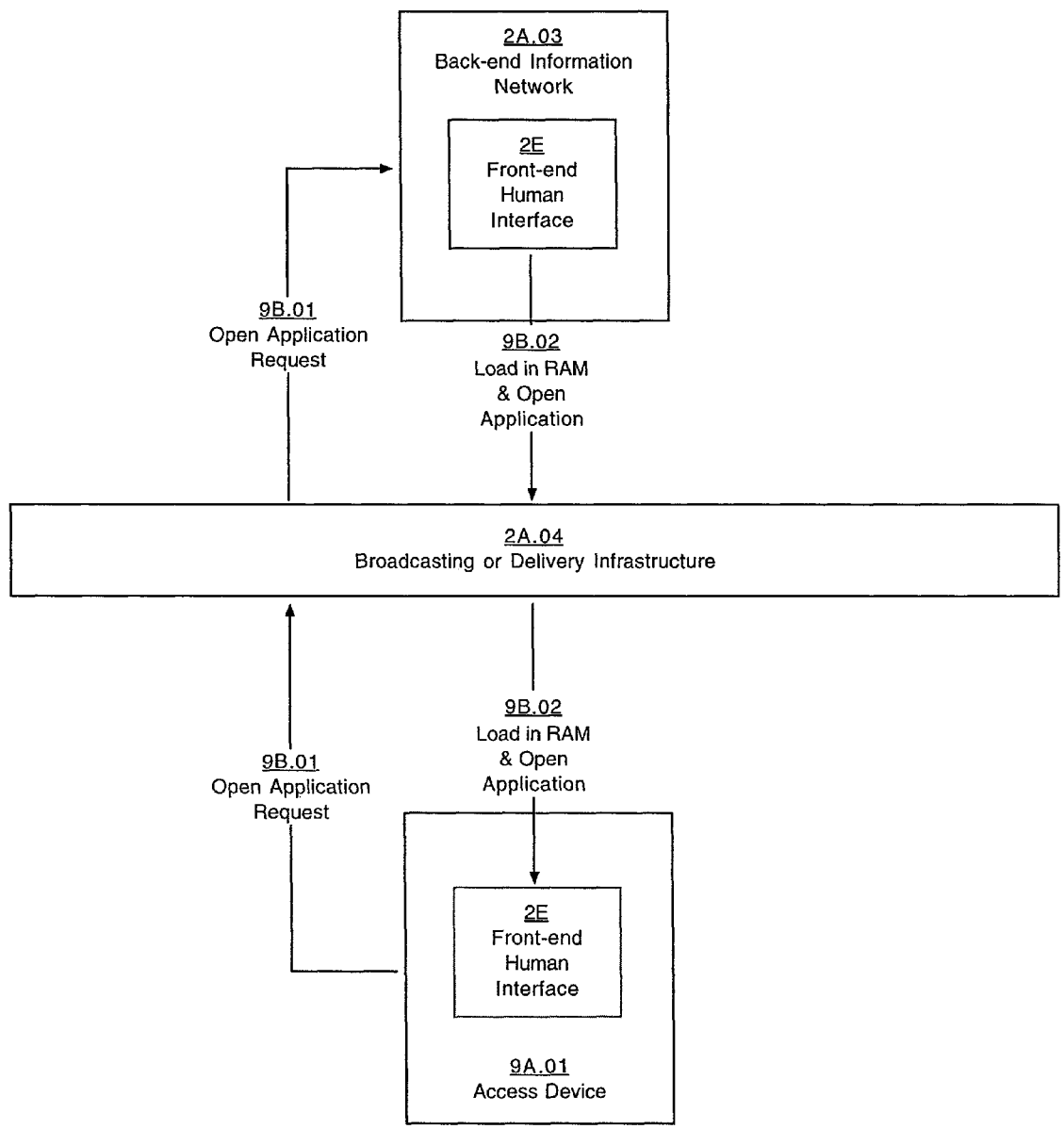
FIG. 9B illustrates how the Front-end Human Interface located on the Back-end Information Network is dynamically loaded into the Consumer's Access Device any time the Consumer opens it.
Figure 9C:
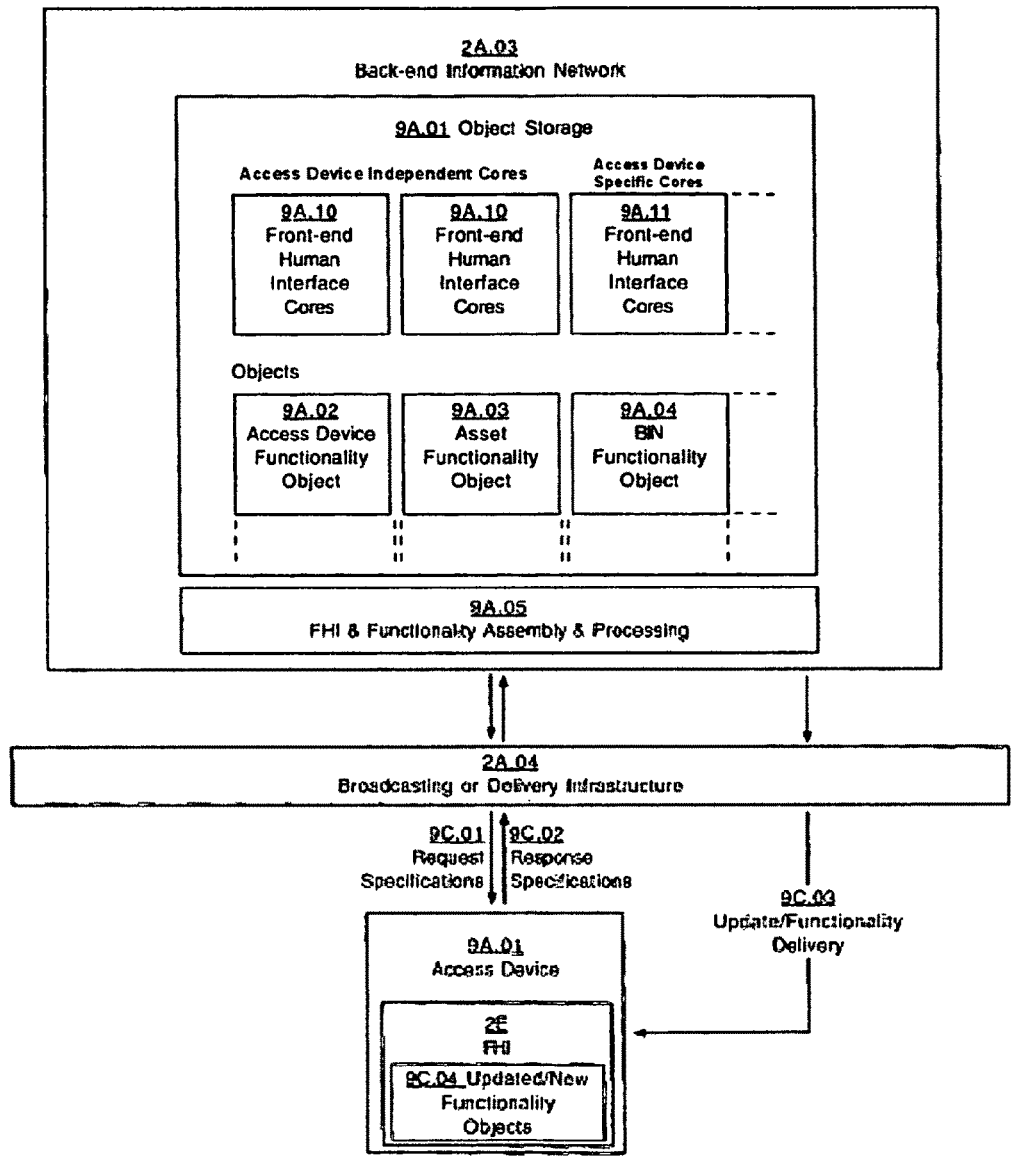
FIG. 9C illustrates the deployment of an Access Device, in which parts of the User Interface software reside permanently on the Access Device and are dynamically updated any time the Consumer opens.
Figure 9D:
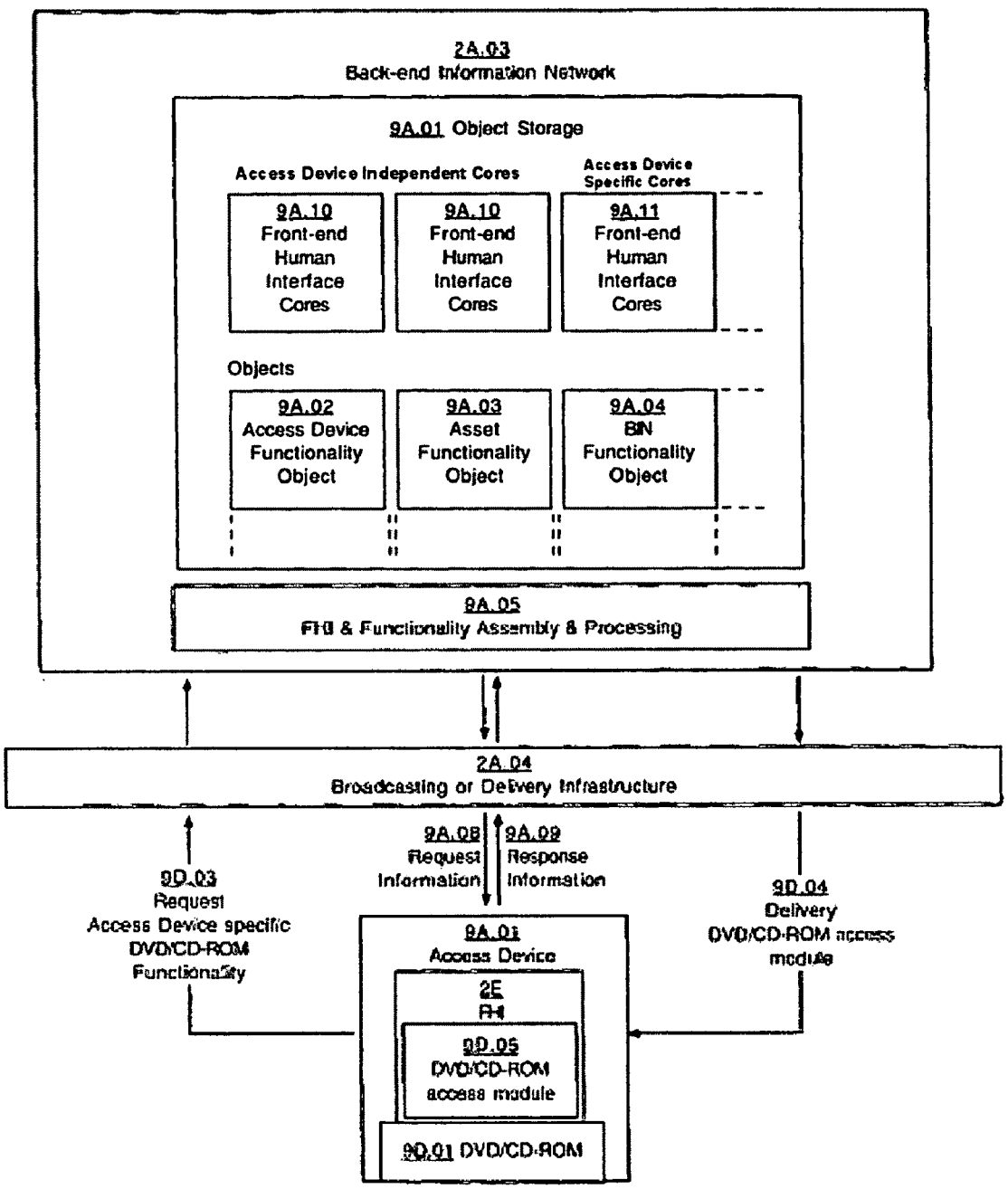
FIG. 9D illustrates how a DVD/CDROM built-in the Access Device, becomes automatically available for navigation and control through the Front-end Human Interface.
Figure 9E:
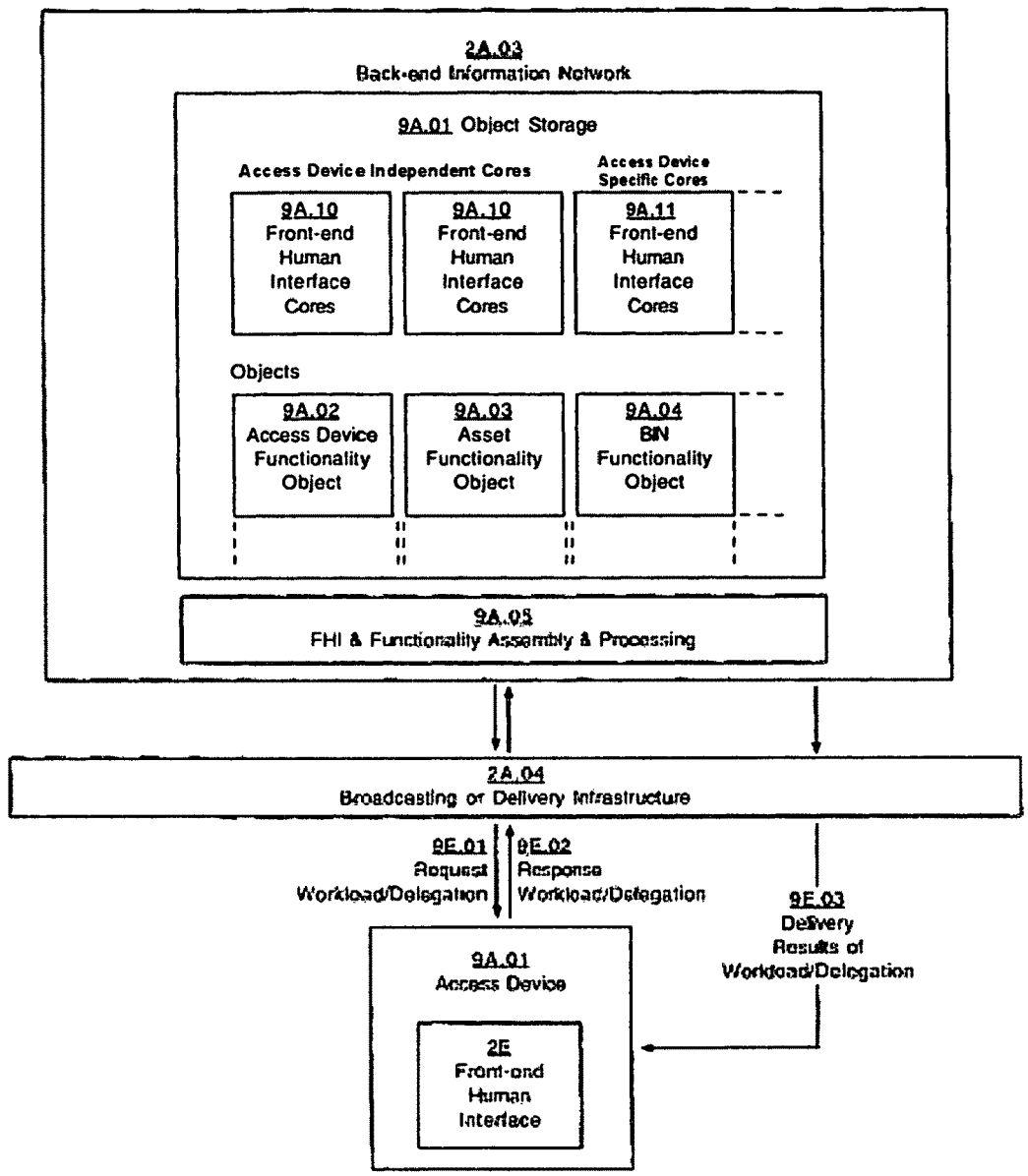
FIG. 9E illustrates the capability of dynamically balancing the load between the Back-end Information Network and the Access Device, shows the process of the Dynamic Load-balancing capability between the Back-end.
Figure 10A:
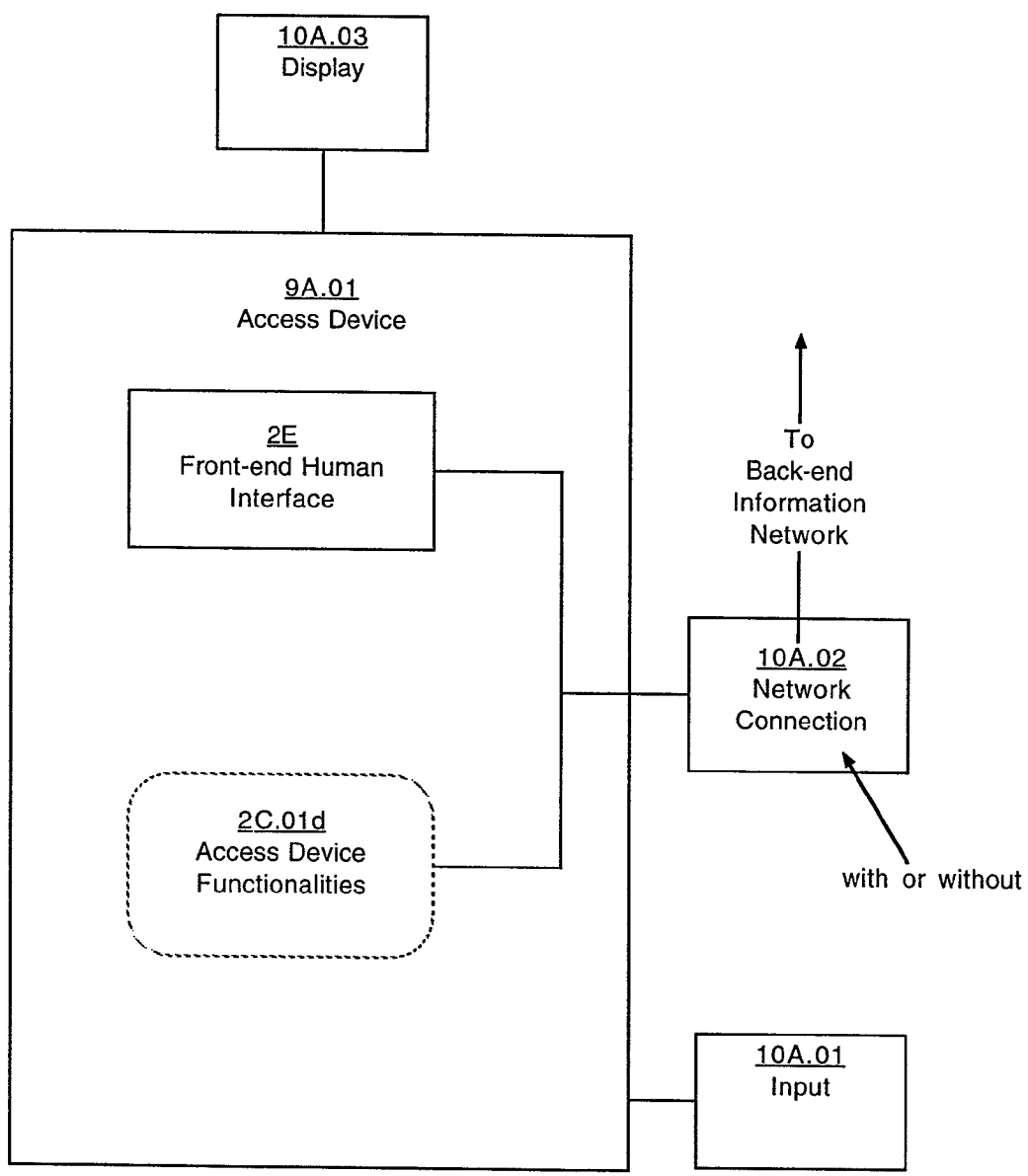
FIG. 10A is an abstract schematic diagram of a typical Access Device.
Figure 10B:
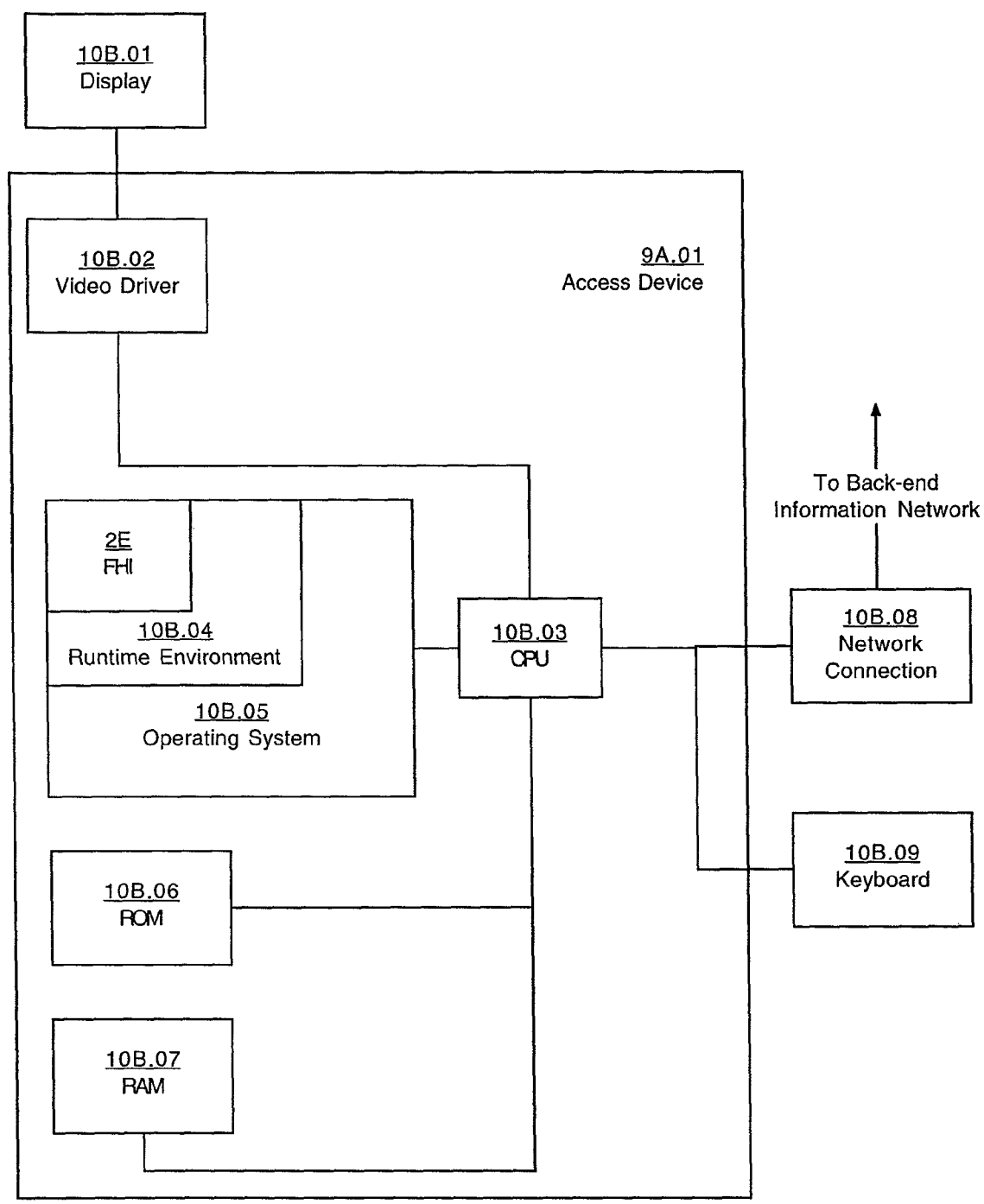
FIG. 10B is an example for Access Device: Information System Devices.
Figure 10C:
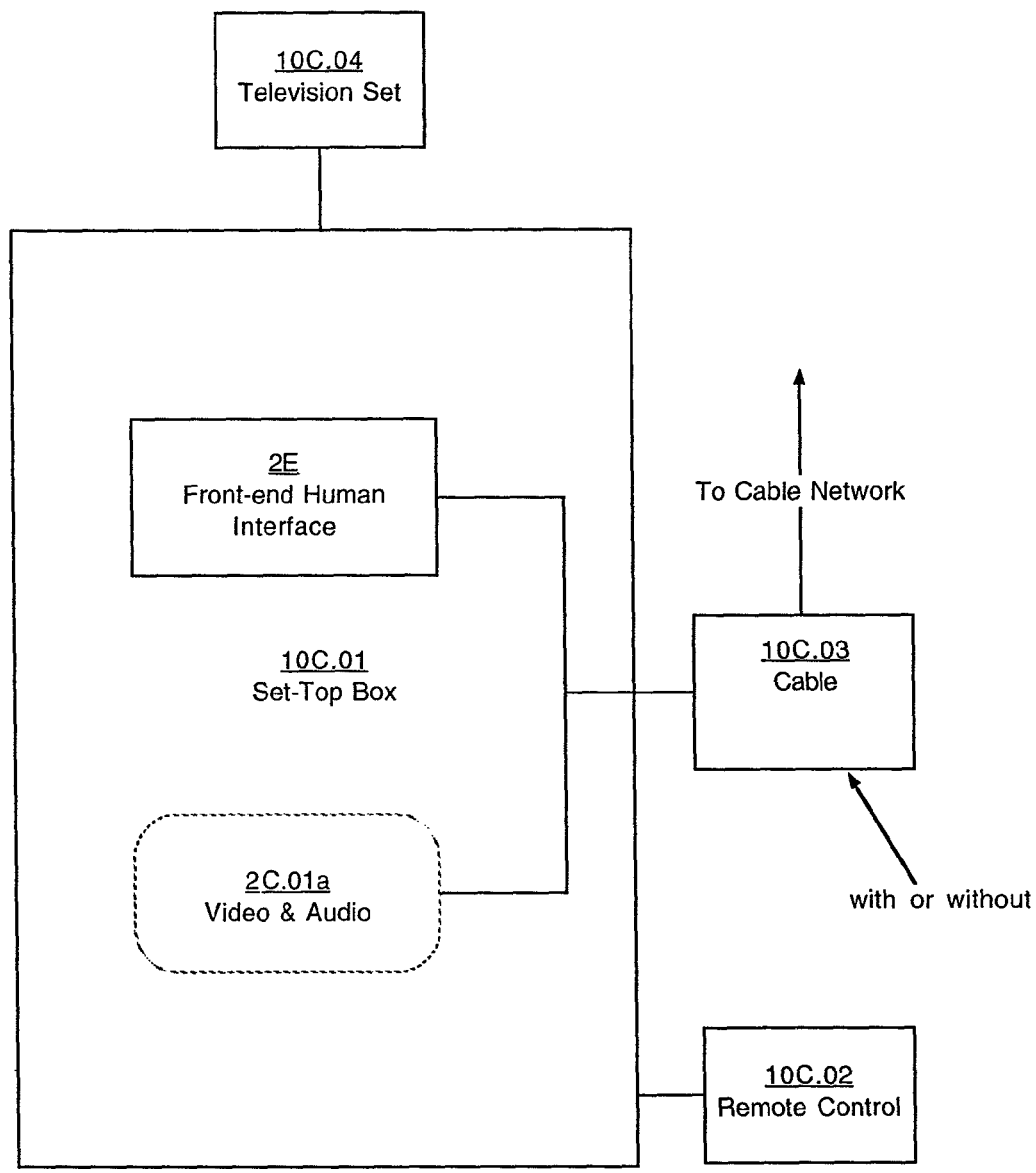
FIGS. 10C and 10D are examples for Access Devices of the type: Home Entertainment Device.
Figure 10D:
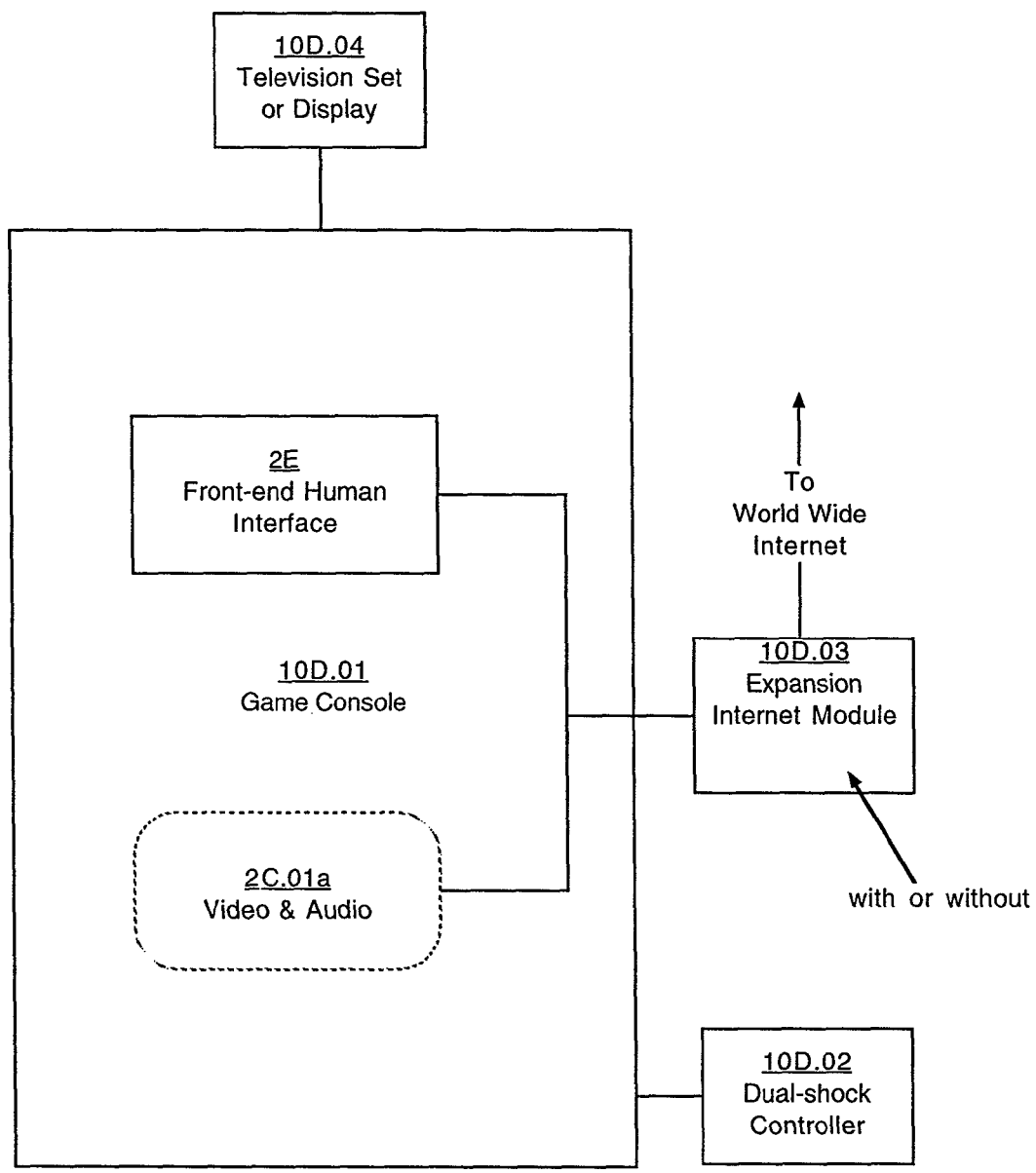
Figure 10E:
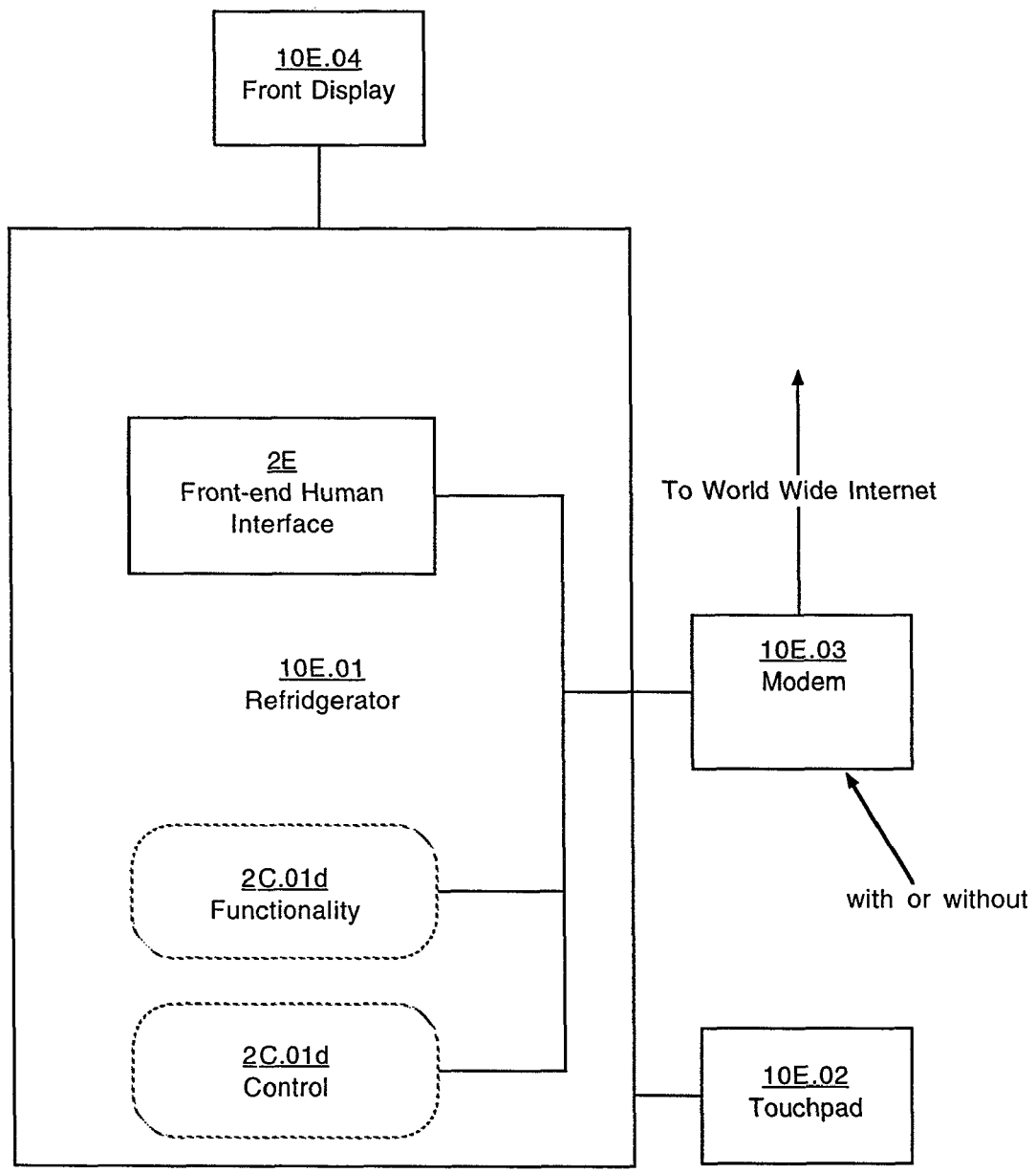
FIG. 10E is an example for Access Device of the type: Home Appliances.
Figure 10F:
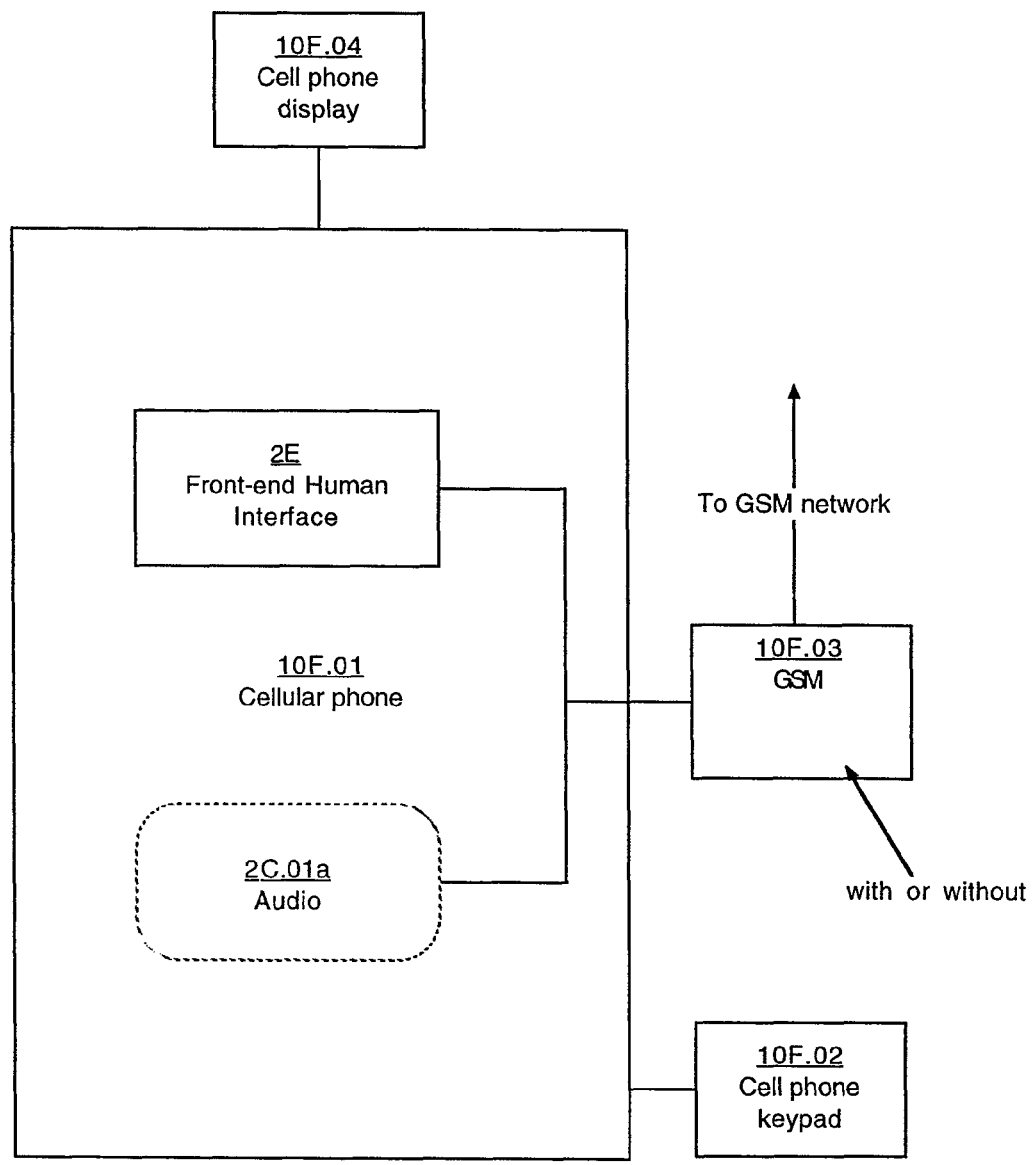
FIG. 10F is an example for Access Device of the type: Communication System Device.
Figure 10G:
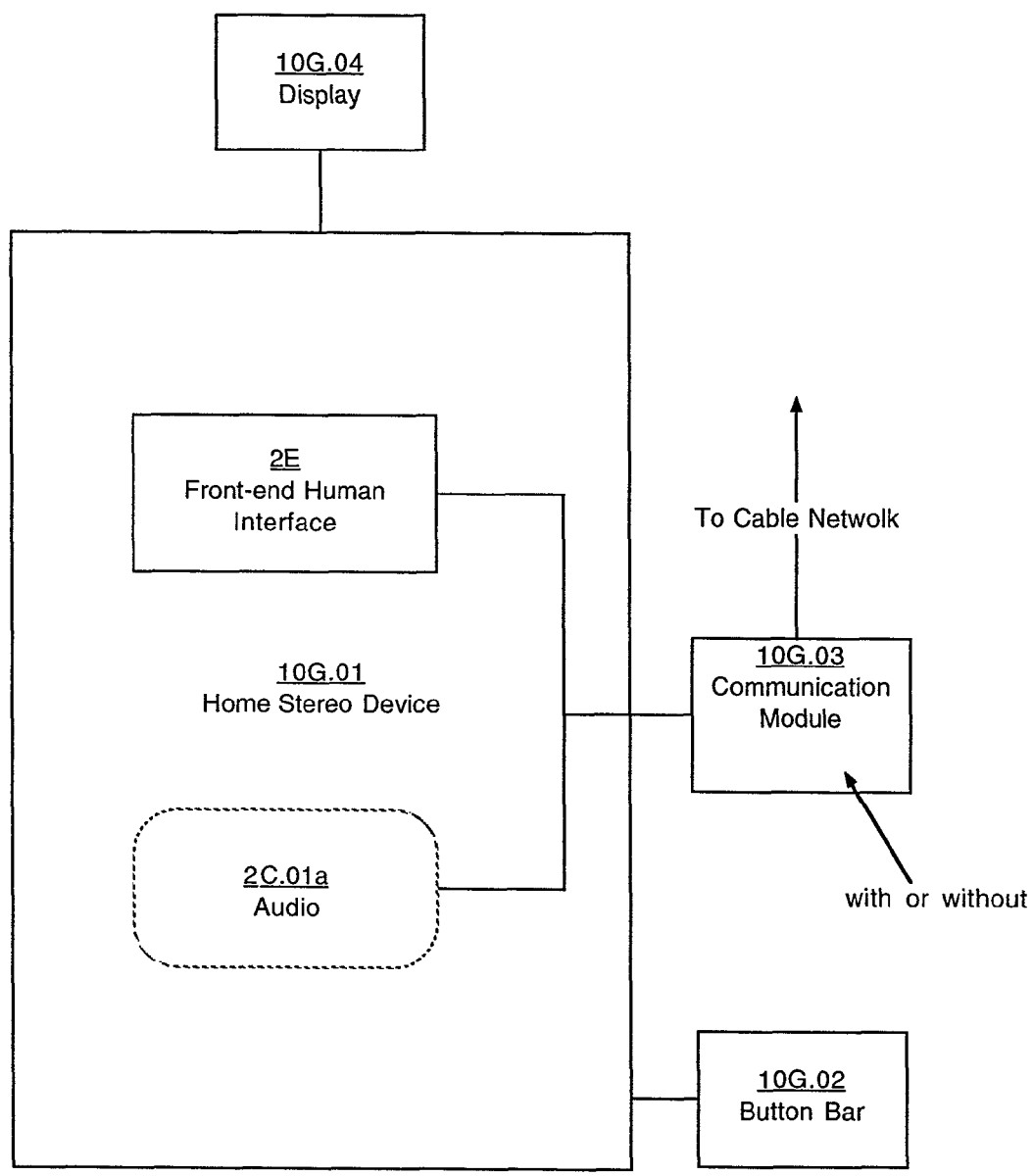
FIG. 10G is an example for Access Device of the type: Audio Entertainment Device.
Figure 10H:
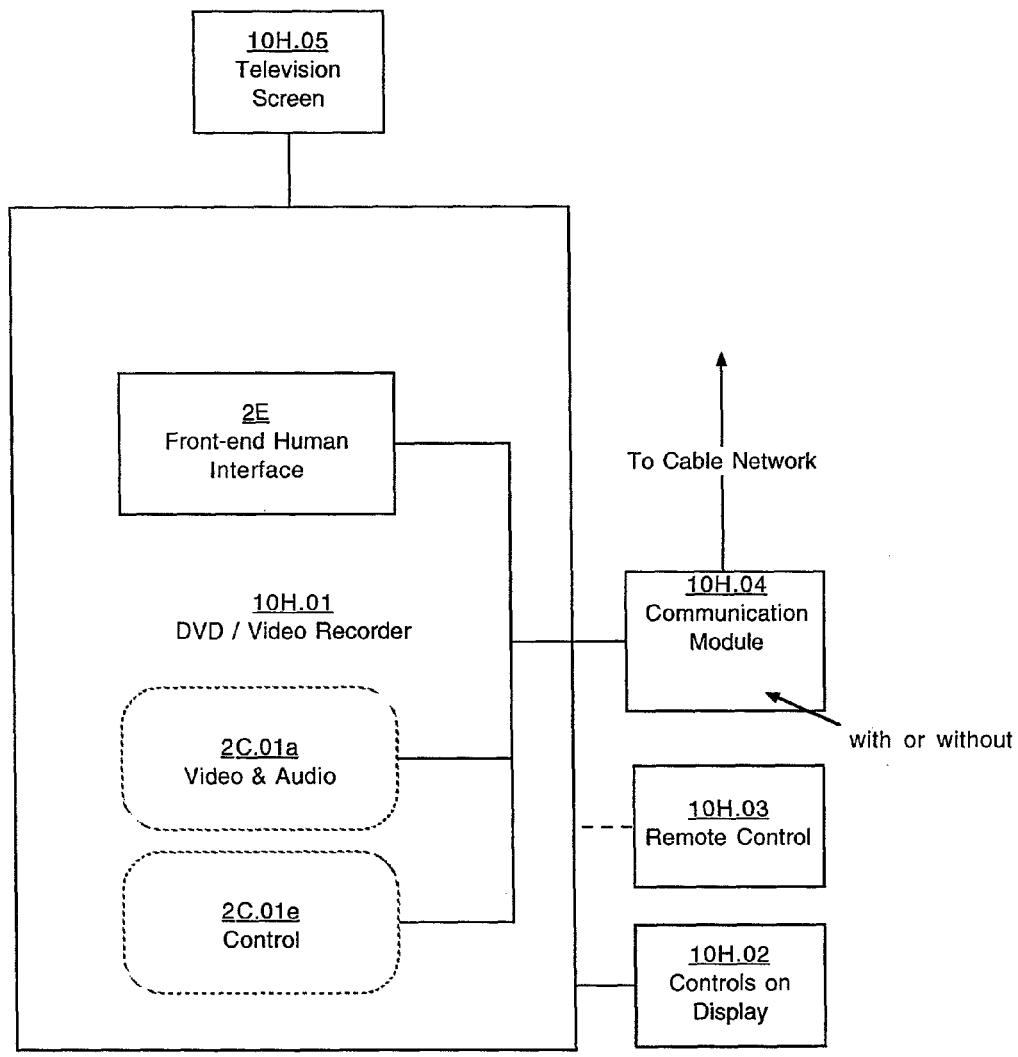
FIG. 10H is an example for Access Device of the type: Audio and Video Entertainment Device.
Figure 11A:
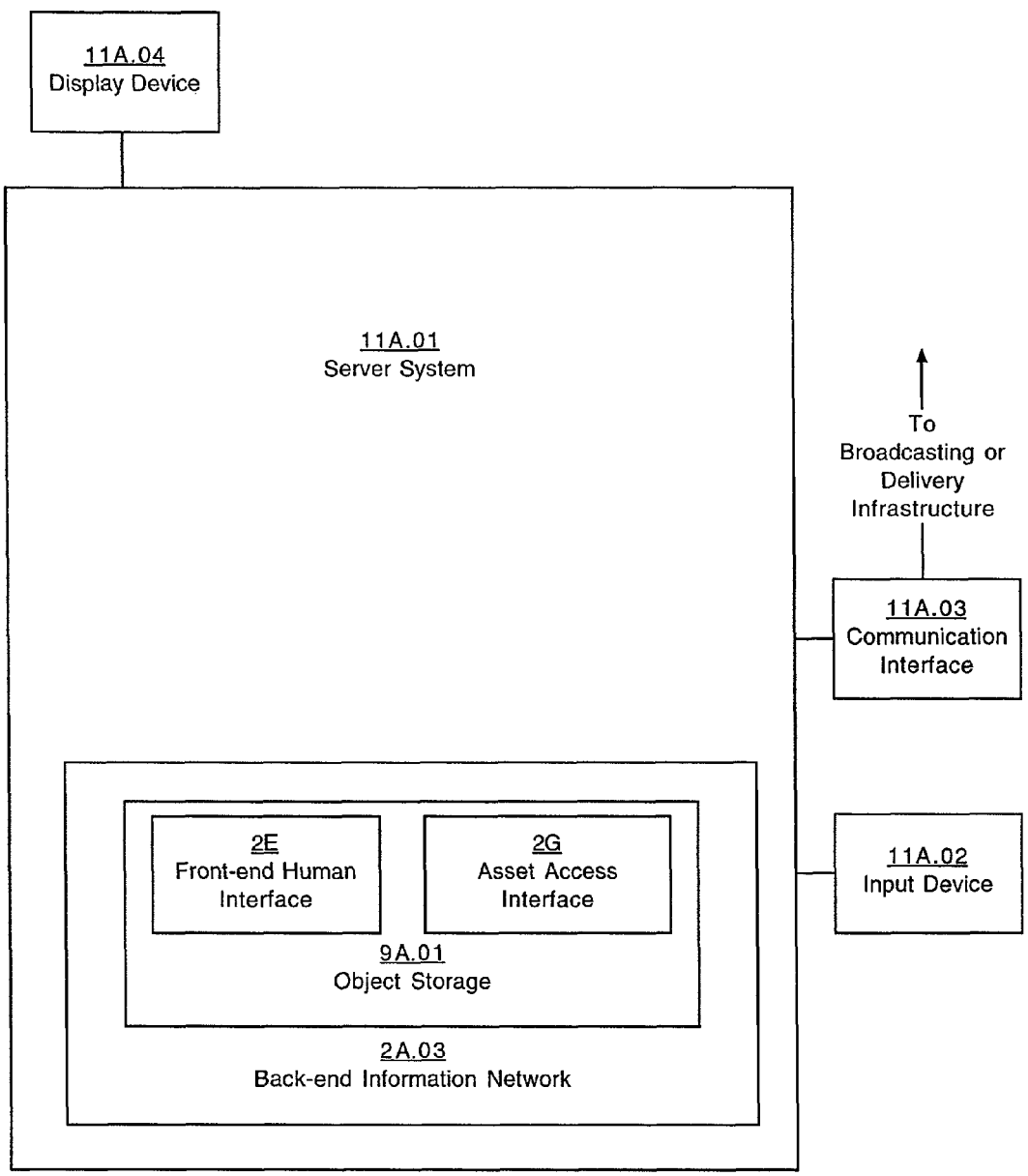
FIG. 11A is a schematic drawing of an overview of the Back-end Information Network Infrastructure.
Figure 11B:
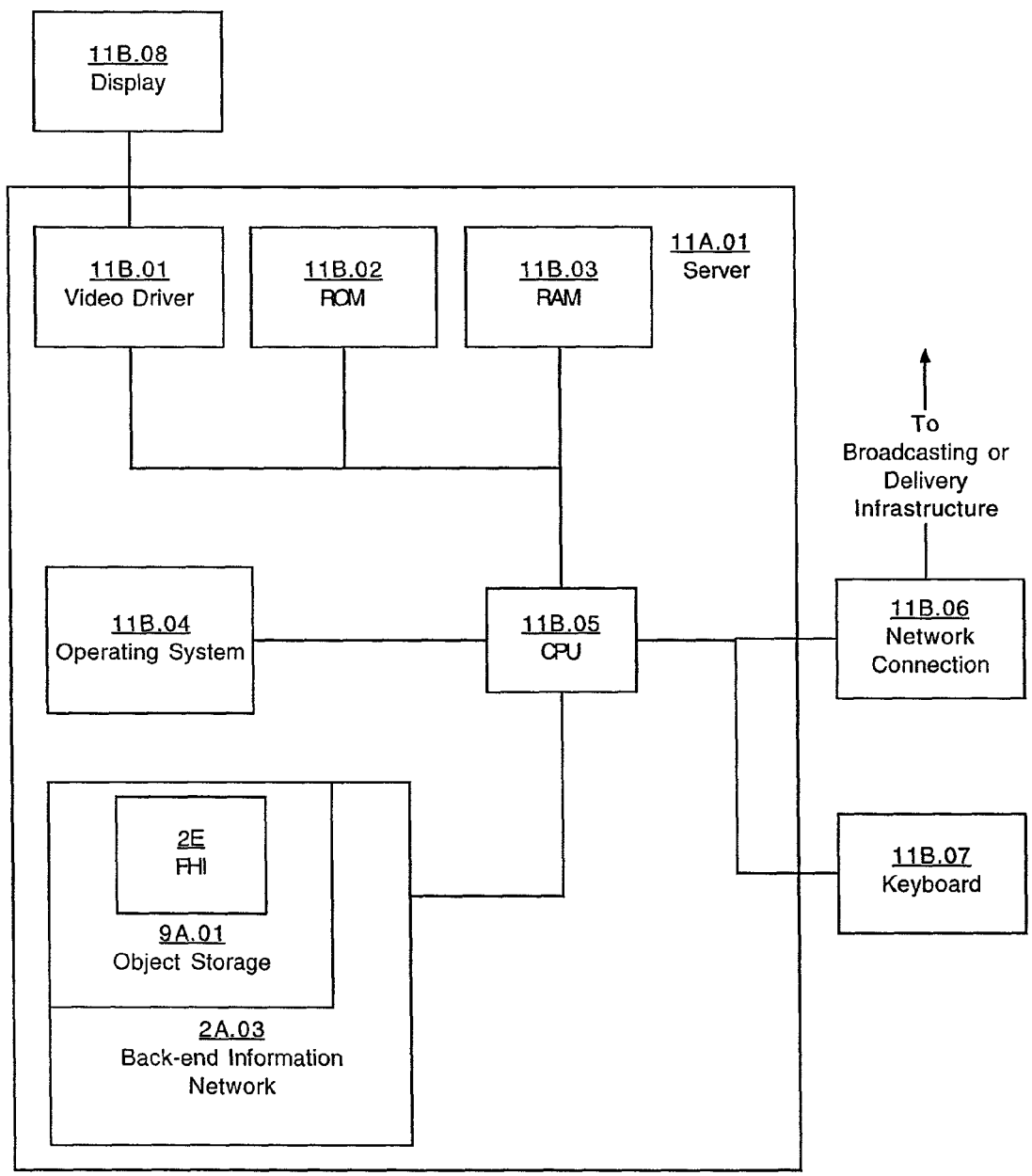
FIG. 11B is a schematic diagram of a single Server system for deploying the Back-end Information Network.
Figure 11C:
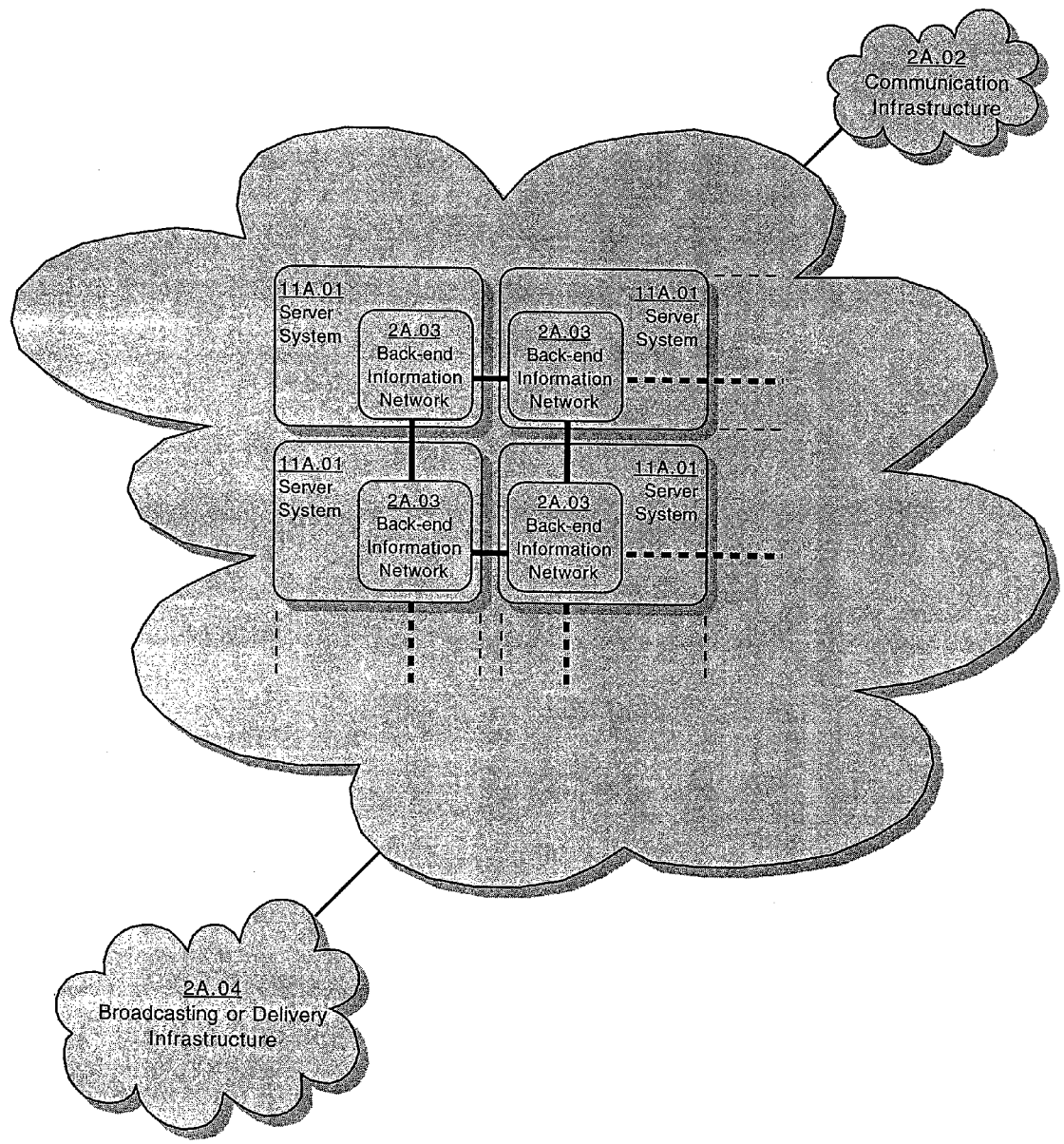
FIG. 11C is a schematic diagram of a Back-end Information Network Infrastructure consisting of multiple server systems.
Figure 12A:
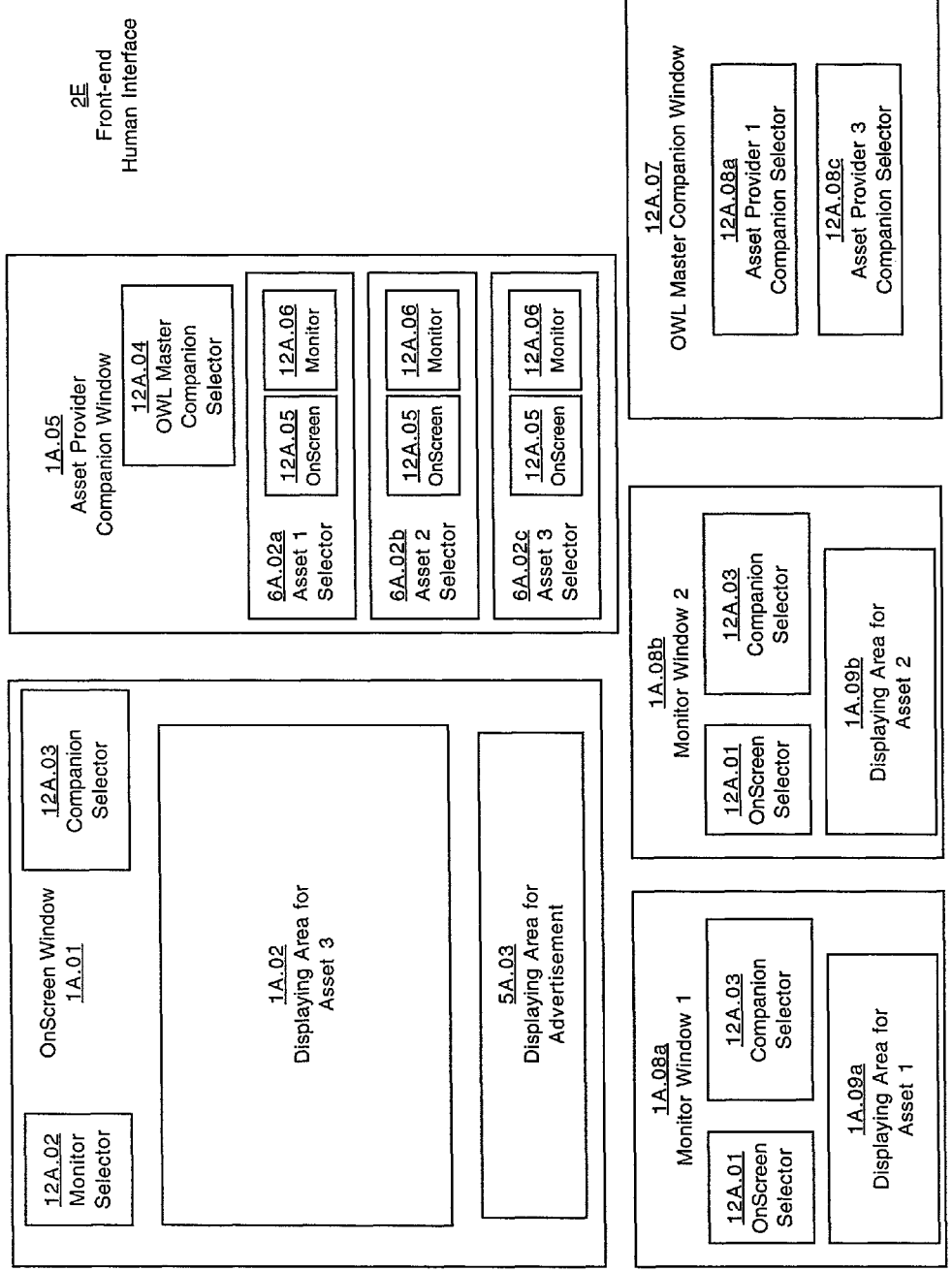
FIG. 12A illustrates OWL's fully interactive, live updated Front-end Human Interface (FHI) provided by various embodiments of the invention.

Front-end Human Interfaces deployed onto an Access Device can dynamically updated to support functionalities specific to the Access Device it is deployed on (FIG. 9D). These Access Device specific functionalities are actually added to those of the Back-end Information Network, as conceptually all functionalities of the Front-end Human Interface are empowered by the Back-end Information Network. Therefore any Access Device 10A-H, 2C.02a-g can become an Asset, 2C.01a-f providing Offerings 10A-H to the whole Consumer Access System (FIG. 9G). This also can render any Consumer in an Asset Provider enabling access to his Offerings.

The diagram 9A shows how a given Front-end Human Interface 5A.11 is dynamically assembled during the boot process from the Front-end Human Interface Core (FHIC), the Asset Device Functionality Objects, the Asset Functionality Objects and the Back-end Information Network Functionality Objects all specific to the deployment environment in use. These sophisticated processes allow the Consumer to use any type of Access Device with neither (1) no parts of the software, or (2) with some parts or (3) the entire software that is required to run the Consumer Access System residing (1) on a Back-end Information Network 2A.03 as detailed in FIG. 9B, or on a (1, 2, 3) networked Access Device 10A-H as detailed in FIG. 9C or (2, 3) on a simple data storage media together with the Asset Offerings itself, such as a DVD/CD with videos 10H which once deployed renders even a not networked Access Device, such as a Game Console 10D into a fully functional Consumer Access System as detailed in FIG. 9F.

Figure 1H:
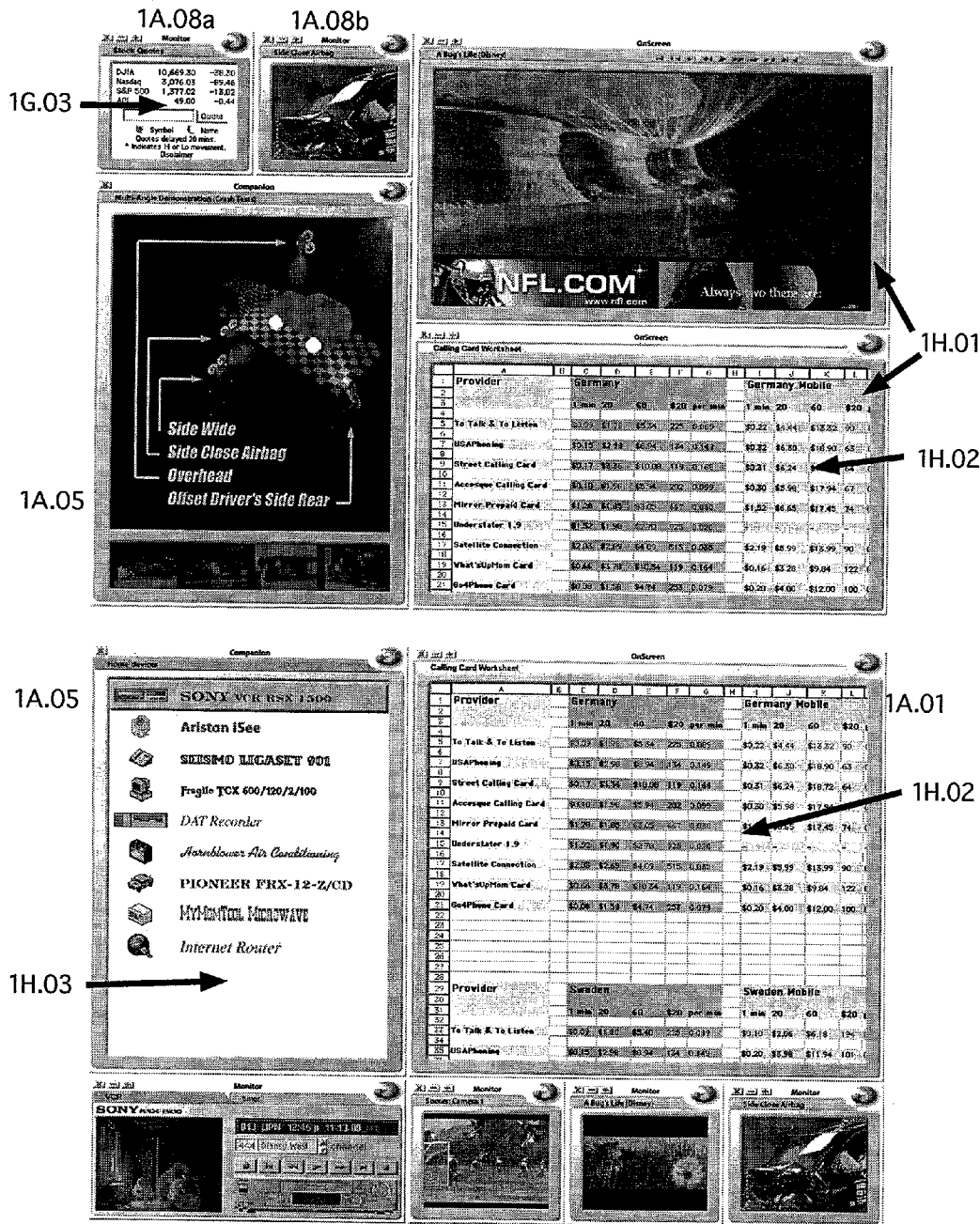
Figure 1J:
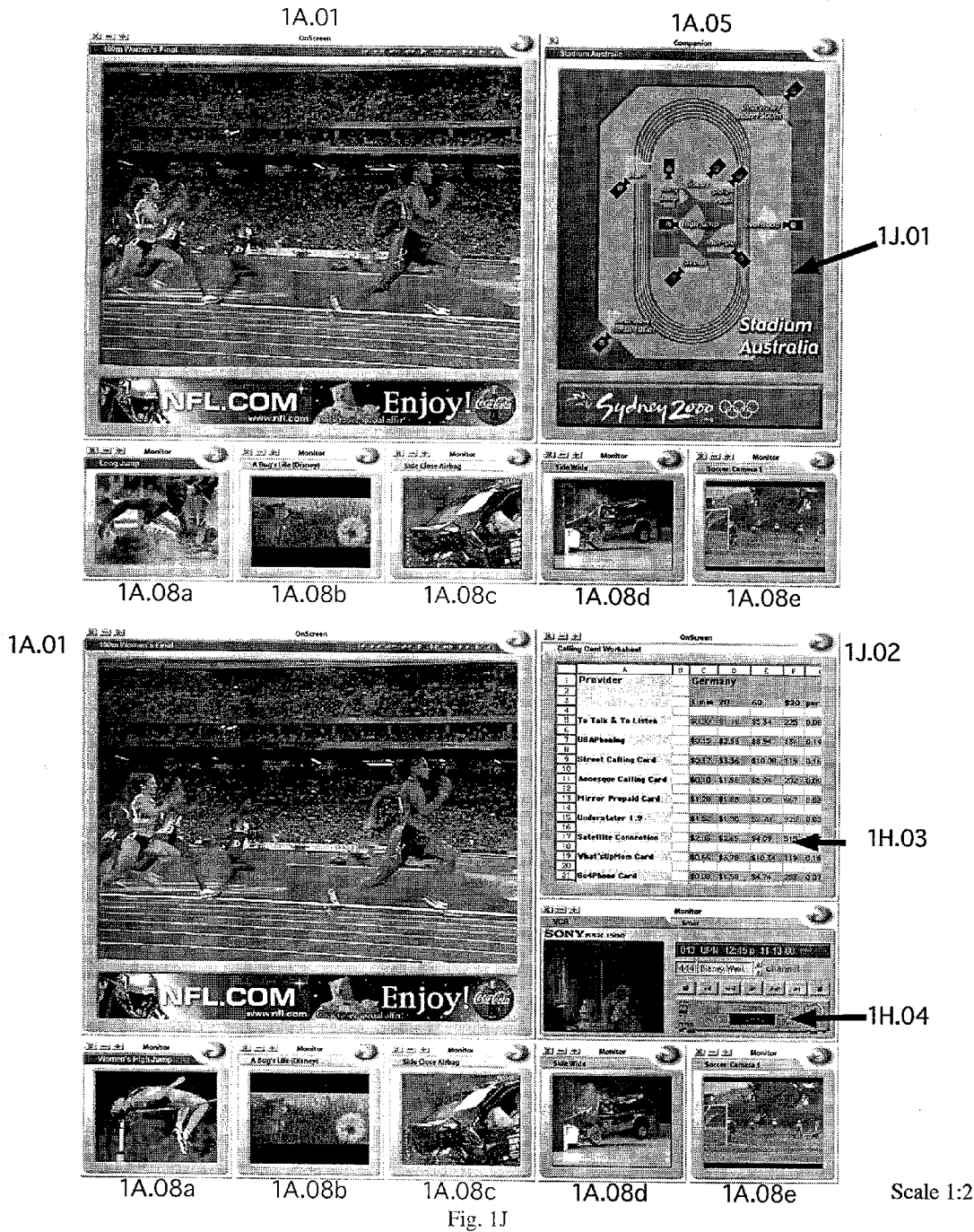
Figure 1K:
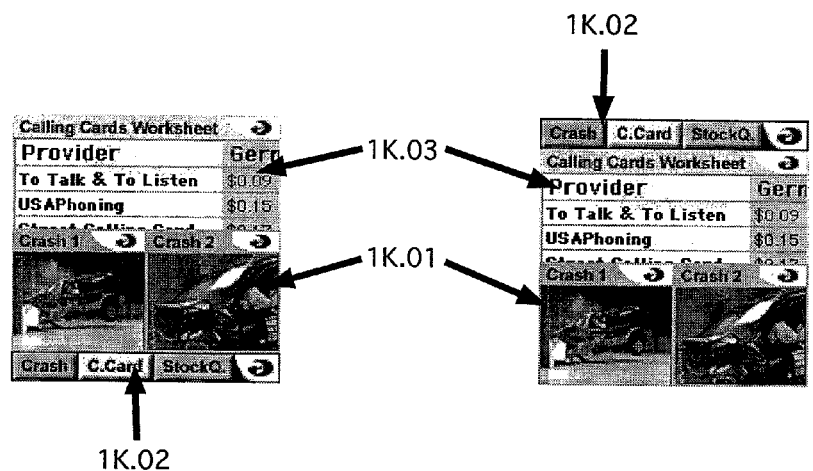
Figure 1L:
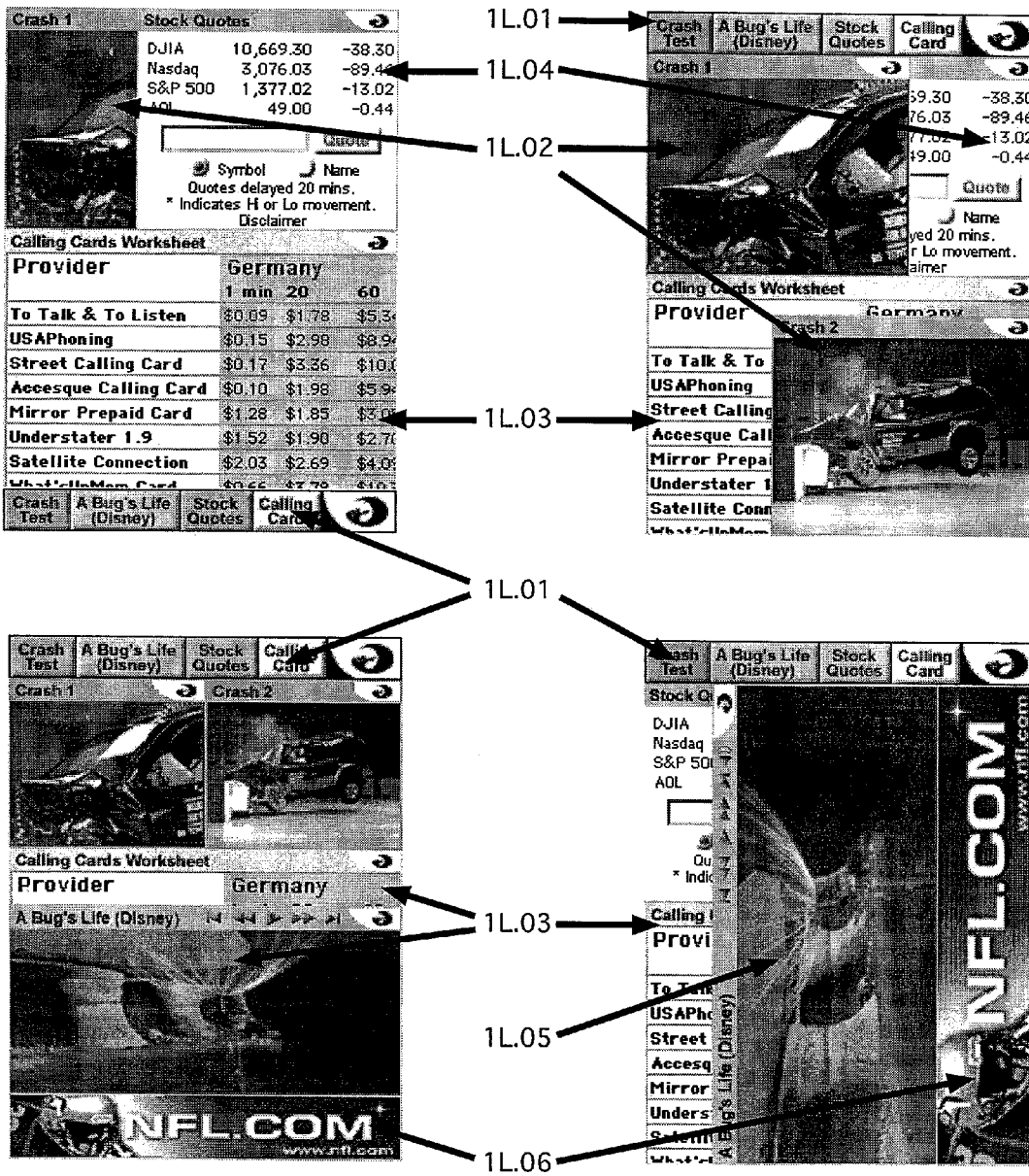
Figure 1M:
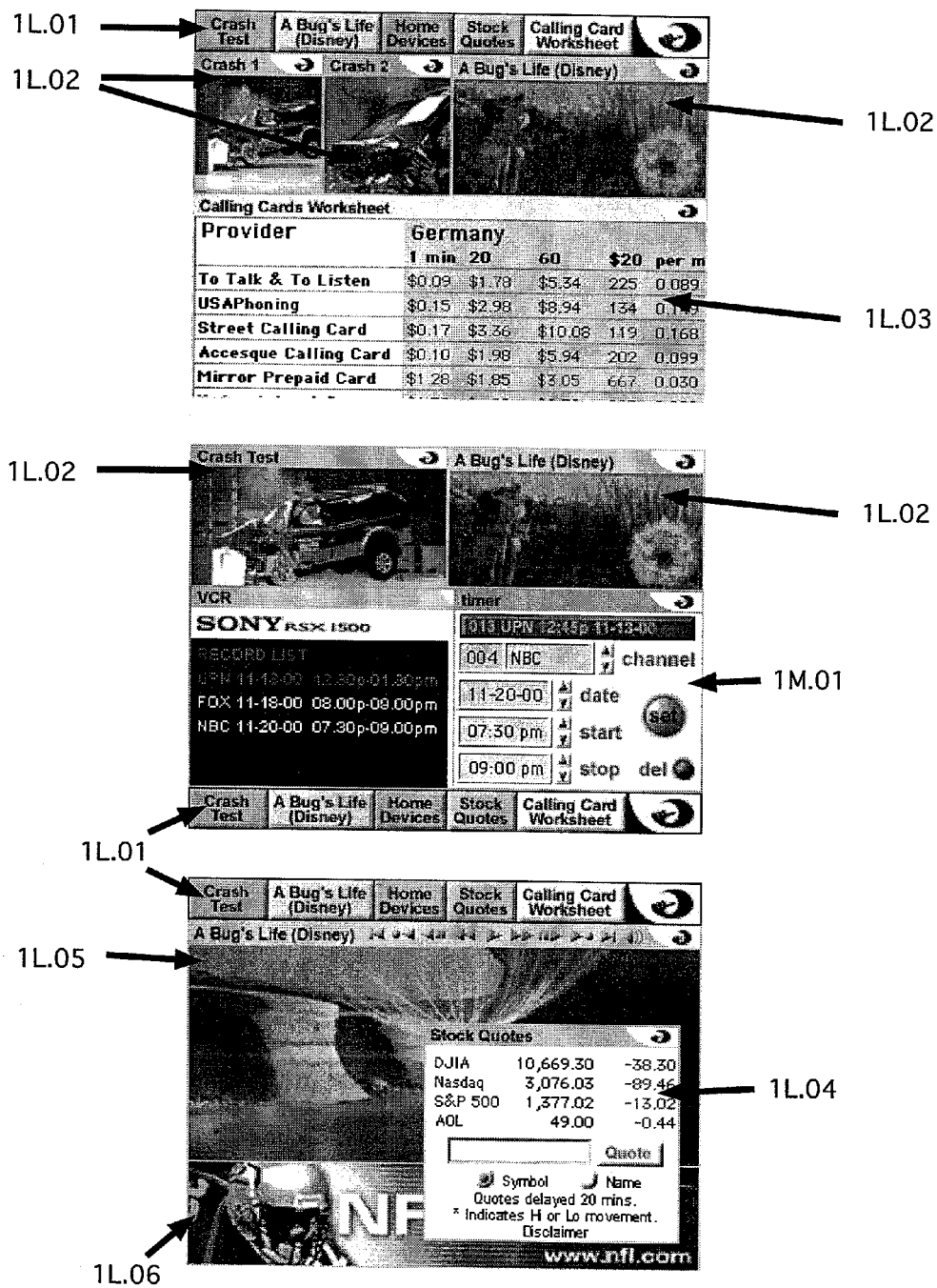

FIG. 9G depicts, that once located entirely on one standalone Access Device 9G.06, 9F, this single Access Device 10A-E can become the Back-end Information Network 9G.06 to other Assets and Access Devices 9G.01, 9G.02, 9G.03, 9G.04, 9G.05, 9G.07, 10A-H, creating its own small Consumer Access System network. This enables Consumers to build their own independent solutions such as extraordinary Home and Entertainment control systems (FIG. 9G, 1H.03), allowing the Consumer for example to check the content of the recording media in his DVD/Video Recorder 9G.07, 1H.04, 1M.01 at his home in Los Angeles, USA, before he schedules 1M.01, 1H.04, the recording of an internet video broadcasting as well as a program provided through his home television cable Set-top Box 9G.04, taps into some video observation cameras 9G.05 installed in his house, checks that enough food is in his refrigerator 9G.03, orders 1G.01, 14A.03 more milk with his Access Device 9G.01 and doing all this while being in a hotel room in Seoul, Korea, using his Nokia 9210 Communicator cellular phone as Access Device 9G.01, 1N. Any Consumer Access System in accordance with various aspects of this invention has no limitations in its scalability allowing any type of Consumer Asset Offering solutions from single system 11A, 11B to multiple server cluster deployments 11C, for private and/or corporate use.

The structure and application of the UI is illustrated in detail in FIGS. 12A, 13A-I, 13K and 13L.

The Front-end Human Interface 5A.11 is the User Interface (UI) to Our World Live's Novel Consumer Access System networking technology. In one embodiment, the UI is available as entirely written in Java, a well known software development environment for platform independent programming and supporting Asset types Apple QuickTime 1A08a, Microsoft Media Technologies 1A08b, RealNetworks Media Technologies 1A08c, MPEG 1A08d and standard television signals 1A08e. By making all different multimedia formats accessible with the Front-end Human Interface the Asset Provider is free to choose, deploy and mix any existing and future media platforms.

Figure 15A:
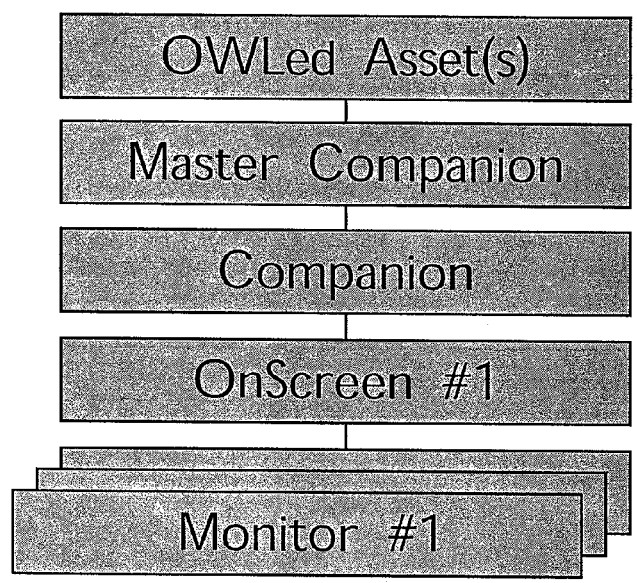
FIG. 15A is a diagram illustrating dependencies of the Front-end Human Interface.

The Front-end Human Interface 5A.11 provides multiple types of Window objects, such as OnScreen, Companion and Monitor, each of them able to have multiple concurrent existences or instances only limited to the capabilities of the Access Device it is running on. For one or more OWLed Assets one Companion Window is the parent object from which other objects come from (see FIG. 15A).

Figure 16A:
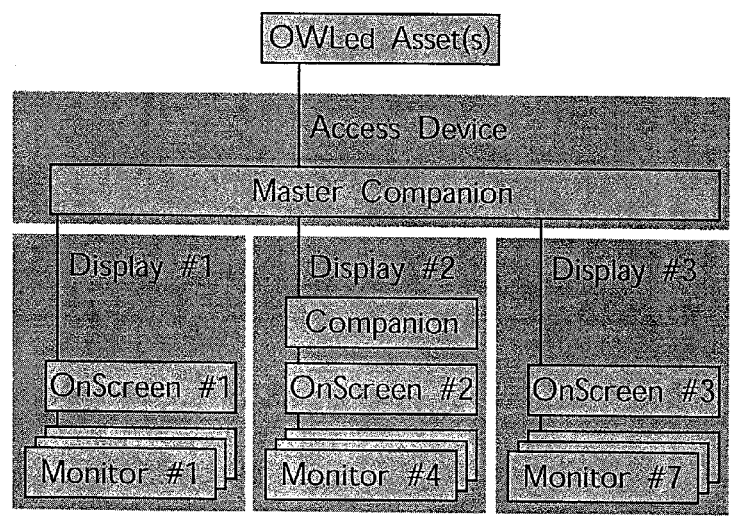
FIG. 16A is a block diagram illustrating the multiple displays capability of various embodiments of the invention.

With increases in performance in the Access System, as well as with more Display size offering either bigger or additional Displays, the Consumer is enabled to obtain increased advantage out of the Front-end Human Interface's expandable Windows feature (illustrated in FIG. 16A).

Figure 1P:
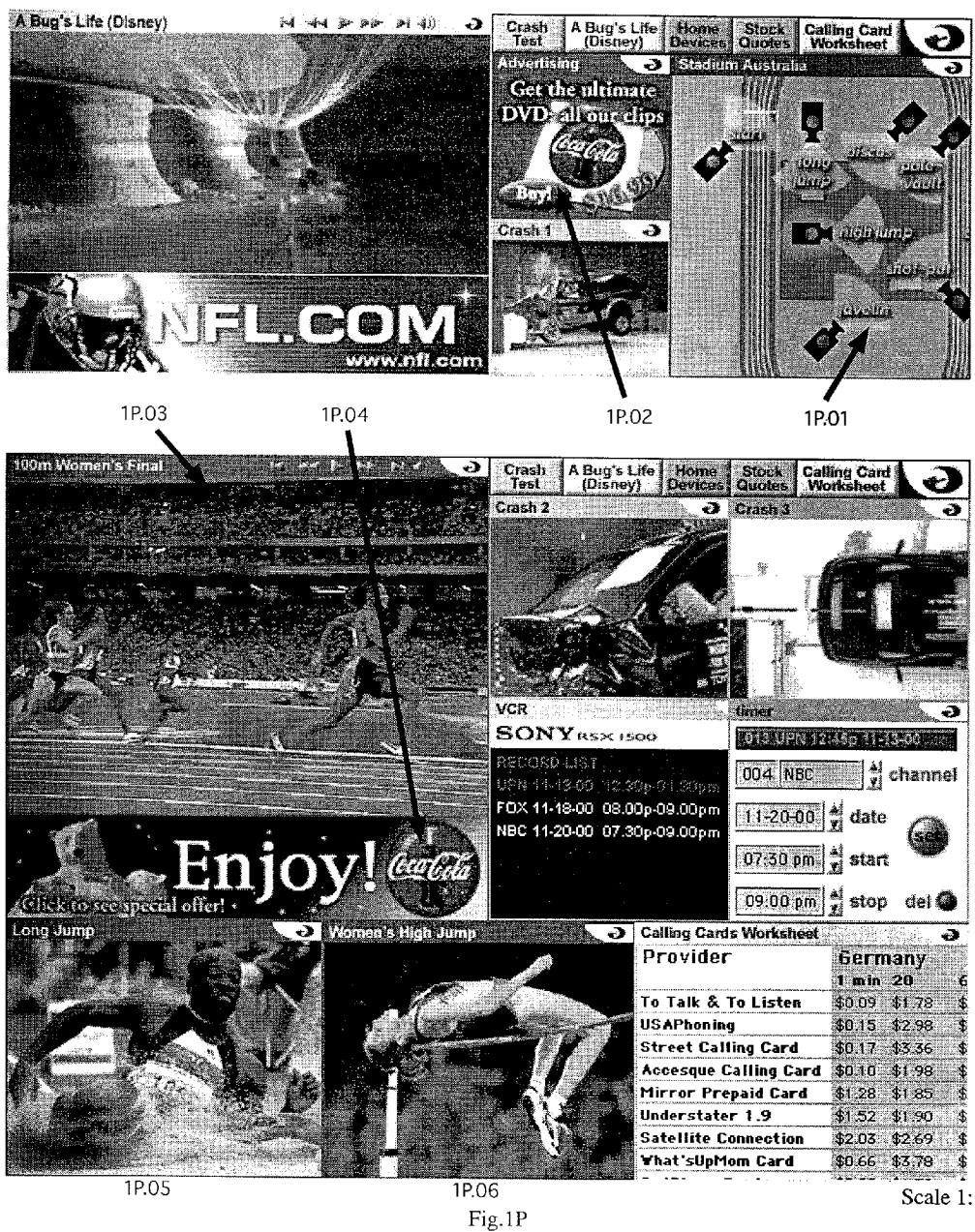
Figure 2F:
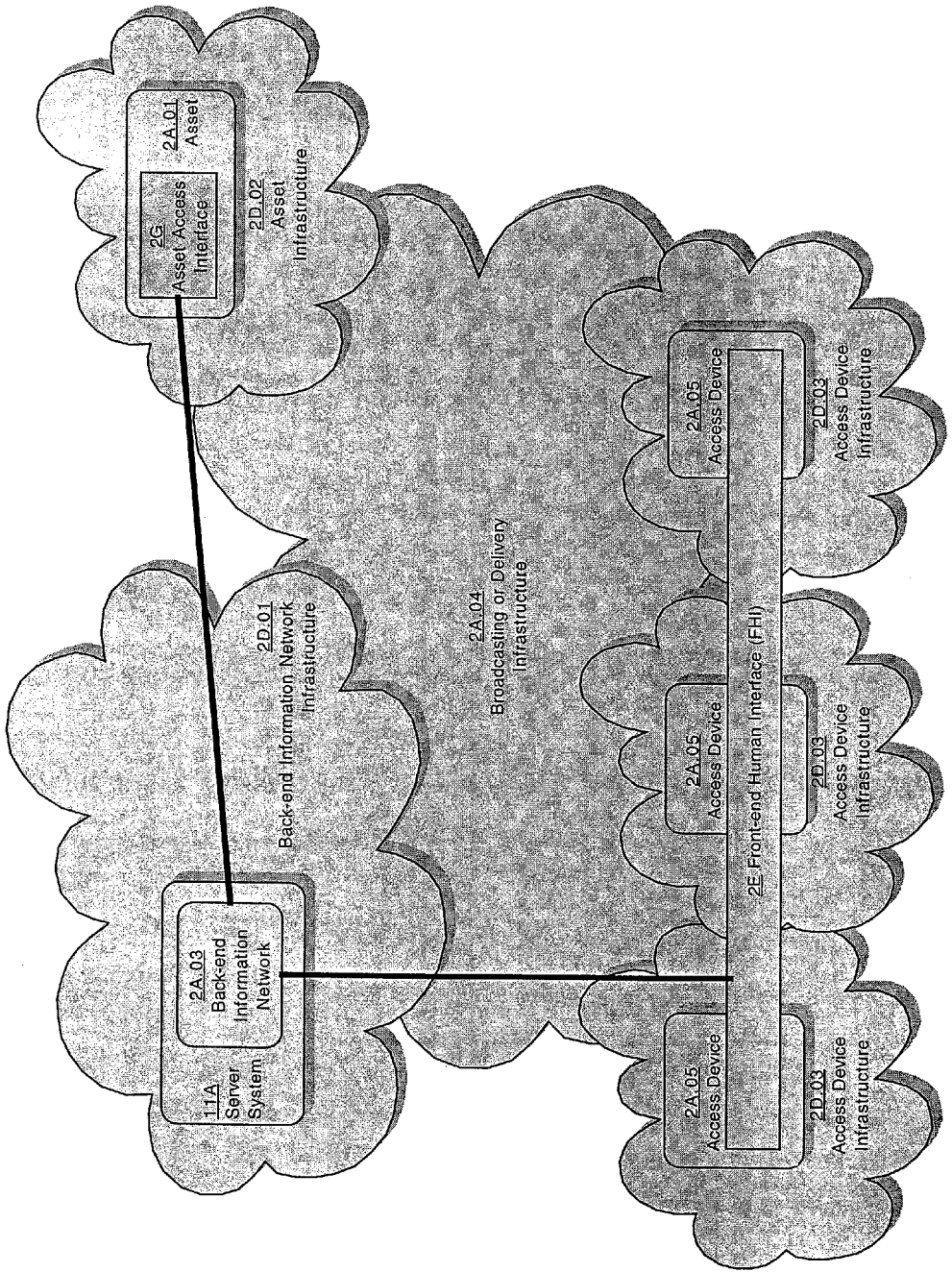
Figure 2G:
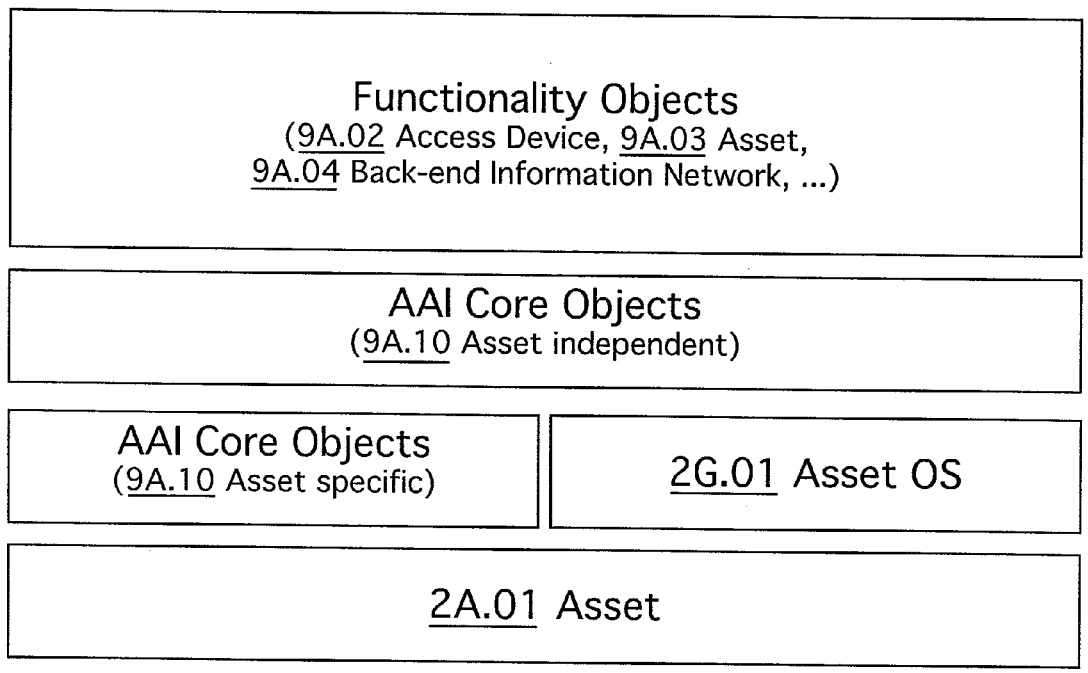
Figure 13K:
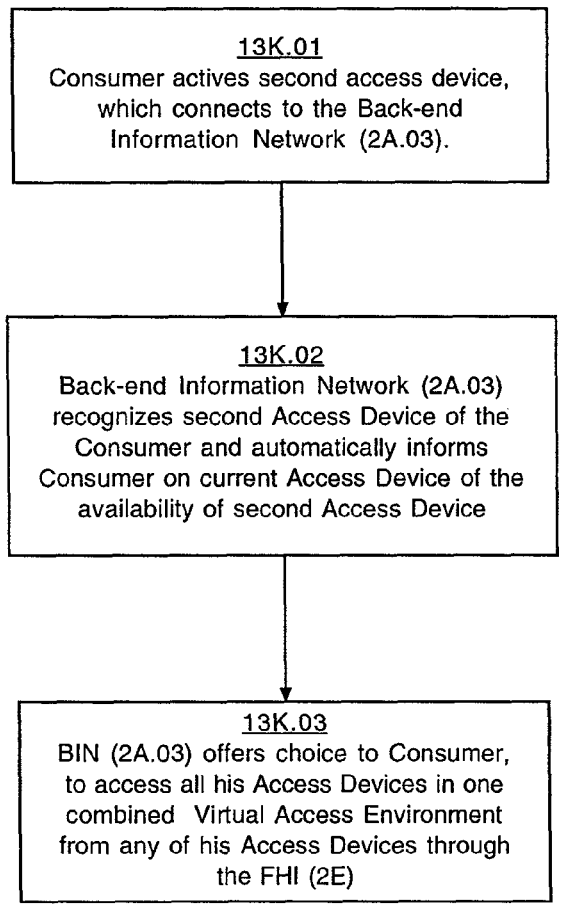
Figure 13L:
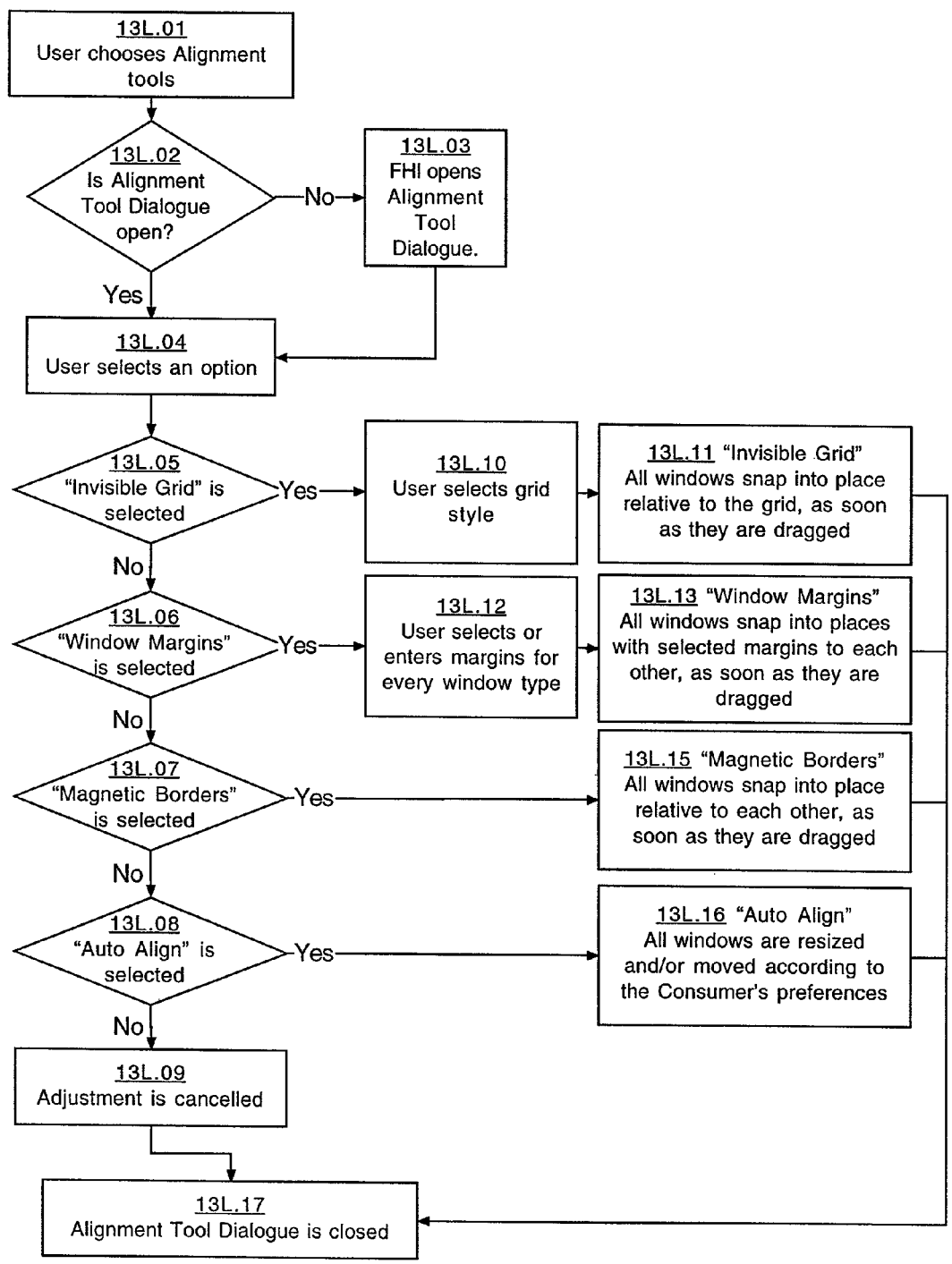

The Front-end Human Interface can also span across multiple Access Devices, creating for the Consumer one single Virtual Access Environment (FIGS. 2F and 13K). The Consumer can freely layout the Front-end Human Interface across all Screens of the assimilated Access Devices (FIG. 16B)—the FIGS. 1P, 1R and 1S illustrate how a Consumer watching the Olympic Games, chooses a camera angle on his (1P.01) Nokia 9210 cellular phone, (1R.01) Palm Pilot or (1S.01) Pocket PC and directs the video output to be displayed in an bigger OnScreen Window on his (1P.03) television set or (1R.02, 1S.02) Personal Computer. Being attracted by a product sales Offering displayed on the television set (1P.04) and simultaneously provided with a corresponding prompt on his cellular phone (1P.02), he responds to it on his cellular phone (1P.02), automatically directing his Personal Computers' Front-end Human Interface to the online store (1G.01) and purchasing the product on his Personal Computer.

The sophisticated Electronic Commerce procedures of various embodiments of the invention provide extended capabilities for personalized advertisement (14D, 1L.06, 1P.04), forwarding to external stores (14B) and optimized integration of internal stores as well as external store Legacy Systems, and are illustrated in detail in FIGS. 14A-D.

Figure 17A:
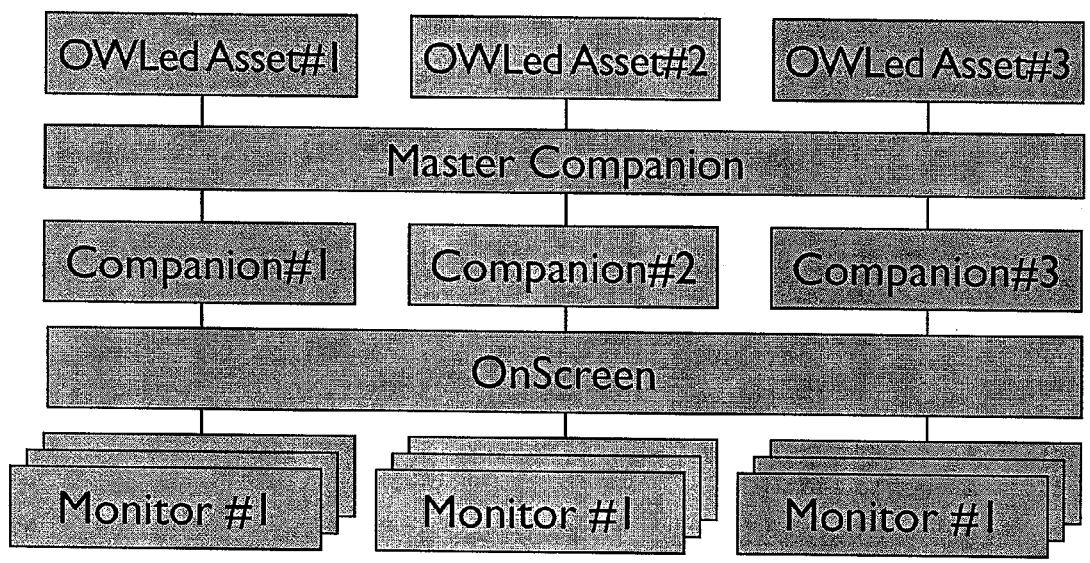
FIG. 17A illustrates the FHI's ability to handle multiple Asset Offerings, from all around the world.

The Front-end Human Interface in various embodiments also provides the Consumer a portal into the world of Our World Live's Consumer Access System simultaneously accessing any type of Asset 2C.01a-f, 1A.08a-e, 1G.01, 1G.02, 1G.03, 1G.04, 1H.02, 1H.03, 1H.04, 1J.01, 1M.01, offered live-video and video-on-demand contents 2C.01a, services 2C.01a-d such as banking, travel agencies, product stores and electronic shopping malls, as well as Home & Entertainment Devices 1H.04, 10C, 10D, 10G, 10H, 9G, 1H.03 Home Appliances 10E, 9G, 1H.03 Audio Entertainment Devices 1G, 1H, 1J, 2C.01a-f from all over the world 1B, 1C, D with any type of Access Device 1A, 1K-N, 1P-S, 2C.02a-g (shown in FIG. 17A).

07.B. Navigation and Control Provided by the Front-end Human Interface

Figure 18A:
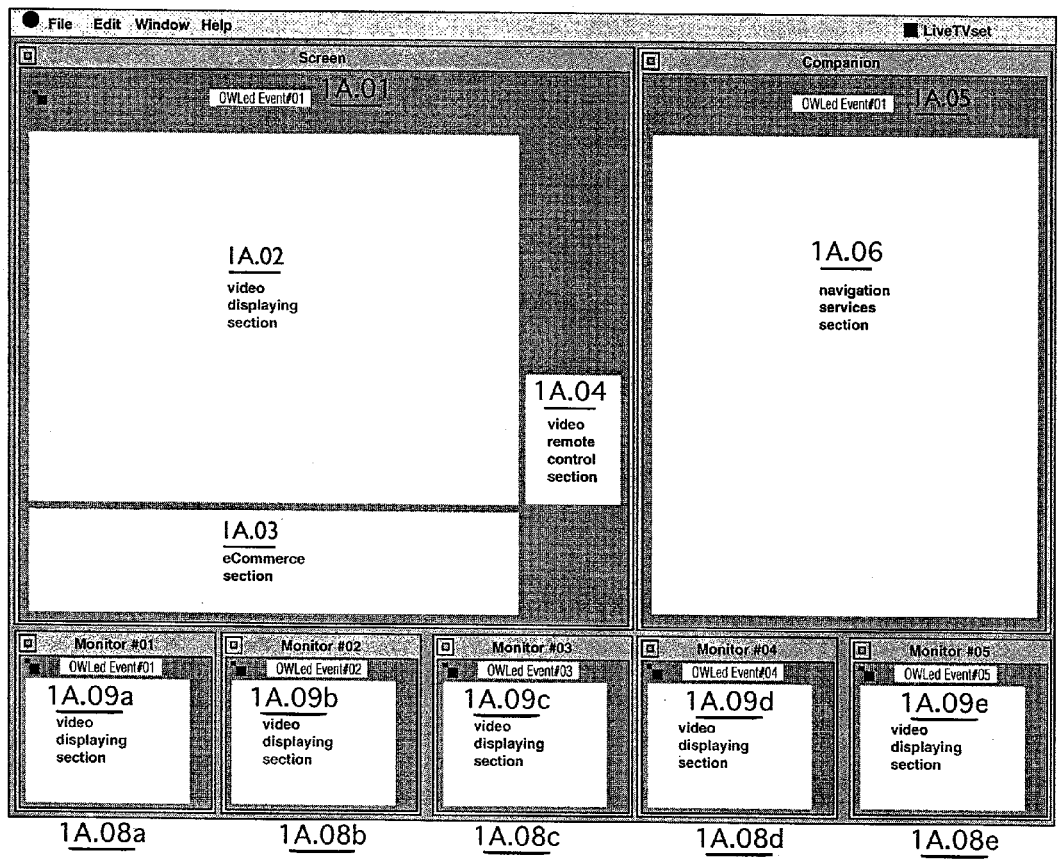
FIG. 18A is an illustration of the default windows provided by the FHI's at the Consumer's Access Device such as a Personal Computer.

FIG. 18A shows the default Windows set up of a graphical user interface version of the Front-end Human Interface as it would appear for OWLed Assets on a Consumer's Access Device such as a typical Personal Computer system with a single Display and at a Screen resolution of 1024×768 pixel. Additional examples for different Screen Layout arrangements of the Front-end Human Interface are shown in FIGS. 22A and 1A-F.

Figure 19A:
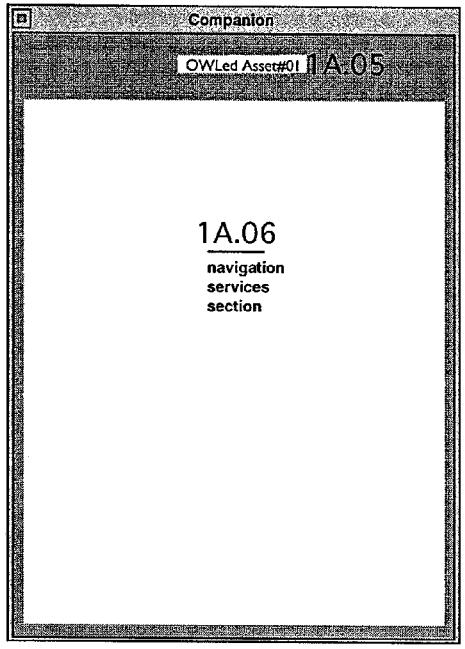
FIG. 19A illustrates the Companion Window of FIG. 18A.

The main guide Window for navigation and control is the Companion Window (shown in FIG. 19A). The navigation and control provides the Consumer with an intuitive and interactive way to overview the available Asset Offerings such as video content offered within a specific OWLed Asset such as a sports event. Beside offering video-on-demand services by searching and browsing databases, the Front-end Human Interface provides advantages in presenting Asset Offerings, such as live televised broadcasting events, in an entirely novel manner. A plurality of examples of how various embodiments of the invention provide access to different types of Asset Offerings are shown in FIGS. 1A-S.

As described above, in an Asset Offering, such as a live televised broadcasting event, several cameras are positioned with different perspectives and viewing areas so that many more details of an event can be viewed. In traditional television broadcasts a TV-channel produces its presentation of the event by cutting live from one camera to another trying to keep up with the supposed focus of interest of the Television Consumer, often interrupted by commercials, slow motion replays and other contents.

Figure 20A:
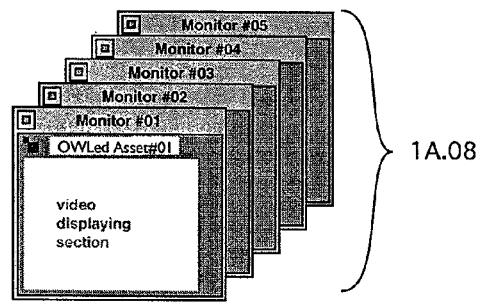
FIG. 20A illustrates the Monitor Window of the FHI.
Figure 21A:
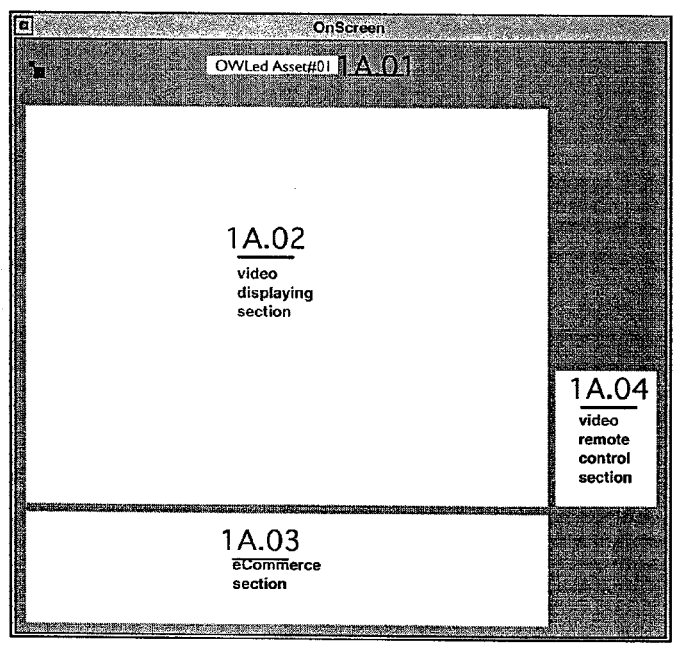
FIG. 21A illustrates the OnScreen Window feature of the FHI.

In contrast, in the Companion 1A.05, the Consumer gets a visual impression as to where the cameras are located and what perspective and viewing area each one has. He or she then can activate each single camera and either display at a Monitor Window, e.g. 1A.08, with the make monitor feature (FIG. 20A) or send the camera-output to the OnScreen Window, e.g. 1A.01, (FIGS. 1A and 21A) to be displayed in the respective screen area.

The Monitor Windows, e.g. 1A.08, although substantially smaller in size and with lower resolution than the OnScreen Window 1A.01, allow the Consumer to have an overview of the event as a whole and instantly jump to the area of his or her personal interest to watch with high resolution and quality on the OnScreen Window 1A.01. The Consumer can not only use the navigation services in the Companion (1A.05) but he or she also can directly redirect the camera-output from the Monitor Window (1A.08) to the OnScreen Window (1A.01) with the easy OnScreen feature of the Monitor Window (1A.08) or vice versa with the make monitor feature of the OnScreen Window (1A.01).

In various embodiments, the action displayed on the OnScreen Window (1A.01) from a given camera is not lost by switching to another camera for OnScreen Window (1A.01) viewing since the former camera is immediately transferred to a Monitor Window (1A.08).

The Monitor Windows (1A.08), OnScreen Windows (1A.01) as well as the Companion Windows (1A.05) are resizable and freely accommodateable, so that the Consumer can customize the displayed information according to his needs and the abilities of the used Access Device (FIGS. 1K-N).

Figure 16B:
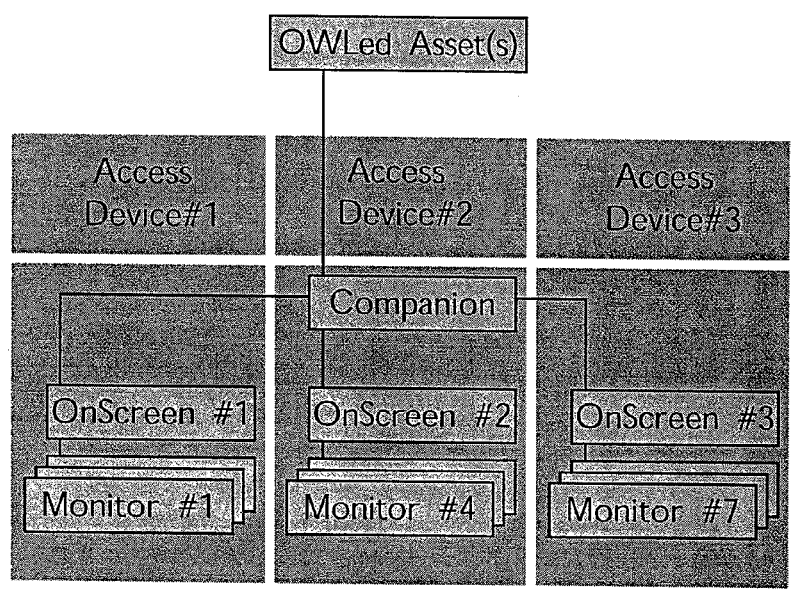
FIG. 16B depicts the assimilation of multiple access devices into the Virtual Access Environment.

In addition to that, the Front-end Human Interface is not restricted to a specific number or combination of Windows. The Consumer can freely choose the number of Monitor, On Screen or Companion Windows to be displayed (FIGS. 22A, 1H) and is only restricted by the abilities of the used Access Device or Devices, in case he is combining multiple Access Devices for deploying a Virtual Access Environment (FIGS. 2F, 16B).

Another feature of the Front-end Human Interface, are the Screen Layout Alignment Tools, which support the Consumer in arranging the Windows and "cleaning up" his or her Screen. The tools Invisible Grid 13L.11, Window Margins 13L.13, Magnetic Borders 13L.15 and Auto Align 13L.16 are described more detailed in FIG. 13L. The tools not only work on one Screen but across all Screens connected to a single Access Device and also across all Access Devices, which are part of one Virtual Access Environment.

Various embodiments of Our World Live's Consumer Access System are based on Open Source technologies as well as on industry standards to offer a wide range of services.

Figure 22A:
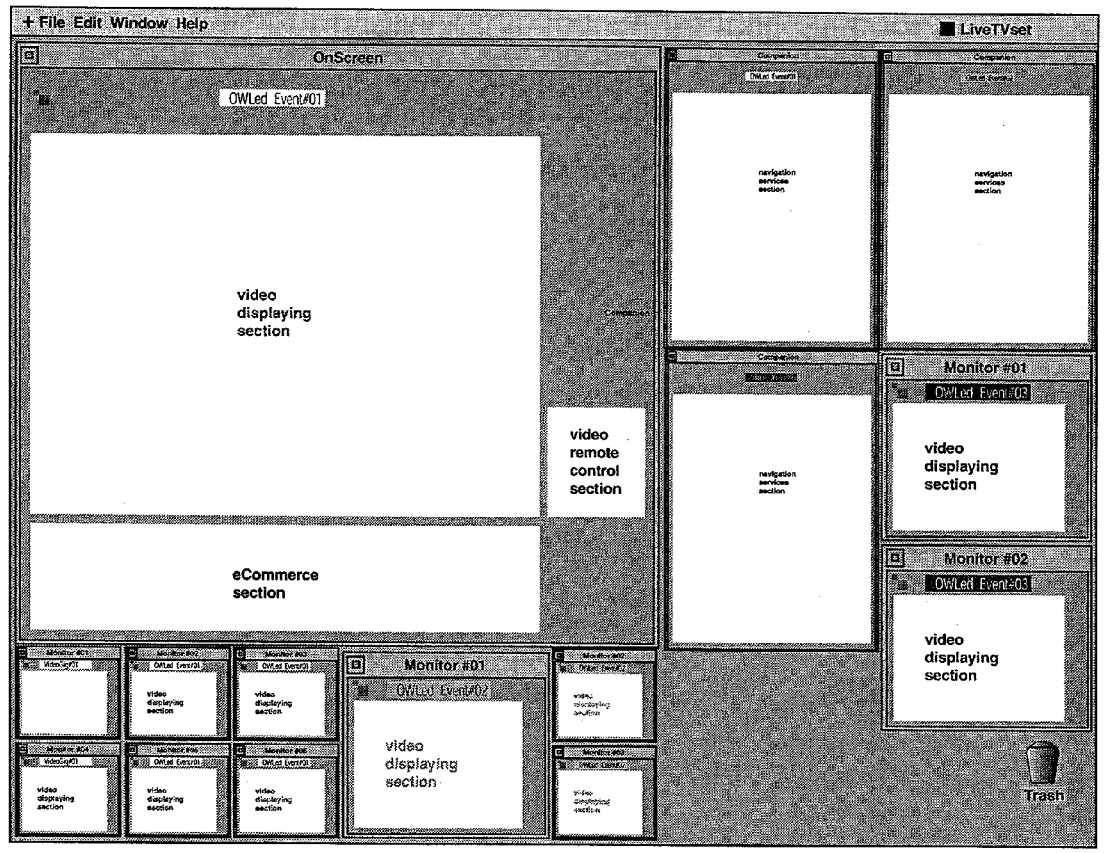
FIG. 22A illustrates an expanded view of several Windows depicting the fact, that the number of Windows is only limited by the capabilities of the Consumer's Access Device, here the Display attached to his Personal Computer.

Asset providers using for their offerings technologies disclosed herein can automatically provide them to consumers worldwide using the Front-end Human Interface application. Due to the simple but powerful user interface, freely Consumer customizable, with unlimited OWLed Events, unlimited Windows, unlimited Access Devices and unlimited Display support, the Front-end Human Interface becomes a Consumers portal into the world (FIG. 22A).

It will be understood that another embodiment of the present invention uses the cable or satellite delivery infrastructures to deliver content to the Consumer's television set. This system encompasses storing the program content, program guide, advertising content, customer service, profiling, and billing, including functionalities currently built into the set-top box on computer servers that become part of the Back-end Infrastructure network. The Front-end Human Interface is downloaded on start up to the set top box, or can be resident on the set top box, to allow the viewer to access and interact with the Back-end Information Network. In this embodiment the content owner, broadcaster, and network/cable operators can use one unified Back-end/front-end technology to deliver their content over any delivery infrastructure and enhance the viewer experience.

It will be understood that another embodiment of the present invention allows the advertisers, content owners, broadcasters, and network/cable operators to dynamically insert profile targeted advertisements, simultaneously showing different adds to different viewers during the same event, to track user behavior, to create, poll, track and monitor in real time.

What is claimed is:

1. A user front-end human interface system for allowing a user to access and control the presentation of multiple assets from asset providers, the assets comprising at least one of video, audio, graphics, script, information, and controls, using a front-end human interface on a user-controllable access device, within an access environment, the system comprising:
    a network device, storing computer program code, the network device being spaced apart from the access device
    wherein the front-end human interface is defined by software that is at least partially located:
        on the network device and is dynamically loaded onto a user's access device in response to the user's access device connecting to the network device
    means for loading and updating the front-end human interface;
    the front-end human interface allowing for the display and user interaction with a plurality of windows including at least two types of windows selected from the following three types:
        monitor windows for preview-level access to assets;
        onscreen windows for high-quality-level access to assets; and
        companion windows for providing video, audio, pictorial, textural, informational or commercial asset offerings or access to system controls;
    at least one of the monitor, onscreen and companion windows being equipped with user controls that allow the user to:
        enable and disable asset interaction or control; and
        send an asset from a monitor window to an onscreen window.

2. The system of claim 1, wherein assets comprise live or recorded events or movies featuring any combination of audio, video and textural information.

3. The system of claim 2, wherein the audio feature enabling/disabling capability spans across all windows within respective access devices, so that the enabling of audio in one window causes all other available audio features in all other windows to be disabled.

4. The system of claim 2, wherein the user can select a preference to enable audio on any onscreen or monitor window of each access device or one specific access device, disabling the audio controls on other windows respectively.

5. The system of claim 1 wherein the assets comprise contained assets which are video cameras.

6. The system of claim 1, wherein the assets comprise bundled assets which respectively comprise one or more events and cameras available in one or more venues, and the companion window is presenting said cameras as pictograms on a two- or three dimensional representation of the event's venue.

7. The system of claim 1, wherein the companion window is presenting the bundled assets in list form.

8. The system of claim 1 further configured to control the availability of one or more assets within the access environment in response to the asset provider's fee receipt and authorization process for users to access all or certain assets.

9. The system of claim 8 wherein assets are available for presentation in the monitor windows only, and the user will be prompted to pay a fee for every single asset that he wants to send to an onscreen window.

10. The system of claim 9 where the user will be prompted to pay a fee to be able to send any available assets to an onscreen window.

11. The system of claim 8 where the information sources are cameras in a venue providing a live feed of an event.

12. The system of claim 8 where the asset provider offers a post-event asset for free or for a fee that contains an edited version of the event.

13. The system of claim 8 where only those assets that provide close-up views of the event require the user to pay a fee.

14. The system of claim 1 wherein an asset offered in one window type is sent to another window type.

15. The system of claim 1 and configured to offer a full screen presentation of a window.

16. A user front-end human interface system for allowing a user to access and control the presentation of multiple assets from asset providers, the assets containing at least one of audio, video, and script, using a front-end human interface on a user-controllable access device, the system comprising:
    an access device;
    wherein the front-end human interface is defined by computer program code that is at least partially located on the access device;
    means for loading and updating the front-end human interface the front-end human interface allowing for the display and user interaction with a plurality of windows including at least two types of windows selected from the following three types:
        monitor windows for access to assets at a first quality level;
        onscreen windows for access to assets at a second quality level higher than the first quality level; and
        companion windows for providing video, audio, pictorial, textural, informational or commercial asset offerings;
    at least one of the monitor, onscreen and companion windows being equipped with user controls that allow the user to:
        enable and disable asset interaction or control; and
        transfer an asset from one window type to another window type.

17. The system of claim 16, wherein said access device is a cellular telephone.

18. The system of claim 16, wherein said access device is a TV set top box.

19. The system of claim 16, wherein said access device is a TV.

20. The system of claim 16, wherein said access device is a monitor.

21. The system of claim 16, wherein said access device is a computer.

22. The system of claim 16, wherein said access device is a DVD player.

23. The system of claim 16, wherein said access device is a game console.

24. The system of claim 16, wherein said access device is an entertainment device or system.

25. The system of claim 16, wherein said access device is the information system of a terrestrial or aerial transport vehicle.

26. A method of defining a user front-end human interface for allowing a user to access and control the presentation of assets from asset providers using an access device, the assets containing at least one of audio, video, and text, the method comprising:

defining the front-end human interface using computer program code that is configured to be partially or entirely located on at least one of:
        the access device; and
        a network device;

means for loading and updating the front-end human interface the front-end human interface allowing for the display and user interaction with a plurality of windows including at least two types of windows selected from the following three types:

monitor windows for access to assets at a first quality level;
        onscreen windows for access to assets at a second quality level higher than the first quality level; and
        companion windows for providing video, audio, pictorial, textural, informational or commercial asset offerings; and the front-end human interface including user controls to:
        enable and disable asset interaction or control
        transfer an asset from one window type to another window type.

\* \* \* \* \*